US007640322B2

(12) United States Patent
Wendkos et al.

(10) Patent No.: US 7,640,322 B2
(45) Date of Patent: Dec. 29, 2009

(54) SYSTEMS AND METHODS FOR PRODUCING, MANAGING, DELIVERING, RETRIEVING, AND/OR TRACKING PERMISSION BASED COMMUNICATIONS

(75) Inventors: Brad Wendkos, Saint Petersburg, FL (US); Alison Hasbach, Saint Petersburg, FL (US); Andrian Pervazov, Saint Petersburg, FL (US)

(73) Assignee: Truefire, Inc., St. Petersburg, FL (US)

( * ) Notice: Subject to any disclaimer, the term of this patent is extended or adjusted under 35 U.S.C. 154(b) by 754 days.

(21) Appl. No.: 11/068,033

(22) Filed: Feb. 28, 2005

(65) Prior Publication Data

US 2005/0228899 A1      Oct. 13, 2005

Related U.S. Application Data

(60) Provisional application No. 60/547,486, filed on Feb. 26, 2004.

(51) Int. Cl.
*G06F 15/16* (2006.01)
(52) U.S. Cl. .......................... 709/219; 709/206; 705/14
(58) Field of Classification Search ................ 709/219, 709/202, 227, 206; 705/14; 707/104.1
See application file for complete search history.

(56) References Cited

U.S. PATENT DOCUMENTS

| | | | | |
|---|---|---|---|---|
| 6,735,622 B1* | 5/2004 | Andreoli et al. | ............. | 709/219 |
| 7,010,565 B2* | 3/2006 | Sampson | .................... | 709/202 |
| 7,328,266 B2* | 2/2008 | Schmidt et al. | ............. | 709/227 |
| 7,346,630 B2* | 3/2008 | Eichstaedt et al. | ........ | 707/104.1 |
| 7,505,922 B1* | 3/2009 | Philyaw | ...................... | 705/26 |
| 2002/0174010 A1* | 11/2002 | Rice, III | ...................... | 705/14 |
| 2003/0065739 A1* | 4/2003 | Shnier | ........................ | 709/217 |
| 2003/0079176 A1* | 4/2003 | Kang et al. | .................. | 715/500 |
| 2003/0083937 A1* | 5/2003 | Hasegawa et al. | ............. | 705/14 |
| 2004/0122730 A1* | 6/2004 | Tucciarone et al. | ........... | 705/14 |

* cited by examiner

*Primary Examiner*—William C. Vaughn, Jr.
*Assistant Examiner*—Greg Bengzon
(74) *Attorney, Agent, or Firm*—Irah H. Donner; Wilmer Cutler Pickering Hale and Dorr LLP

(57) ABSTRACT

New and improved methods and systems are provided for producing, managing, delivering, retrieving, and/or tracking permission communications that alleviate several of the existing problems commonly associated with existing permission communications. According to the invention, computer users can request to receive direct communications from one or more senders. When a new communication is detected, an alert is provided to the recipients, who can use the alert to view the communication in their Web browser. Similar alerts may also be provided to one or more recipients when particular Web pages are updated. Various alternative embodiments are also disclosed.

47 Claims, 22 Drawing Sheets

512

TrueFire Newsletter: Subscription Form

LOGO

There are two ways to receive your TFU newsletters: by traditional email to your inbox, or by using our BrowserMail application which instantly notifies you when a new edition is available and displays it in your Web browser without cluttering up your inbox.

First Name ☐

Last Name ☐

Email ☐

I prefer delivery by BrowserMail ☐

Subscription Form

LOGO

There are two ways to receive messages from your selected senders: by traditional email to your inbox, or by using our BrowserMail application which instantly notifies you when a new edition is available and displays it in your Web browser without cluttering up your inbox.

| | | | |
|---|---|---|---|
| TrueFire | ☐ | Market GHI | ☐ |
| ABC News Company | ☐ | Hobbies, Inc. | ☐ |
| Electronics, Inc. | ☐ | Vacations, Inc. | ☐ |
| DEF Sports Company | ☐ | Legal Company | ☐ |
| Samantha's Jewelery | ☐ | GHI Magazine | ☐ |

First Name: _____
Last Name: _____
Email: _____

I prefer delivery by BrowserMail ☐

View All Lists
☐ Admin (2)
☐ Masters (14)

| List Name | Modified | Targets |
|---|---|---|
| Mercurio Leads | 02/10/05 | 38 |
| 👤 Key Artists | 02/10/05 | 9 |
| 👤 OfficialFriends | 02/10/05 | 128 |
| Master 1124 | 02/10/05 | 64709 |
| 👤 TF Internal | 02/10/05 | 16 |
| Master TF 120504 | 02/10/05 | 50422 |
| Master 121304 | 02/10/05 | 50610 |
| Master 122004 | 02/10/05 | 50980 |
| Master 123004 | 02/10/05 | 50993 |
| 1230 Duped | 02/10/05 | 50962 |
| Hard TF 120504 | 02/10/05 | 15802 |
| Master 012805 | 02/10/05 | 51881 |
| Current & Suspend... | 02/10/05 | 701 |
| TFU Master Promo | 02/10/05 | 51160 |

844

👤 = Rich List  ✓ = Optin List
☐ Optin (6)
☐ TFU Live (3)

List Name: OfficialFriends
Description:
Optin List: ☐
👤 - Rich List
> Enter List Description Folder: Masters
Upload File:

⦿ Add to List  ◯ Replace List
Add/Search: > Enter Address/Search String
Add  Search  Validate  Edit Results:
jholcombe@mail.leoburnett.com.mx
qball@truefire.com
brad@truefire.com
Remove  fabbassi@atpco.net
Unbounce  jwbeauchamp@mindspring.com
Address has unsubscribed Bounces: 0  Show hard bounces  Go
Unsubscribes: 3  Show all  Go
Email stats:  Show prefer BM  Go
Prefer BM 37
Active 35
Inactive 2
Switched to email 3
Incomplete 3
Uninstalled 6

848

Log out

| View All Messages | | | Name: | > Enter New Message Name | HTML Tags |
| --- | --- | --- | --- | --- | --- |
| Admin (6) | | | Folder: | StudioWire | |
| Promo (32) | | | | | |
| StudioWire (49) | | | Description: | > Enter Message Description | |
| Message | Modified | | | | |
| New BM Opt In | 02/10/05 | | Text: | > Paste Text Message | |
| Video Bytes | 02/10/05 | | Preview | | |
| Video Stream | 02/10/05 | | | | |
| Beta Thanks | 02/10/05 | | | | |
| Image Gallery | 02/10/05 | | | | |
| RSVP Thanks | 02/10/05 | | HTML: | > Paste HTML Message | |
| Installation Guide | 02/10/05 | | Preview | | |
| Swire Image Gallery | 02/10/05 | | | | |
| Download: StudioWire: ... | 02/10/05 | | | | |
| Download: StudioWire: ... | 02/10/05 | | | | |
| Incomplete Bmail/Studi... | 02/10/05 | | Image: | | Browse |
| BrowserMail Survey | 02/10/05 | | | | |
| BrowserMail Activated | 02/10/05 | | | | |
| StudioWire: Joscho Ste... | 02/10/05 | | | | |
| Email StudioWire: Josc... | 02/10/05 | | | | |
| Email StudioWire: Tony... | 02/10/05 | | | | |
| StudioWire: Tony McManus | 02/10/05 | | | | |
| StudioWire: Claus Boes... | 02/10/05 | | | | |
| StudioWireTemplate | 02/10/05 | | | | |
| StudioWire Now Available | 02/10/05 | | | | |
| <1 2 3 > | | | | | |

864

TFU (11)
TFU Live (6)
TFU News (11)

Log out

Template Wizard

Masthead

[Logo]

First Feature

[Image]

Second Feature

[Image]

Template: [Two Features ▾] [StudioWire ▾]  HTML Tags

Logo: [_____] [▓▓▓▓]
Title: [StudioWire: Tony McManus]
Sub-Title: [Celtic guitar extraordinaire]

Header: [> Enter title of feature]
Text:
```
<P><FONT face="Trebuchet MS"
size=2>Conjuring the universal
language of acoustic
guitar, </FONT><A
href="http://www.tonymcmanus.com/"
```
HTML Editor
Link Text: [> Enter call-to-action for link]
Link URL: [> Enter URL for link]
Image: [_____] [▓▓▓▓]
Caption: [> Enter caption]

Header: [> Enter title of feature]
Text:
```
<P><IFRAME border=0 name=I1
marginWidth=1 marginHeight=1
src="http://truefireflash.sitestre
am.com/flash/tonym/player.html"
frameBorder=0 width=370
```
HTML Editor
Link Text: [> Enter call-to-action for link]
Link URL: [> Enter URL for link]
Image: [_____] [▓▓▓▓]
Caption: [> Enter caption]

Log out

FIG. 8H

| Campaign | Launched | Name | List | Targets | Unsubscribes | Opens | Clicks |
|---|---|---|---|---|---|---|---|
| TF News | 2/9/05 | News 1.5 | All | 97,234 | 14 | 87,343 | 38,845 |
| Studio | 8/9/04 | Lesson 3 | Music | 34,192 | 74 | 31,840 | 23,622 |
| ⋮ | ⋮ | ⋮ | ⋮ | ⋮ | ⋮ | ⋮ | ⋮ |

FIG. 9A

| Name | URL | Date | Alerts | Views |
|---|---|---|---|---|
| TFU Homepage | http://www.truefire.com | 05/06/2004 | 32,845 | 28,392 |
| TFU Accounts | http://www.truefire.com/accts | 05/02/2004 | 17,628 | 11,707 |
| ⋮ | ⋮ | ⋮ | ⋮ | ⋮ |

FIG. 11

SYSTEMS AND METHODS FOR PRODUCING, MANAGING, DELIVERING, RETRIEVING, AND/OR TRACKING PERMISSION BASED COMMUNICATIONS

CROSS-REFERENCE TO RELATED APPLICATION

This application claims priority to U.S. Provisional Patent Application No. 60/547,486, filed Feb. 26, 2004, which is hereby incorporated by reference herein in its entirety.

FIELD OF THE INVENTION

The present invention relates to the field of electronic communications. More particularly, this invention relates to computer implemented methods and systems for producing, managing, delivering, retrieving, and/or tracking electronic permission based communications.

BACKGROUND OF THE INVENTION

The advent of computers and electronic communications networks has enabled individuals and organizations (e.g., corporations) to disseminate information in a more efficient and rapid manner than was previously possible using conventional (ground) mail alone. For example, in a typical Internet-based electronic mail (email) system, a computer user sends and receives emails using a Web browser that accesses an Internet-based email application program, such as HOTMAIL by Microsoft Corp. A computer user may alternatively employ a desktop-based email application program, such as OUTLOOK by Microsoft Corp., to send and receive emails. In both of these scenarios, emails are delivered through one or more email networks (using one or more email protocols, such as the Internet Message Access Protocol (IMAP), the Post Office Protocol 3 (POP3), and the Simple Mail Transfer Protocol (SMTP)) to a recipient using the recipient's unique email address, which generally includes a combination of the recipient's domain name and user name.

Due to technological improvements in the past decade, which have made sending emails easier and more affordable, email campaigns have become an important part of many business models and, for example, communication efforts by non-commercial organizations. At the same time, there has been a dramatic increase in the number of unwanted emails received by users throughout the world (in particular, with regard to unsolicited commercial emails, or "SPAM"). An estimated 50% of all email traffic is SPAM, causing excessive congestion in the email network, and causing Internet Service Providers (ISPs) and organizations to spend resources processing and managing unwanted traffic. As a result, various laws, guidelines, and technological safeguards (e.g., black lists, content based SPAM filters, etc.) have been implemented in the past few years in an attempt to reduce the number of unsolicited emails received by computer users. While these safeguards, such as SPAM filters, may reduce the number of unwanted email messages in a recipient's inbox, the email network and/or ISPs and organizations must still process and manage the traffic. Moreover, while blocking or diverting at least some of such unsolicited emails from reaching the intended computer users, these actions have had a great adverse effect on senders of legitimate permission communications (e.g., organizations that send electronic communications, such as emails, only to recipients who have either requested or otherwise given the organization their "permission" to receive such emails). Below is a brief explanation of various examples of the problems currently faced by senders of legitimate permission communications (also referred to herein as "legitimate senders").

One significant problem that legitimate senders now face relates to SPAM and inbox clutter affecting many (if not most) current email recipients. In particular, due to the large number of unsolicited emails that may occupy a recipient's inbox at any given time, it is not uncommon for such recipients to overlook and delete legitimate emails, and/or harbor adverse consumer sentiment with regard to all commercial senders (whether legitimate or not).

Another common problem faced by legitimate senders stems from the practice of blocking and blacklisting. ISPs often block incoming mail from certain Internet addresses (e.g., IP addresses) that they have determined to be a likely source of SPAM. For example, when a large number of emails originating from a particular IP address is detected by an ISP, the ISP may unilaterally decide that the emails are all unsolicited (and perhaps the result of a malicious Internet virus). Similarly, ISPs often subscribe to blacklists created by one or more of the currently existing hundreds of independent anti-SPAM organizations. The blacklists compiled by these anti-SPAM organizations contain those IP addresses that are suspected SPAM sources based on, for example, proprietary algorithms, research, SPAM reports, and other "secret ingredients." When an ISP receives an email from a listed IP address, it will generally automatically block the email from reaching the intended recipient or deliver the email into a "junk folder" of the recipient.

While blocking and blacklists do prevent a lot of SPAM and other unsolicited emails from reaching their intended recipients, because blocking and blacklists are at least partially based on speculation, delivery of permission emails by legitimate senders are also very frequently prevented from reaching their intended recipients. By some estimates, as much as one-third of all sent emails (many of which are legitimate emails) fail to reach the recipients' inboxes, often with many of the recipients not being aware that their email is being diverted, blocked, destroyed, or otherwise tampered with.

Legitimate senders of traditional emails also find themselves subject to creative limitations for more multiple reasons. For example, because many SPAM filters are triggered by certain common and effective marketing phrases, senders of permission emails often feel compelled to forgo such phrases. Additionally, legitimate senders may choose to avoid many capital letters or images, blue color font, and various other creative elements that have been known to also trigger SPAM filters. Even when emails are not deleted or diverted by a SPAM filter or other mechanism based on content, many organizations (e.g., ISPs and corporations) choose to strip out all images and links from incoming email in an attempt to thwart computer users from being exposed to offensive images and dangerous links. In fact, some organizations go as far as to reduce all HTML messages to plain text. In either of these two cases, recipients receive at least somewhat censored versions of many incoming emails, including those originating from legitimate senders that pose no risk to the recipients.

Moreover, even when legitimate emails reach their destinations, and are not modified by a third party prior to their receipt, it is not always the case that the recipients are able to view the emails as intended by the senders. This is due in part to the existence of a vast array of email readers to choose from in the current market. Each of these readers has its own characteristics and displays email messages differently, making it nearly impossible for senders of email to craft a consistent presentation for its entire recipient base. Moreover, although rich media (e.g., online video and animation) is among the fastest growing and most effective marketing tools available in the online world today, and despite the proliferation of broadband and relatively cheap bandwidth and the availability of rich media friendly computer systems, many (if not all) of email readers in widespread use today fail to adequately leverage the effectiveness of rich media that is received with emails. In many cases, due to the limitations of certain email readers, rich media can not be viewed at all by a recipient of an email.

Moreover, while necessary for organizations and other senders to measure the performance of their campaigns, the process of tracking and reporting of emails has been and continues to be extremely problematic. In particular, accurate tracking and reporting of deliveries, bounces, opens, and clicks associated with emails has been difficult or impossible to achieve. For example, because it is not possible to determine if an email message actually reaches the intended inbox, deliveries must be calculated in these systems by subtracting bounced messages from the total number of messages sent. However, the tracking of bounced messages (i.e., messages that are not accepted for delivery by the target server) is itself problematic. For example, while the recipient's mail server generally returns a bounce report to the sending server explaining the reasons for an email being not deliverable (e.g., incorrect email address, full inbox, server problems, etc.), the accuracy of such a bounce report is often less than desired. Additionally, the little pixels used to track opens in HTML messages are often stripped or otherwise blocked, and text message opens can not be tracked. Tracking clicks by a recipient has been similarly problematic.

Individuals and organizations, particularly those sending large numbers of emails, are also hurt by various delays from start to finish. Mail servers have varying degrees of throughput and maximum output, and organizations using shared mail server farms often wait in queue or fight for processing power when a campaign is launched. Once emails are sent, each one must travel across the frequently congested Internet and make its way to the recipient's ISP, which in turn must process and then deliver the email. These and other factors often cause emails in a large campaign to take hours to fully deliver. Delivery times are also adversely affected when bounce reports are returned with insufficient explanation, at times requiring a sender to resend bounced emails several times.

A legitimate sender's requirement to defend against false reports of SPAM is also a significant obstacle that must be faced when dealing with convention email. More often than not, despite the existence of permission agreements, a sender (including a legitimate sender) is immediately and sometimes without notice blocked and blacklisted in response to one or more complaints by recipients. As a result, legitimate senders must often expend significant resources, including time and money, defending themselves from false SPAM reports and keeping their IP addresses off of blacklists. Larger amounts of resources will also likely be required to comply with new and constantly changing anti-spam regulations and the growing bureaucracy associated therewith.

These and other issues have all contributed to lost opportunities by senders of legitimate permission communications, who are estimated to have spent up to $2 billion dollars last year on email communication campaigns. Accordingly, it is desirable to provide new and improved methods and systems for producing, managing, delivering, retrieving, and/or tracking electronic communications (e.g., permission based electronic communications) that alleviate at least some of the above (and potentially other) problems commonly associated with existing electronic communications.

SUMMARY OF THE INVENTION

New and improved methods and systems are provided for producing, managing, delivering, retrieving, and/or tracking permission based communications that alleviate several of the existing problems commonly associated with existing permission communications. According to the invention, in at least one embodiment, a new delivery methodology is provided that requires the establishment of indisputable permission arrangements between senders and recipients (also referred to as "subscribers"). The invention thus puts recipients back in control of their subscription preferences. At the same time, as described below in greater detail, the invention, in alternate embodiments, allows legitimate senders to deliver electronic communications (also referred to as "messages") over a more direct and secure route than traditional email allows, and optionally, to be viewed by recipients using their Web browsers. The invention also optionally provides methods and systems for tracking updates to Web pages.

The invention discloses methods, apparatus, systems and computer program products for overcoming several (or all) of the above described and other problems associating with traditional email communications. According to various embodiments, the invention is directed to an interactive platform with which senders (e.g., organizations) communicate with their customers, employees, prospects, members and audience at large over a network. The network can be any type of network, such as a local area network, a wide area network, a public communications network (such as the internet), and internal company network (such as an intranet), or an external company network (such as an extranet).

According to various embodiments, the invention can be used to serve multiple and discrete senders (e.g., organizations) who in turn can communicate with their own multiple and discrete subscriber bases. For example, a single platform can be used which supports hundreds or thousands of different senders, and supports millions of their subscribers. Thus, the invention is able to serve as a broadcast network, where virtually any sender can craft, manage, and track communications to their subscribers using the invention's tool set and delivery methodologies. In effect, once the invention's desktop utility and personal security key (described in detail below) have been installed by a subscriber, that subscriber can subscribe to and receive communications from any number of authorized senders with that single desktop utility and personal security key.

According to various embodiments, the interactive platform according to the invention is arranged to establish a private, secure, and/or one-on-one communications stream between senders (e.g., organizations) and their customers, employees, prospects, members and audience at large. According to various embodiments, and unlike traditional email (whether using Internet-based or desktop-based applications to view the email), these communications between senders and the recipients do not use the email network or email protocols, and thus are not subject to the constraints, congestion, limitations, and/or legislation of the email network. Moreover, according to various embodiments, unlike traditional emails, permission is undeniable and inviolate. In other words, it is not possible for a sender to transmit communications to recipients who have not downloaded and installed the invention's utility program and security key (described below). Similarly, it is not possible for recipients to receive communications from unauthorized senders. Thus, these communications sent and received through the invention's process can only be sent to legitimate subscribers, and can only be received from legitimate senders. Because these communications can not be sent to non-subscribers or received from unknown senders, ISPs, for example, do not have to process unwanted traffic.

In accordance with various embodiments of the invention, senders of communications are provided a set of campaign management tools that can be used, for example, to create, manage, and send various types of electronic communications (e.g., newsletters, sales bulletins, corporate communications, promotional offers, etc.) to various recipients (e.g., customers, employees, prospects, members and an audience at large). In various embodiments, the invention also provides an apparatus that senders can use to craft online subscription forms which their target audience uses to subscribe to communications and simultaneously grant their permission to receive the communications.

According to various embodiments, the invention also provides an apparatus that facilitates a subscription process, where recipients provide required and optional profile information such as name, email address, phone number etc and agree to receive the communication they are subscribing to. After a recipient completes the online subscription form satisfactorily and submits the form electronically, a personal security key is generated and embedded in a utility program that the recipient downloads and installs on his computer.

According to various embodiments, the invention also provides a process whereby the utility program and personal security key begins communicating with the invention's servers once it is properly installed, and internet connectivity is established. At regular (or otherwise determined) intervals, the utility program polls the servers for new communications that may be available for the recipient from the various senders they may have subscribed to.

According to various embodiments, the invention also provides a process whereby, when a new communication is available, the utility program displays an alert window on the recipient's desktop (the initial screen background on which windows, icons, dialog boxes, etc. appear on a user's computer monitor). The recipient can click on the alert window to view the communication immediately or close the alert to view the communication at a later time. In both cases, the utility optionally updates a data file of all delivered communications, which facilitates the utility's history function so that the recipient can archive his communications.

According to various embodiments, the invention also provides an apparatus whereby alerts can be customized with the sender's graphic logo and header information, such as subject and from fields. Thus, recipients view sender-specific graphics and text in the alerts.

According to various embodiments, the invention also provides a process whereby recipients view their communications in their default Web browser. For example, when the utility program receives a new communication alert, it simultaneously receives an encrypted, recipient-specific URL where the recipient's communication is published. When the recipient elects to view his communication, the utility program opens the recipient's default web browser and loads the recipient's personalized and encrypted URL.

In one implementation of the present invention, a sender (e.g., a business or organization) publishes a subscription form on its Web site for a monthly newsletter consisting of content related to the sender's product or services. Recipients complete and submit the form and then download and install the invention's utility program and personal security key. An entry is created in a database for each recipient and the database entry is utilized to store profile data about the recipient, his communications preferences, and response metrics associated with the recipient. On a regular basis, the sender crafts a communication, alerts the recipient that a new communication is available, delivers an encrypted URL address to the recipient's utility program, and displays a personalized communication in the recipient's default Web browser. Various elements of the recipient's interaction with the communication is recorded and posted to the recipient's database entry. The sender has access to real-time reports to analyze interactions with recipients and overall performance of the communication's campaign.

According to various embodiments, the invention also provides a process whereby, once the recipient has downloaded and installed a utility program and personal security key on his computer, the recipient can subscribe to an unlimited number of senders' electronic communications with the same desktop application and security key.

The invention provides an apparatus, whereby, according to various embodiments, a utility program provides recipients with various subscription management tools, which they can use to manage all aspects of their subscriptions. For example, recipients can use an opt-out tool to remove themselves from a sender's list or to unsubscribe from all lists associated with one or more particular senders. Additionally, for example, recipients can use a pause tool to pause and/or restart delivery of communications, and use other tools to switch delivery of communications to traditional email, update their profile information, and add authorized senders of communications to their "safe senders" list.

The invention provides, in various embodiments, an apparatus whereby senders use the invention's list manager tool to manage all aspects of their subscriptions' lists. A list can be, for example, a database consisting of recipient records with multiple fields of recipient profile information such as name, address, email address, account information, demographic, and communication preferences. Senders can create new lists, modify existing lists, sort and query lists, and creates segments of lists. The invention can also automatically update lists with response data generated from communication campaigns, such as how many times a recipient has received a communication, opened a communication, responded to a communication, and other response statistics that an sender might desire to help evaluate performance and profile the recipient.

According to various embodiments, the invention also provides an apparatus whereby senders use, for example, a message manager tool to create new communications and modify existing communications. Communications are crafted, for example, in HTML format and can include formatted text, images, graphics, links, forms, rich media content such as video and animation. Senders (e.g., organizations) may also be provided, and may use, one or more design wizard tools that assist non-technical users in the creation of sophisticated HTML communications. Communications can include personalized text and images by merging recipient-specific data that exists in an sender's list.

In at least one implementation according to the invention, a sender (e.g., an organization) publishes a subscription form on his Web site for a weekly training video consisting of video content related to the sender's product or services. Recipients complete and submit the form and then download and install the invention's utility program and personal security key. An entry is created in a database for each recipient and the database entry is utilized to store profile data about the recipient, his communications preferences, and response metrics associated with the recipient. On a weekly basis, the sender crafts a video communication, alerts the recipient that a new communication is available, delivers an encrypted URL address to the recipient's utility program, and displays a personalized video communication in the recipient's default Web browser. Various elements of the recipient's interaction with the communication is recorded and posted to the recipient's database entry. The sender has access to real-time reports to analyze interactions with recipients and overall performance of the communication's campaign.

According to various embodiments, the invention also provides an apparatus whereby senders use one or more campaign management tools to specify a date and time for a particular communication to be sent to a specific list of recipients. For example, during the campaign administration process, senders may specify information that appears at the top of the communication as header and in the alert that appears on the recipients' desktop when a new communication is available. This information may include, for example, a subject line, the sender representative's name and reply-to email field.

According to various embodiments, the invention also provides an apparatus whereby senders use a set of reporting tools to record and track various aspects of a communication campaigns performance down to the recipient level. Senders can view and export report data in real time. Report data includes, but is not limited to, the following key metrics: campaign delivery date and time, number of recipients, number of deliveries, number of "opens" (how many recipients opened the communication), number of "clickthroughs" (how many recipients clicked on one or more links in the communication), number of specific "clickthroughs" (how many recipients clicked on a specific link in the communication), which operating systems and browsers recipients use, and a variety other response metrics.

According to various embodiments, the invention also provides an apparatus whereby senders utilize the invention to alert recipients when a specific Web page has been updated. Recipients use an online form to subscribe to a particular Web page notification list. When the web page has been updated, the recipient is alerted by the utility program. Alerts can be triggered manually by the web page owner or automatically by utilizing the invention's process of scanning web pages and recognizing when web page content has changed. Recipients can click on the alert, which is generated by the utility program to visit the updated Web page immediately. Alternatively, recipients can elect to archive the alert in the invention's history function and visit the web page at a later date.

According to various embodiments, the invention also provides an apparatus that facilitates a subscription process to a particular Web page, where recipients provide required and optional profile information such as name, email address, phone number etc. and agree to receive the alerts when the web page they are subscribing to has been updated. After completing the online subscription form satisfactorily and submitting the form electronically, a personal security key is generated and embedded in a utility program that the recipient downloads and installs on his computer.

According to various embodiments, the invention also provides a process whereby the utility program and personal security key begins communicating with the invention's servers once it is properly installed, and internet connectivity is established. At regular intervals, the utility program polls the servers for new alert communications for the subscriber indicating that one or more subscribed-to Web pages have been updated.

The invention also provides, according to various embodiments, a process whereby, when a Web page has been updated, the utility program displays an alert window on the recipient's desktop. The recipient can click on the alert window to view the Web page immediately or close the alert to view the Web page at a later time. In both cases, the utility program updates a data file of all delivered communications, which facilitates the utility program's history function so that the recipient can archive his alert communications.

According to various embodiments, a process is provided whereby a recipient can route traditional email communication to his utility program and then view the communication as a Web page rather than as an email. This empowers recipients to divert all of their permission communications, away from their traditional email reader and inbox, to their utility program to avoid inbox clutter, SPAM filtering and blocking.

The invention also provides, according to various embodiments, a process whereby recipients are assigned an email address (or other unique identifier) which they use when subscribing to various communications lists. A recipient adds the Internet domain of all subscribed-to senders to an authorized sender list in his utility program. When an electronic communication is sent to the recipient (using the assigned email address or other unique identifier), it is received by the invention's server and the domain of the sender is checked against the authorized sender list. If the domain does not appear on the list, the electronic communication is deleted and not delivered to the recipient. If the domain appears on the authorized sender's list, the electronic communication is then converted into a Web page and published to an encrypted URL which can only be viewed by the recipient. The recipient is sent an alert and can view the communication immediately or at a later date using the history function of the utility program. The recipient views the communication as a Web page.

The principles of the present invention can be used to overcome some (or all) of the hurdles associated with traditional email delivery to provide legitimate senders with a vastly improved methodology for communicating with recipients (e.g., their customers, prospects, trade and employees, etc.). For example, communications delivered in accordance with the invention are not delivered through the email network nor are they delivered to a recipient's email reader "inbox" and thus are not affected by SPAM or the myriad emails commonly found in a person's inbox. Additionally, communications delivered in accordance with the invention are not delivered through the email network, and thus, can not be blocked by third parties provided the recipient has installed his utility program, which communicates directly with the invention's servers. Similarly, because communications according to the invention are not delivered through the email network, they can not be blacklisted by third parties.

Moreover, in accordance with the invention, because communications are not delivered through the email network and are presented as Web pages, they are not generally subject to the technical and creative limitations of email or email SPAM filters. Similarly, the communications presented as Web pages generally can not be stripped or otherwise adulterated by third parties.

Email reader compatibility issues are also at least partially overcome by the present invention. In particular, because communications delivered by the invention are not delivered through the email network or delivered to an email reader inbox, but rather are presented as Web pages, they are compatible with all Web browsers and are generally not affected by email reader compatibility issues. Moreover, communications presented as Web pages according to the invention are generally also fully compatible with rich media such as video, audio and animation.

In addition, because communications delivered in accordance with various embodiments of the present invention can only be delivered to recipients who have downloaded and installed a utility program and personal security key wherein permission to receive communications is inviolate and undeniable, there are minimal abuse complaints to be managed.

Communications delivered by the invention are not delivered through the email network, nor are they delivered to an email address, and thus, the communications can not "bounce." In addition, because they are delivered as personalized Web pages, reporting is web-centric (or web-based) and significantly more precise than email reporting. Furthermore, communications delivered by the invention do not travel through the email network nor suffer delays commonplace within the email network. Further, as the communication is published as a Web page and only an alert and encrypted URL is sent along with the alert, the delivery process is significantly faster than email delivery of communications containing equal amounts of text and image elements.

As another improvement, because communications delivered by the invention are not delivered through the email network, they are generally not impacted or affected in any way by federal, civil or ISP Acceptable Use Policies. Thus, there is generally no requirement for Anti-Spam compliance.

In one embodiment, the invention provides a method for providing an electronic communication from a sender to a recipient, where the method comprises the steps of storing the electronic communication, providing the recipient with an indication that the electronic communication is available, and providing the stored electronic communication to the recipient based on a request by the recipient.

In another embodiment, the invention provides an electronic communication center that receives an electronic communication, that stores the electronic communication, that provides the intended recipient of the electronic communication with an indication that the electronic communication is available, and that provides the electronic communication to the recipient based on a request by the recipient to retrieve the electronic communication.

In yet another embodiment, the invention provides a method for providing an electronic communication from a sender to a recipient, where the method includes the steps of indicating, by the recipient, that the sender is permitted to provide the electronic communication to the recipient, storing the electronic communication, providing the recipient with an indication that the electronic communication is available, where the indication includes location information relating to the location of the stored electronic communication, and retrieving the electronic communication, by the recipient, using location information provided with the indication.

In still another embodiment, the invention provides a method for providing an electronic communication to a recipient, where the method includes the steps of receiving information associated with the generation of the electronic communication, determining whether the recipient has granted permission to receive the electronic communication, providing the recipient with an indication that the electronic communication is available only if the recipient has granted permission to receive the electronic communication, wherein the indication includes location information relating to the location of the electronic communication, and providing the electronic communication to the recipient based on a request by the recipient to be provided by the electronic communication.

In another embodiment, the invention provides a method for receiving an electronic communication by a recipient, where the method includes the steps granting permission, by the recipient, to receive the electronic communication, receiving an indication that the electronic communication is available, where the indication provides location information relating to the location of the electronic communication, and retrieving the electronic communication by the recipient using the location information provided with the indication.

In yet another embodiment, the invention provides a communications system that is adapted to provide an electronic communication to a recipient, where the system includes one or more servers that are accessible using a network connection, where the one or more servers are configured to receive information associated with the generation of the electronic communication, and are configured to determine whether the recipient has granted permission to receive the electronic communication, and a utility program that is associated with the recipient and that provides the recipient with an indication that the electronic communication is available only if the recipient has granted permission to receive the electronic communication, wherein the recipient retrieves the electronic communication using location information included in the indication that was provided to the recipient.

According to another embodiment, the invention provides a method for providing an indication to a recipient when a Web page has been updated, where the method includes the steps of receiving a request to monitor the Web page for updates, detecting an update in the Web page, and providing the recipient with an indication that the Web page has been updated, wherein the indication includes location information relating to the location of the updated Web page.

According to another embodiment, the invention provides a method for providing an electronic communication to a recipient, where the method includes the steps of receiving, from a sender, information associated with the generation of the electronic communication, generating the electronic communication as a Web page based at least in part on the information received from the sender, publishing the Web page on a server that is accessible by the recipient using a network connection, providing the recipient with an indication that the electronic communication is available as a published Web page, wherein the indication includes location information relating to the location of the published Web page, and providing the published Web page to the recipient, using the location information, following a request by the recipient to receive the electronic communication. In alternate embodiments, this method further includes the steps of generating a second electronic communication as a second Web page based at least in part on the information received from the sender, publishing the second Web page on a server that is accessible by a second recipient using a network connection, providing the second recipient with a second indication that the electronic communication is available, wherein the second indication includes location information relating to the location of the published Web page, and providing the published Web page to the second recipient, using the location information, following a request by the second recipient to receive the electronic communication.

According to another embodiments, the invention provides a method for providing electronic communications to a plurality of recipients, where the method includes the steps of receiving, from a sender, information associated with the generation of the electronic communications, generating personalized first and second electronic communications respectively intended for a first recipient and a second recipient, wherein the first electronic communication is based at least in part on the information received from the sender and at least in part on information previously provided by the first recipient, and wherein the second electronic communication is based at least in part on the information received from the sender and at least in part on information previously provided by the second recipient, providing to the first recipient, without the use of an email protocol, a first indication that the first electronic communication is available, wherein the first indication includes location information relating to the location of the first electronic communication, and providing to the second recipient, without the use of an email protocol, a second indication that the second electronic communication is available, wherein the second indication includes location information relating to the location of the second electronic communication. According to alternate embodiments, this method further includes the steps of providing the first electronic communication to the first recipient based on a request by the first recipient to receive the first electronic communication, and providing the second electronic communication to the second recipient based on a request by the second recipient to receive the second electronic communication.

According to yet another embodiment, the invention provides a method for providing an electronic communication to a recipient, where the method includes the steps of receiving, by a server, information that is associated with the generation of the electronic communication, wherein the received information is provided by a sender and the server is accessible by the recipient using a network connection, generating the electronic communication based at least in part on the information received from the sender, wherein the electronic communication is at least temporarily stored on the server, determining, by the server, whether the recipient has granted permission to receive the electronic communication before the server attempts to send or otherwise make any information associated with the electronic communication available to the recipient, providing to a utility program associated with the recipient an indication that the electronic communication is available after it has been generated, wherein the indication is only provided if the recipient has granted permission to receive the electronic communication, and wherein the indication includes location information relating to the location of the electronic communication, and providing the electronic communication to the recipient, using the location information, following a request by the recipient to receive the electronic communication.

In another embodiment, the invention provides an electronic communications system for providing an electronic communication to a recipient, where the system includes a server that is accessible by the recipient using a network connection, wherein the server is configured to receive information associated with the generation of the electronic communication and to at least temporarily store the electronic communication once it is generated, wherein the server is configured to determine whether the recipient has granted permission to receive the electronic communication and to send or otherwise make any information associated with the electronic communication available to the recipient only after it is determined that the recipient has granted permission to receive the electronic communication, and the system also includes a utility program that is associated with the recipient and that provides the recipient with an indication that the electronic communication is available only if the recipient has granted permission to receive the electronic communication, wherein the recipient is able to retrieve the electronic communication using location information included in the indication that was provided to the recipient.

According to still another embodiment, the invention provides a method for providing an indication to a recipient when a Web page has been updated, where the method includes the steps of receiving a request to monitor the Web page for updates, detecting an update in the Web page, and providing the recipient with an indication that the Web page has been updated, wherein the indication includes location information relating to the location of the updated Web page. According to alternate embodiments, this method also includes the step of providing the updated Web page to the recipient (e.g., by opening the Web page in a Web browser operated by the recipient using the location information provided with the indication) based on a request by the recipient to retrieve the updated Web page. According to alternate embodiments, the method also includes the step of indicating to the recipient one or more portions of the updated Web page that have been updated.

BRIEF DESCRIPTION OF THE DRAWINGS

Additional embodiments of the invention, its nature and various advantages, will be more apparent upon consideration of the following detailed description, taken in conjunction with the accompanying drawings, in which like reference characters refer to like parts throughout, and in which:

FIG. 5B shows an opt-in form that a recipient can use in order to subscribe to communications from a particular sender in accordance with at least one embodiment of the present invention;

FIG. 5C shows an opt-in form that a recipient can use in order to subscribe to communications from one or more particular senders in accordance with at least one embodiment of the present invention;

FIG. 8E shows another list manager tool window that can be used by a sender to view and/or modify one or more mailing lists in accordance with at least one embodiment of the present invention;

FIG. 8G shows another message manager tool window that can be used by a sender in viewing existing communications or crafting a new communication to be made available for one or more recipients in accordance with at least one embodiment of the present invention;

FIG. 8H shows a design wizard tool window that can be used by a sender in viewing existing communications or crafting a new communication using a template wizard in accordance with at least one embodiment of the present invention;

FIG. 9A shows a campaign report that a sender of communications can be provided in accordance with at least one embodiment of the present invention;

FIG. 11 shows a report that can be provided to an owner of a Web page that is being monitored in accordance with at least one embodiment of the present invention.

DETAILED DESCRIPTION OF THE INVENTION

In the following description, numerous specific details are set forth regarding the system and method of the present invention and the environment in which the system and method may operate, etc., in order to provide a thorough understanding of the present invention. It will be apparent to one skilled in the art, however, that the present invention may be practiced without such specific details. Moreover, it will be understood that certain features which are well known in the art are not described in great detail in order to avoid complication of the subject matter of the present invention. It should also be understood that these examples are exemplary, and that it is contemplated that there are other systems and methods that are within the scope of the present invention. For example, features in one embodiment described herein may be combined with features in other embodiments described herein without departing from the principles of the present invention.

Generally speaking, the present invention is directed to methods and systems for producing, managing, delivering, retrieving, and/or tracking permission based communications that alleviate several of the existing problems commonly associated with traditional email communications. According to various embodiments, as explained in greater detail below, direct electronic communication between senders and recipients (e.g., communication not requiring the use of a traditional email network) is accomplished using a Permission Messaging Platform (PMP) utility program and personal security key, or other standard security mechanisms, installed on the recipients' computers, one or more PMP servers, and traditional Web browsers.

Figure 1:
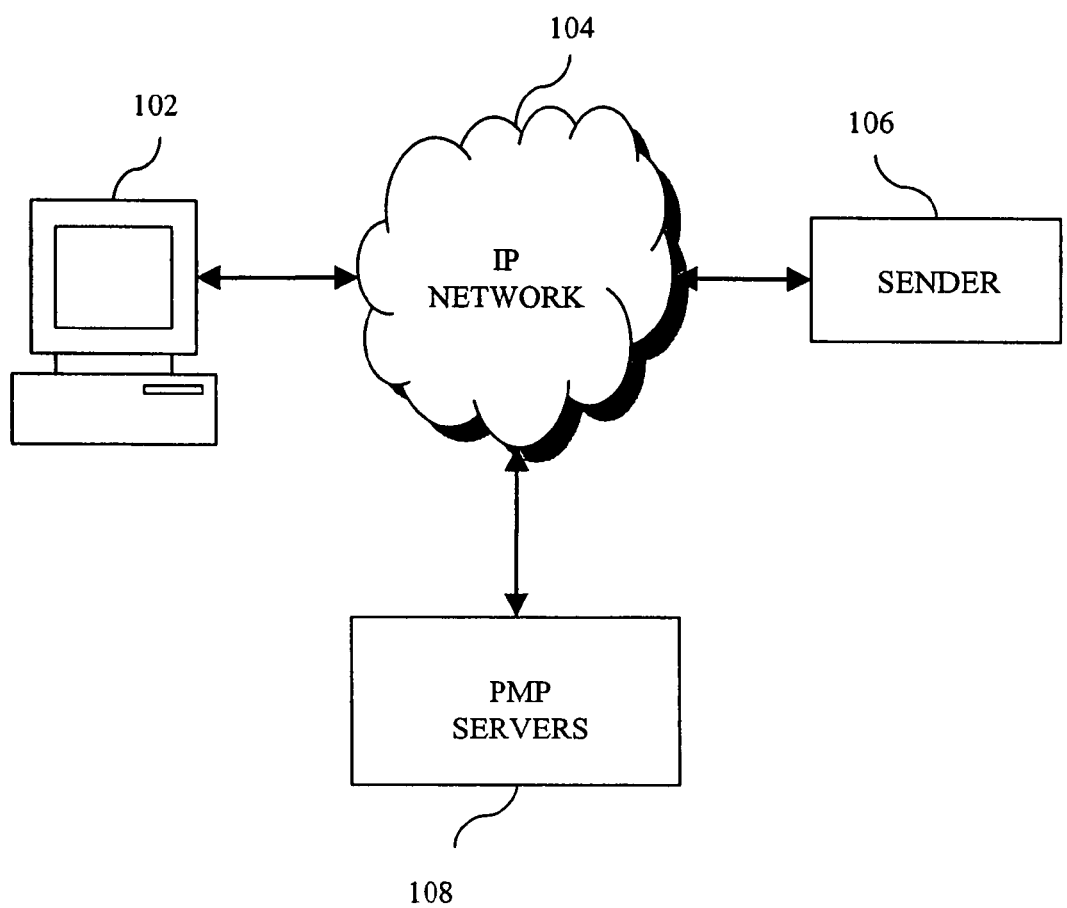
FIG. 1 is a simplified illustration showing a communications system through which direct electronic communications can be transmitted in accordance with at least one embodiment of the present invention.

FIG. 1 is a simplified illustration showing a communications system 100 through which direct electronic communications can be transmitted in accordance with the principles of the present invention. It will be understood that, as discussed herein, a recipient (or subscriber) may be any individual, organization, or other entity that receives electronic communications, while a sender may be any individual, organization, or other entity that sends electronic communications. For example, the recipient may be a potential customer that requests to join an electronic mailing list of a company that provides a particular service. Alternatively, for example, the recipient and the sender may be co-workers that wish to send direct electronic communications to each other in accordance with the present invention. Accordingly, it should be understood that the invention is not limited by the type of recipient or sender. Moreover, it should also be understood that the invention is not limited by the type or content of the permission communications being sent from the sender to the recipient. For example, the present invention may be used by an organization to disseminate newsletters, sales bulletins, pricing schedules, image galleries, promotional offers, corporate communications, video messages, interactive software, and other similar electronic communications to recipients, as long as the recipients have consented to receive such communications (whether explicitly, or, for example, by virtue of their employment). Thus, although not required, the permission communications being sent in accordance with the present invention may be broadcast communications intended to reach a large subscriber base.

As shown, communications system 100 includes a computer 102 that is connected by a communication link (physical or wireless) to an IP network 104. Computer 102 may be any device through which a recipient of electronic communications can receive and view electronic communications in accordance with the invention. For example, computer 102 may be a laptop or other personal computer, a mobile (cellular) telephone, a personal digital assistant (PDA), a fax machine, a printer, or any other type of computing device that is capable of using a Web browser program (e.g., Internet Explorer® or Netscape Navigator®) or a similar program, and that is capable of installing a PMP utility program (or a similar program) according to the invention. IP network 104, on the other hand, may be any suitable type of IP network. For example, IP network 104 may be the Internet, a local area network, a wide area network, a public communications network other than the Internet, an internal company network (e.g., an intranet), an external company network (e.g., an extranet), and the like.

Communications network 100 also includes a sender 106 and PMP servers 108, both of which are also connected to IP network 104 (e.g., the Internet). In accordance with a "BrowserMail" application described in greater detail below, using PMP servers 108, sender 106 is able send electronic communications in accordance with the invention to one or more recipients, such as the recipient using computer 102.

Figure 2:
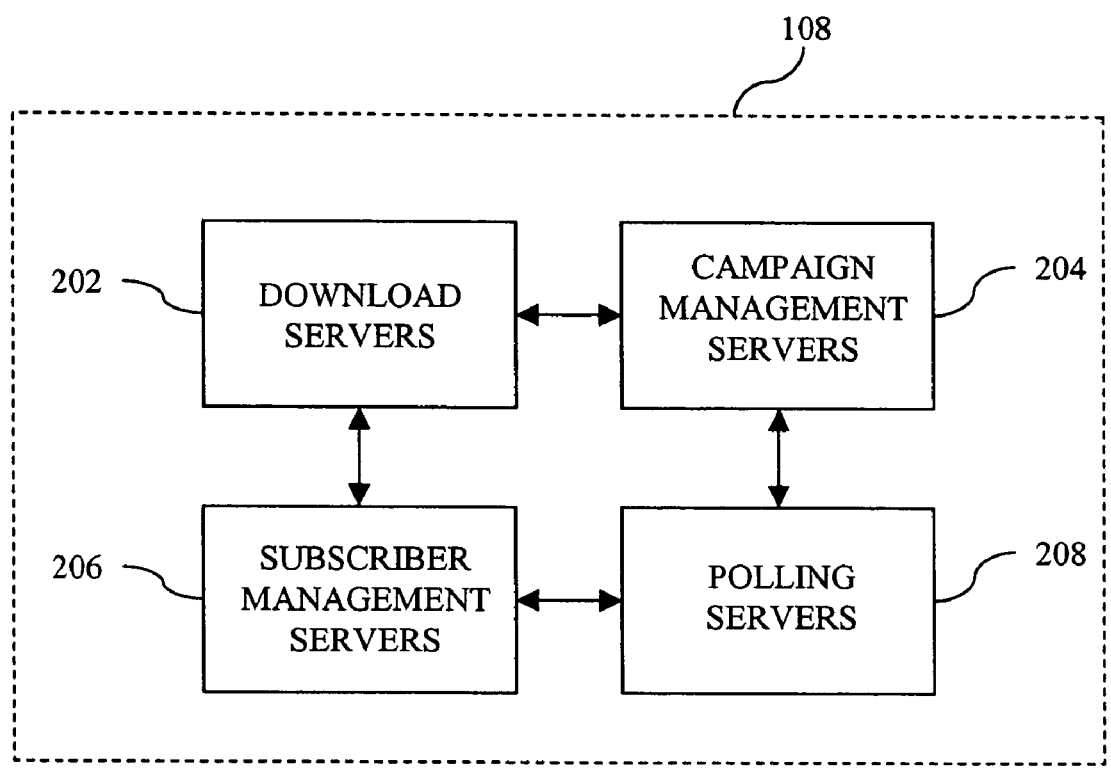
FIG. 2 is a more detailed, but still simplified illustration showing the servers of FIG. 1 in accordance with at least one embodiment of the present invention.

Although it is shown in FIG. 1 as a single box, PMP servers 108 may include different groups of servers that perform different functions. For example, as shown in FIG. 2, PMP servers 108 may include download servers 202, campaign management servers 204, subscriber management servers 206, and polling servers 208. In this case, utility download servers 202 provide and manage the PMP utility program that is used by recipients of electronic communications according to the invention. Campaign management servers 204, on the other hand, host and manage the various administrative tools used by senders as explained below (e.g., the tools used in creating electronic communications, managing lists, controlling campaign, tracking and reporting, managing accounts and billing, etc.). Subscriber management servers 206, meanwhile, host and manage the various subscription management tools, which, as explained below, can be used by recipients to opt-in and/or opt-out of receiving certain (or all) private communications, to modify subscriber preferences, to manage their subscribed-to lists, and so on. Finally, polling servers 208 receive and manage the private communications with recipients that result in the recipients being provided with new message alerts (and corresponding encrypted URLs) as is described in greater detail below. Software updates can also be managed by polling servers 208. It will be understood that FIG. 2 merely shows one example of the different types of PMP servers that can be used in accordance with the invention, and that the invention is not limited in this manner. Regardless of how many PMP servers are being used for a particular function, their particular types, or their location, for the sake of simplicity, they will be referred to below simply as "PMP servers." Moreover, regardless of the type or number of servers being used, it is noted that communications according to the invention are preferably (although not necessarily) based on a distributed and highly available architecture, scalable, for example, to handle hundreds of millions of messages and hundreds of thousands of clients.

Figure 3:
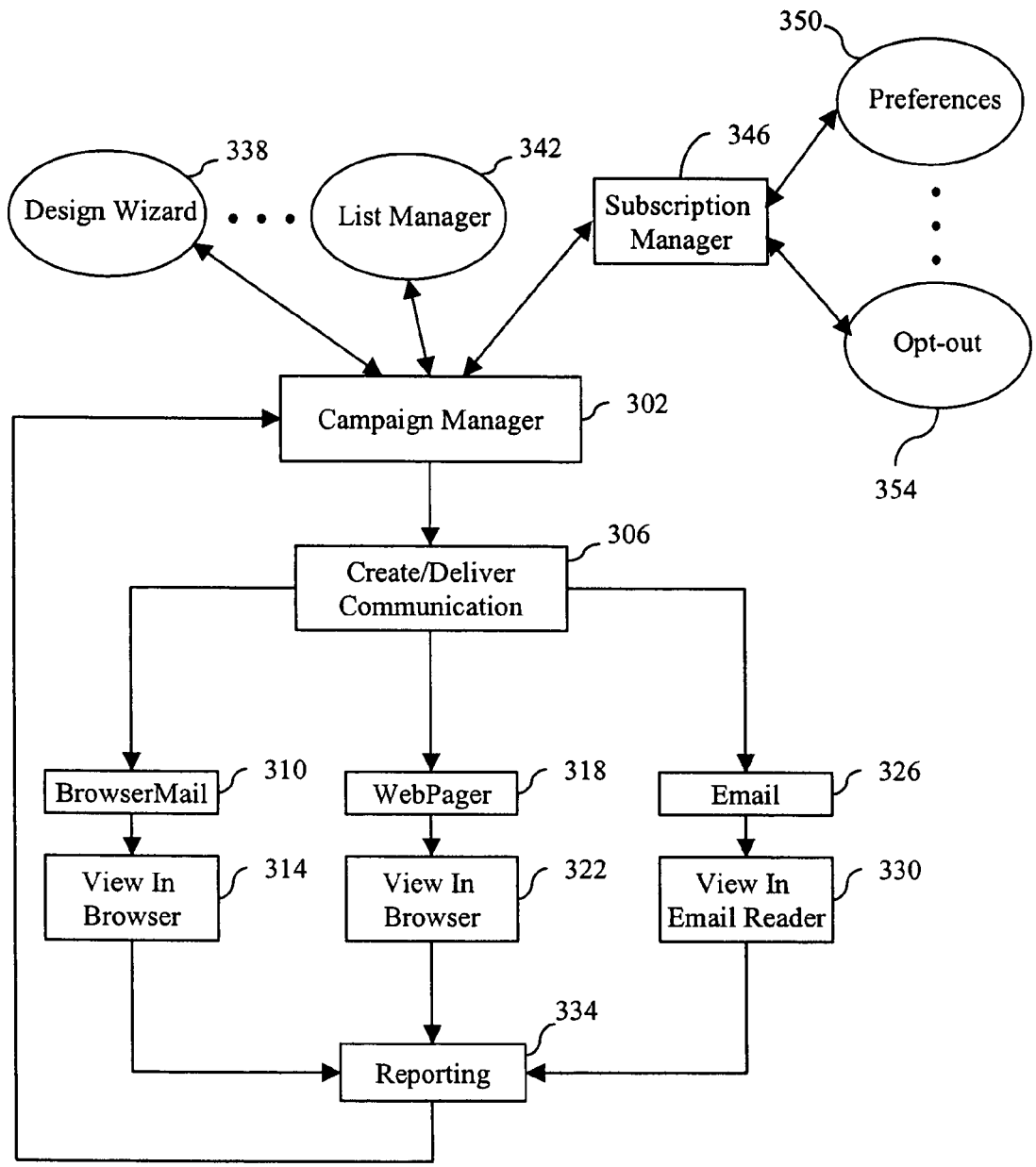
FIG. 3 is a simplified illustration showing three alternate modes of sending and receiving electronic communications in accordance with at least one embodiment of the present invention.

FIG. 3 is a simplified illustration showing three alternate modes of sending and receiving electronic communications in accordance with the invention. Campaign manager 302 is used to establish an electronic communications campaign using various aspects of the present invention described in detail below. Upon the creation and delivery 306 of an electronic communication, advantageously one of three optional delivery methods is used. According to the first method, the BrowserMail application 310 described herein is used to enable a recipient to view a received communication using his Web browser 314. It is noted that electronic communications sent and received in accordance with the BrowserMail application of the invention are also referred to herein as "direct communications" or "BrowserMail communications." According to the second method, the WebPager application 318 described herein (following the description of the BrowserMail application) is used to enable a recipient to receive an update alert and to view an updated Web page or Web site using his Web browser 322. Finally, according to the third method, a traditional email application 326 is used to enable a recipient to view a received email (in an inbox) using his email reader 330.

In order to more effectively manage the communications campaign, as shown in FIG. 3, various characteristics relating to the electronic communications sent using one of the three methods is reported 334 back to campaign manager 302. As also shown in FIG. 3, according to various embodiments, campaign manager 302 has access to a design wizard tool 338, a list manager tool 342, and other types of sender tools (such as those described below). A subscription manager 346 is also used, through which a recipient is able to modify his communications preferences 350, opt-out 354 of receiving certain (or all) electronic communications, and so on.

The "BrowserMail" application of the present invention, through which direct (BrowserMail) communications can be sent from a sender to a recipient, is now explained in greater detail. It will be appreciated that, according to various embodiments of the invention described below, BrowserMail delivery methods bypass the email network, and are thus able to overcome some (or all) of the critical problems associated with traditional email delivery. The same is true of communications (e.g., alerts) sent in accordance with the WebPager application of the invention which is also described below.

Figure 4:
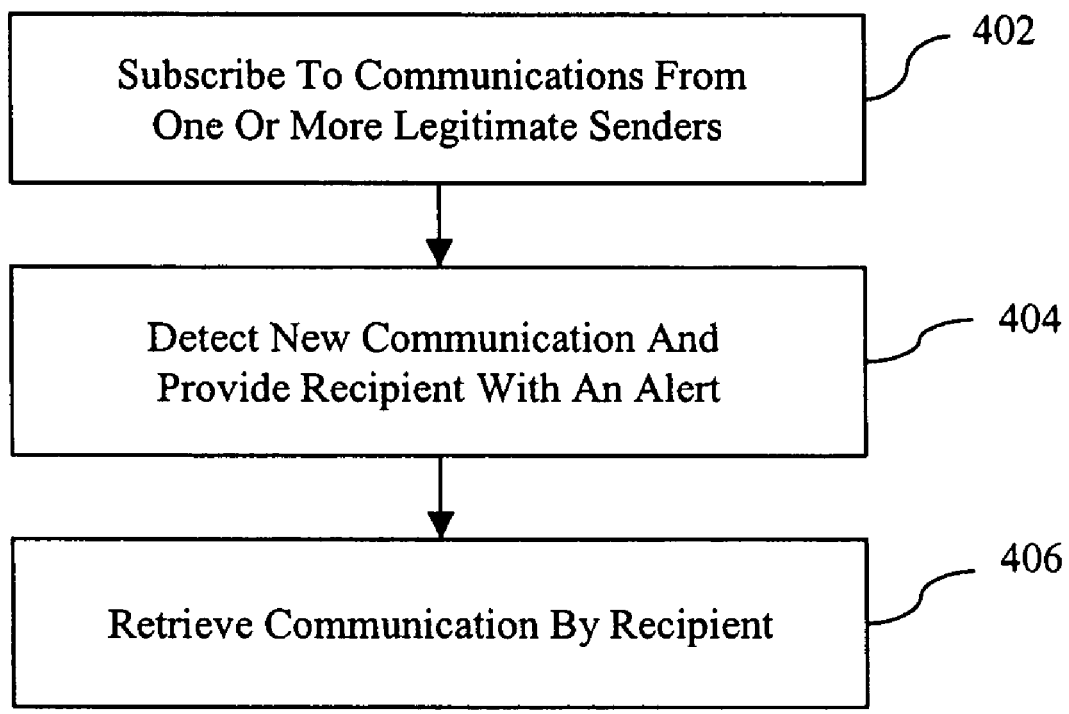
FIG. 4 shows a simplified flow chart illustrating several of the steps involved in the receipt of an electronic communication in accordance with at least one embodiment of the present invention.

FIG. 4 shows a simplified flow chart illustrating several of the steps involved in the receipt of BrowserMail communication in accordance with various embodiments of the present invention. In the first step (step 402), a recipient first subscribes to electronic communications from one or more senders. When the invention is used to send both traditional emails and BrowserMail communications, at this step, the recipient optionally also indicates whether traditional emails and/or BrowserMail communications are desired. It is noted that, depending on the manner in which a recipient selects senders from which to receive communications, the recipient may be simultaneously agreeing (granting permission) to receive the communication(s) being subscribed to. Alternatively, for example, the recipient may be asked to check a box next to a statement that explicitly grants such permission, or may be asked to complete and submit a separate form specifically for the purpose of granting permission to the sender(s). Additionally, for example, when the recipient is an employee and the sender is the employer, the computer to be used by the recipient in the workplace may be pre-configured (and thus the recipient is already subscribed) to receive all electronic communications sent by the employer in accordance with the invention.

Next, in step 404, a new BrowserMail communication in accordance with the invention is detected, and an indicator or alert is provided to the recipient informing him of the fact that a new communication is available for retrieval from the PMP servers that are being used to host BrowserMail communications sent by legitimate senders.

Finally, in step 406, the BrowserMail communication is retrieved (viewed) by the recipient using his Web browser. According to various embodiments, when the Web browser already has at least one window already running on the recipient's computer, the communication may be displayed in one of these windows. Alternatively, a new Web browser window may be opened, so that the pre-existing windows are not interfered with. If no Web browser window is running when the BrowserMail communication is to be retrieved, one is opened by the computer and the communication is presented on that Web browser window.

It is noted that, while many (or most) BrowserMail communications received by a recipient will be available for retrieval without any financial cost to the recipient, this will not necessarily be the case. For example, a BrowserMail communication can be sent in accordance with the invention that includes an image, movie clip, audio clip, or other type of element that must be purchased (or rented) before the entire communication can be retrieved by the recipient. In this case, a recipient of such a communication can either elect not to view the communication (or the non-free portion thereof). Alternatively, the recipient can provide payment (e.g., credit card) information or provide permission (explicitly or implicitly) to bill a previously established financial account with the PMP servers. The invention is not limited in this manner.

Figure 5A:
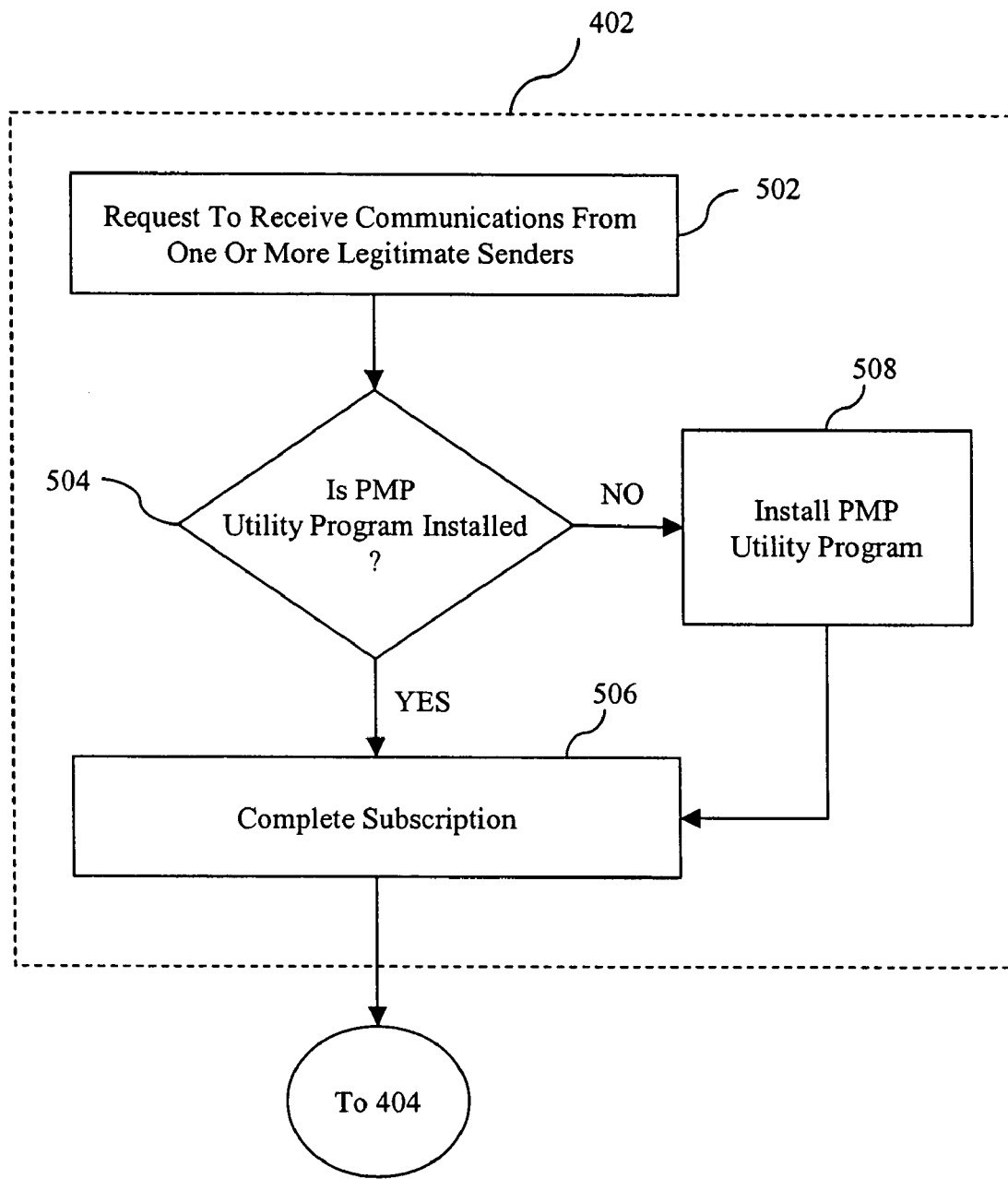
FIG. 5A is a more detailed flow chart of a step depicted in FIG. 4 in accordance with at least one embodiment of the present invention.

FIG. 5A shows a more detailed, but still simplified flow chart corresponding to step 402 described above. In order to subscribe to electronic communications from one or more senders, in step 502, a recipient requests to receive electronic communications in accordance with the invention in any of a number of different ways. For example, a subscription request may be submitted by a recipient "opt-in," such as by completing an online subscription form directly on a Web page of a sender, during which process the recipient provides the sender and/or the PMP servers personal information such as name, email address (or other unique identifier), and phone number. FIG. 5B shows one example of an opt-in form 512 that a recipient can use in order to subscribe to communications from a particular sender.

According to various other embodiments, a recipient may be provided in a single Web site or Web page a partial or complete list of senders that send permission communications in accordance with the invention. In this case, for example, the recipient can request one or more subscriptions by indicating on a single form the sender(s) on the list from which permission communications are desired. FIG. 5C shows one example of an opt-in form 514 that a recipient can use in order to subscribe to communications from more than one sender. Although not shown in FIG. 5C, it will be understood that a recipient may subscribe to certain communications from a particular sender, without subscribing to all communications from that sender.

It will be understood that the invention is not limited by the particular manner in which a recipient requests to receive electronic communications from one or more senders. For example, in the case of a sender (e.g., a co-worker) that does not maintain its own Web page for an online opt-in form, the recipient can manually update (e.g., by providing a sender email address or other type of identifying information) an authorized sender list associated with the recipient in order to grant the sender permission to send him electronic communications in accordance with the invention.

Referring back to FIG. 5A, after one or more requests (e.g., via an online subscription form) have been submitted, in step 504, it is determined whether the recipient has a PMP utility program and a personal security key. Although not required, according to various embodiments, the personal security key will be generated by the PMP utility program.

If it is determined at step 504 that a PMP utility program and personal security key are installed on the recipient's computer, the subscription process is completed at step 506. For example, at step 506, the Internet domain of all subscribed-to senders can be added to the recipient's authorized sender list, which is typically stored and maintained by the PMP servers. Thus, when a communication is sent to the assigned email address (or other unique identifier) of the recipient and received by the PMP servers, the domain of the sender is be checked against the authorized sender list. If the domain does not appear on the list, the communication is deleted and an alert informing the recipient that a new message is available for viewing is not delivered to the recipient. However, if the domain does appear on the list of authorized senders, the communication is converted into a Web page (if it was not one already) and published to the PMP servers for the recipient to retrieve. According to alternate embodiments, the Web page may be created before checking the domain of the sender against the authorized sender list, and then deleted if it does not appear on the list of authorized senders.

If it is determined at step 504 that a PMP utility program is not installed, at step 508, a PMP utility program is downloaded by the recipient and installed to his computer, and a personal security key is generated by the PMP utility program. According to various (but not all) embodiments, at step 508, the recipient's computer is checked for previously installed versions before the PMP utility program is installed, and the installation (and key generation) proceeds appropriately based on the findings. In addition, at step 508, the utility program is loaded, for example, into the computer's System Tray or systray, generally in the lower right corner of the computer screen upon successful installation on the recipient's computer. Then, the subscription process is completed (step 506) by adding the Internet domain of all subscribed-to senders to the recipient's authorized sender list, which, as explained above, is typically stored and maintained by the PMP servers.

According to various embodiments, the PMP utility program described herein is a WINDOWS application written in C++, although the invention is not limited in this manner. Moreover, after the PMP utility program has been successfully installed, the recipient is optionally sent a confirmation email or BrowserMail communication relating to the installation, which can be used to request that the recipient verify certain information prior to changing the recipient's status from pending to active. Other methods of activating the recipient are also contemplated. Moreover, it is noted that, while a security key will generally be available (installed) on the recipient's computer when a utility program is installed (because it is automatically generated at or after the time of installation), this is not necessarily the case. In the event that a previously generated security key has been corrupted, deleted, or otherwise made unusable, a new security key is obtained in accordance with the invention with or without reinstallation of the PMP utility program.

It should also be noted that, according to various embodiments, each PMP utility program that is installed on a recipient's computer will carry a unique identification number, or "unique ID," that can be used to identify and verify the recipient in communications with the PMP servers. In general, once the recipient has downloaded and installed the PMP utility program and personal security key on his computer, the recipient can subscribe to an unlimited number of senders' electronic communications with the same PMP utility program and security key (e.g., using online subscription forms as described above). Moreover, it is contemplated that at least some recipients will be associated with more than one utility program installation and security key, for example, when a home computer and an office computer are both configured to receive BrowserMail communications in accordance with the invention.

Figure 6A:
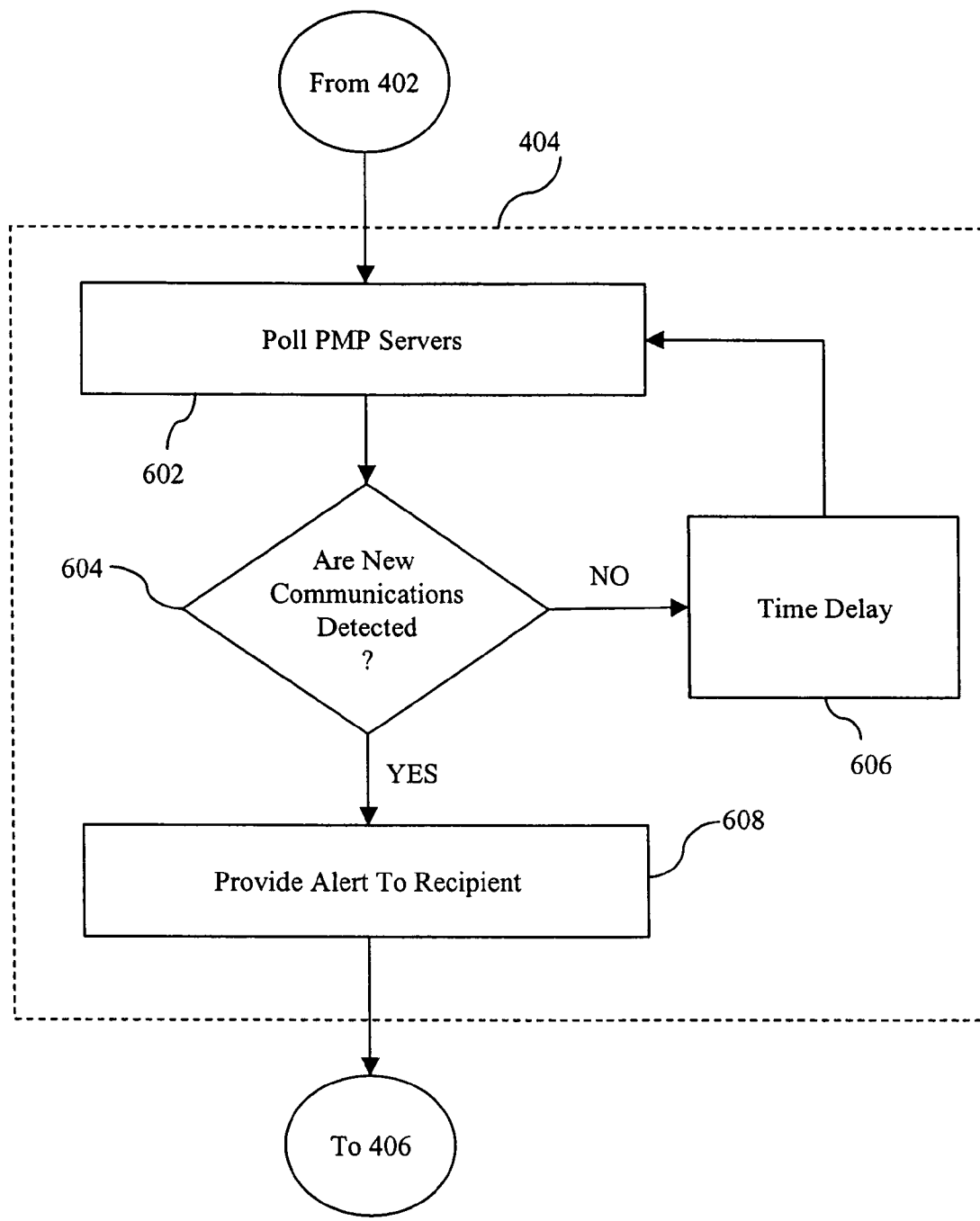
FIG. 6A is a more detailed flow chart of a step depicted in FIG. 4 in accordance with at least one embodiment of the present invention.

FIG. 6A shows a more detailed, but still simplified flow chart corresponding to step 404 described above. In order to detect and alert the recipient to the existence of new BrowserMail communications that are available for the recipient from the various legitimate senders he has subscribed to, at step 602, an Internet or other type of network connection is used by the recipient's computer to poll the PMP servers. According to various embodiments, this process involves transmitting a unique ID of the recipient's PMP utility program to the PMP servers to detect new messages associated therewith. Other methods for checking for new messages can also be used.

If it is determined at step 604 that there are no new communications available for the recipient, at step 606, a certain amount of time is allowed to pass before the process returns to step 602 (at which point, the PMP servers are once again polled for new messages). If it is determined at step 604 that there is at least one new communication available for the recipient, at step 608, an alert window (or another type of indicator) is displayed on the recipient's computer monitor. This alert window may be customized by the recipient and/or the sender, and may include, for example, a graphic logo and header information (e.g., subject, date, and/or from fields) selected by the sender, and/or one or more advertisements (e.g., for a product being offered for sale by the sender of the BrowserMail communication).

Figure 6B:
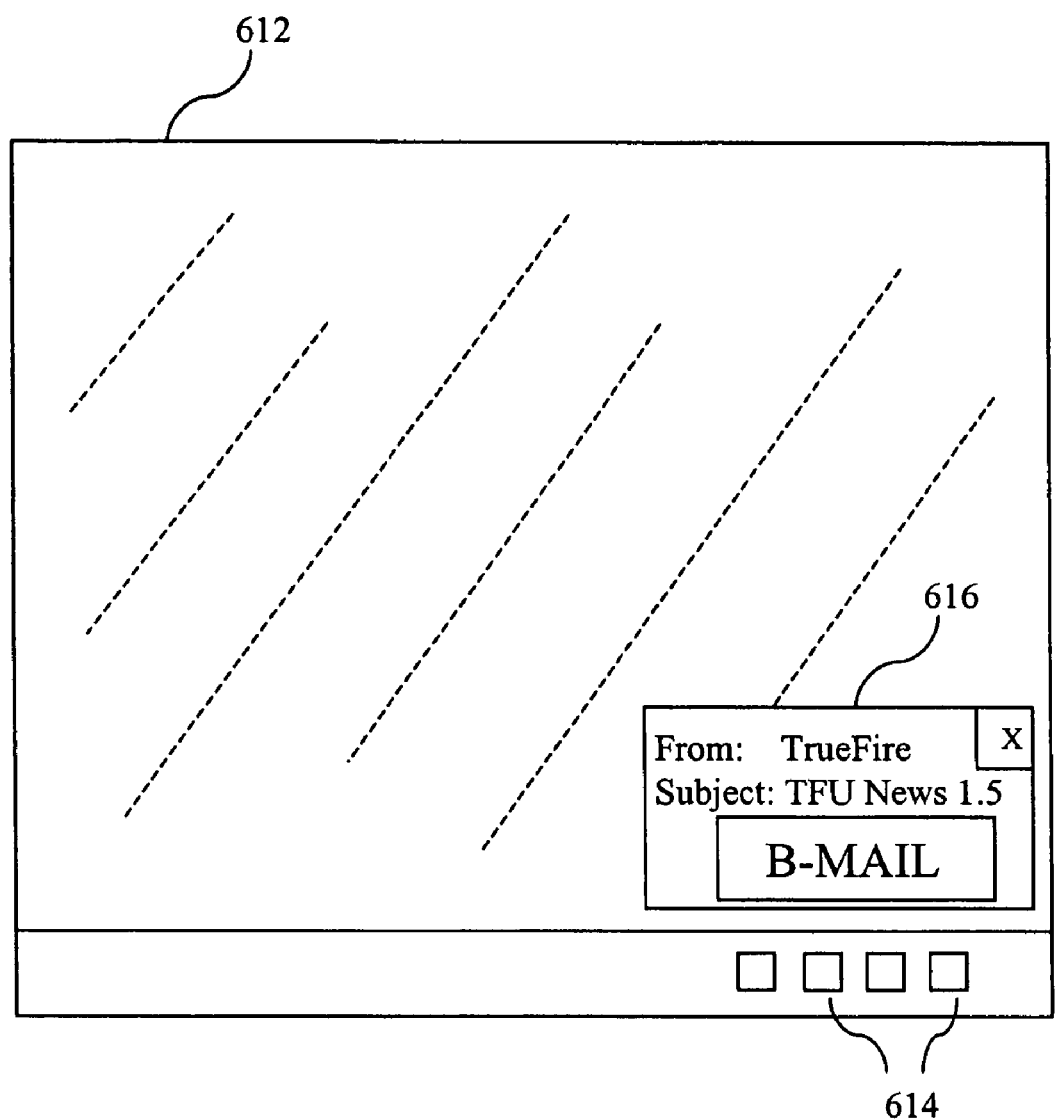
FIG. 6B shows an alert window that a recipient can receive when a new communication is available for retrieval in accordance with at least one embodiment of the present invention.

FIG. 6B shows one example of a computer monitor image 612 including System Tray icons 614 when an alert window 616 is provided to the recipient. As shown, alert window 616 includes a "From" and "Subject" line, a logo, and a button that can be used to close it. Other types of window alerts are also contemplated.

Moreover, although not shown, the alert (e.g., the alert window shown in FIG. 6B) provided to the recipient advantageously and optionally includes location information (e.g., an encrypted or plaintext URL) that indicates where in the PMP servers the BrowserMail communication is published (e.g., what IP address). Thus, the alert and the embedded URL can be used by the recipient to retrieve the communication. It is noted that, when it is the same BrowserMail communication being sent to all recipients by a sender, the URL may direct recipients to the same published communication. However, when it is not the same communication being sent to all recipients, the URL will also be personalized (recipient-specific) so that each recipient will be able to view a personalized version of the BrowserMail communication.

Figure 7:
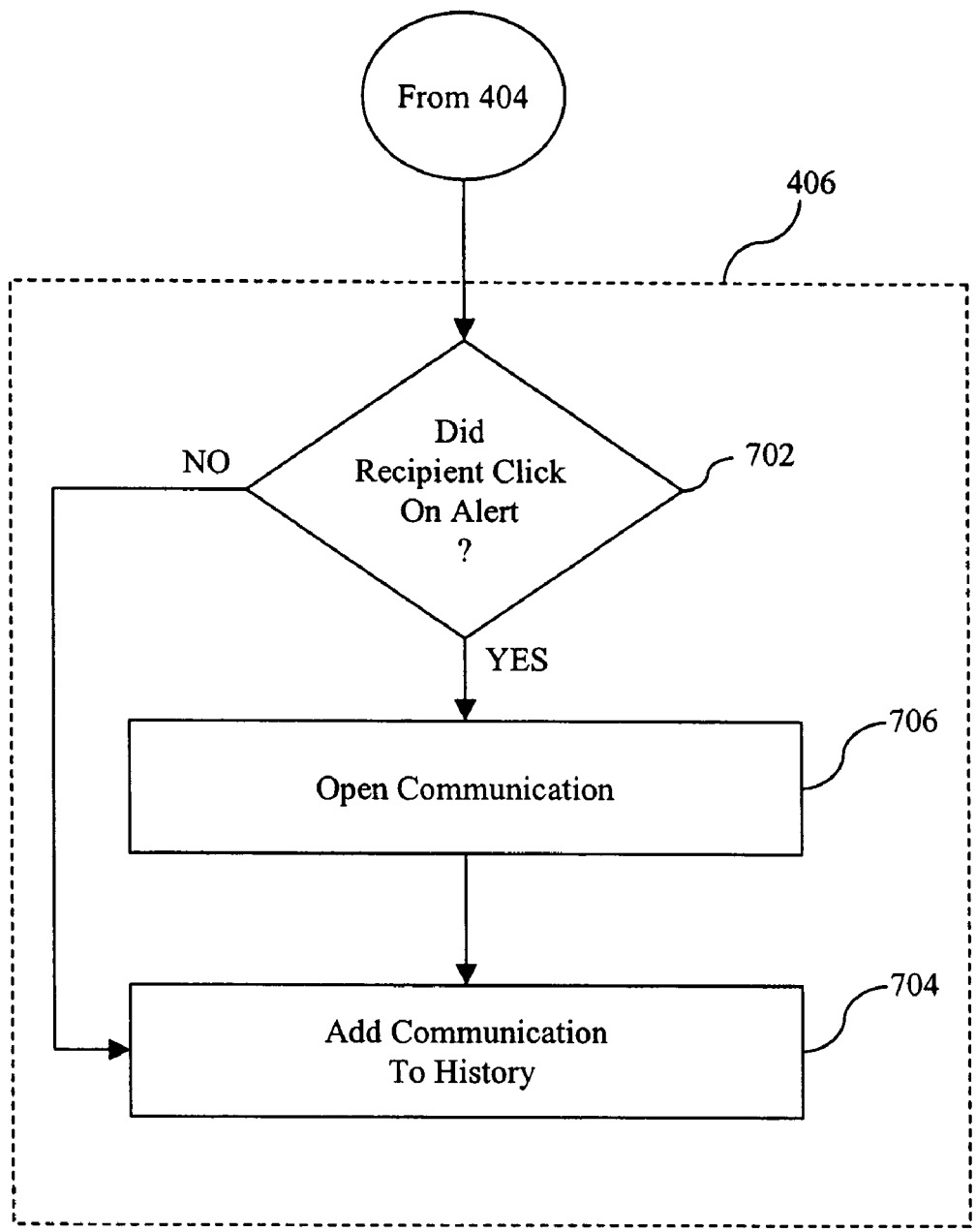
FIG. 7 is a more detailed flow chart of a step depicted in FIG. 4 in accordance with at least one embodiment of the present invention.

FIG. 7 shows a more detailed, but still simplified flow chart corresponding to step 406 described above. Once the recipient has received a BrowserMail communication alert in accordance step 608 described above, the recipient is able to activate (e.g., click or otherwise select) the alert window in order to view the communication immediately. If at step 702 the recipient does not click on the alert (or otherwise select to retrieve the communication), at step 704, the PMP utility program archives the received communication (e.g., either by storing the encrypted URL, or the entire communication) so that the communication can be later retrieved by the recipient (e.g., as described below in connection with FIGS. 8A and 8B). Thus, when a BrowserMail communication alert is received by a recipient, but the recipient does not wish to view the communication at the present time, the recipient can close the alert, or simply ignore the alert (in which case, the alert will close after a certain period of time). In this case, the communication corresponding to the received alert can be viewed later using a history function of the utility program.

If at step 702 the recipient clicks on (or otherwise selects) the alert, at step 704, the PMP utility program opens the recipient's default Web browser, or uses a previously opened Web browser window, and loads the recipient's communication on the Web browser using the encrypted URL that was included in the new communication alert. Once a communication is opened by a recipient (i.e., is being displayed using a Web browser on the recipient's computer), the recipient can interact with the communication, for example, as he could with any other Web page (using, e.g., links, rich media, forms, etc.). Alternative methods of interaction by the recipient with the message may also be used, for example, using any standard display program, such as ADOBE, PAINT, and the like. The recipient is also able to save the communication, for example, to a local folder on the recipient's desktop, a CD-ROM or DVD drive, etc.

According to various embodiments, the message opened by the recipient in his Web browser is precisely as the sender intended. In alternate embodiments, the recipient (or, for example, a corporate IT manager) may control display preferences that display the communication in a customized manner, preferably without detracting from the overall theme or information contained in the communication. For example, the recipient can affect the way fonts or images are viewed by adjusting the Web browser controls. Moreover, it is noted that, because a communication to be viewed by a recipient is published as a Web page, and only an alert with the encrypted URL is sent to the recipient, the delivery process is significantly faster than with delivery of traditional email containing similar amounts of text, image, and other elements (in which the entire communication is transmitted to each recipient).

After the recipient has opened the communication in his Web browser at step 706, the process proceeds to step 704 described above. In this case, although the communication has been opened, according to various embodiments, it is still archived so that the recipient can access it again at a later time.

Figure 8A:
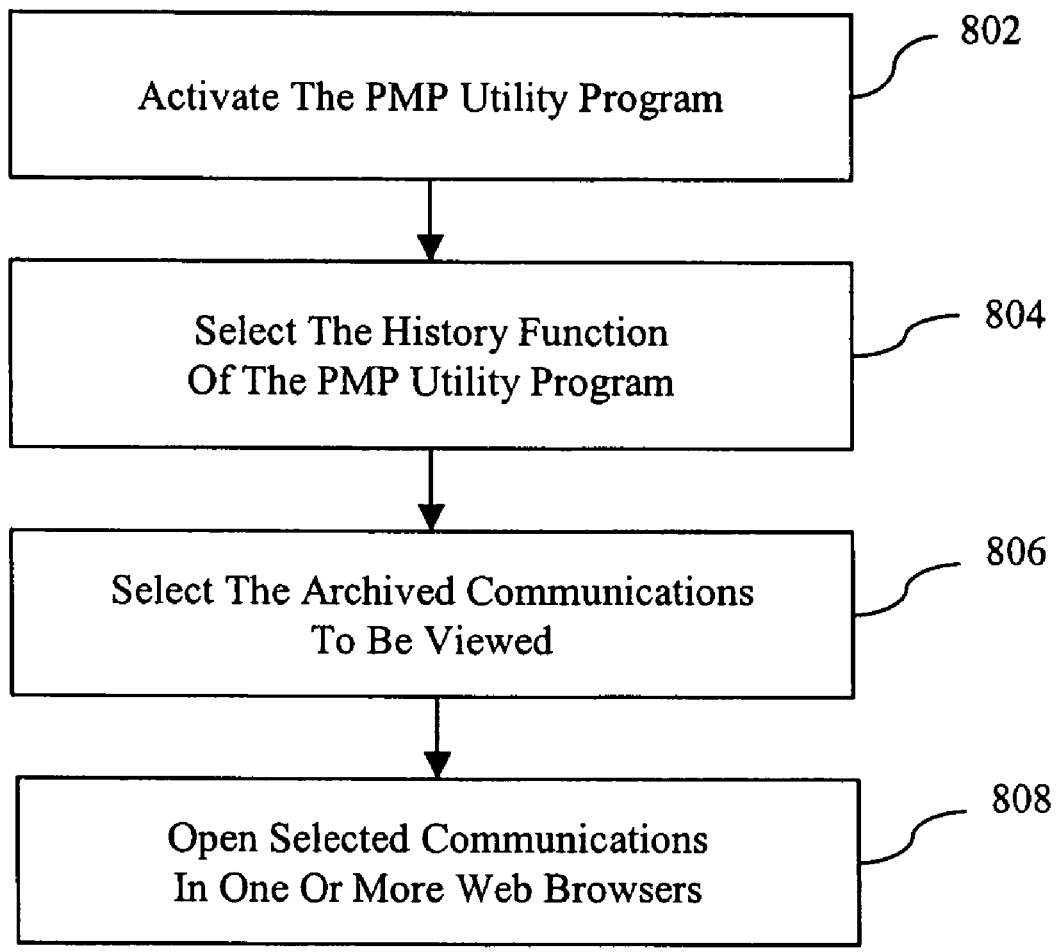
FIG. 8A shows a simplified flow chart illustrating the steps involved when a recipient elects to retrieve a previously received communication in accordance with at least one embodiment of the present invention.

FIG. 8A shows a simplified flow chart illustrating the steps involved when a recipient elects to view (open) a previously received communication that has been stored in the history function of the PMP utility program. In step 802, the recipient clicks or otherwise activates the PMP utility program (assuming that the program is not already active on the recipient's desktop). Then, at step 804, the recipient selects the history function of the PMP utility program.

Figure 8B:
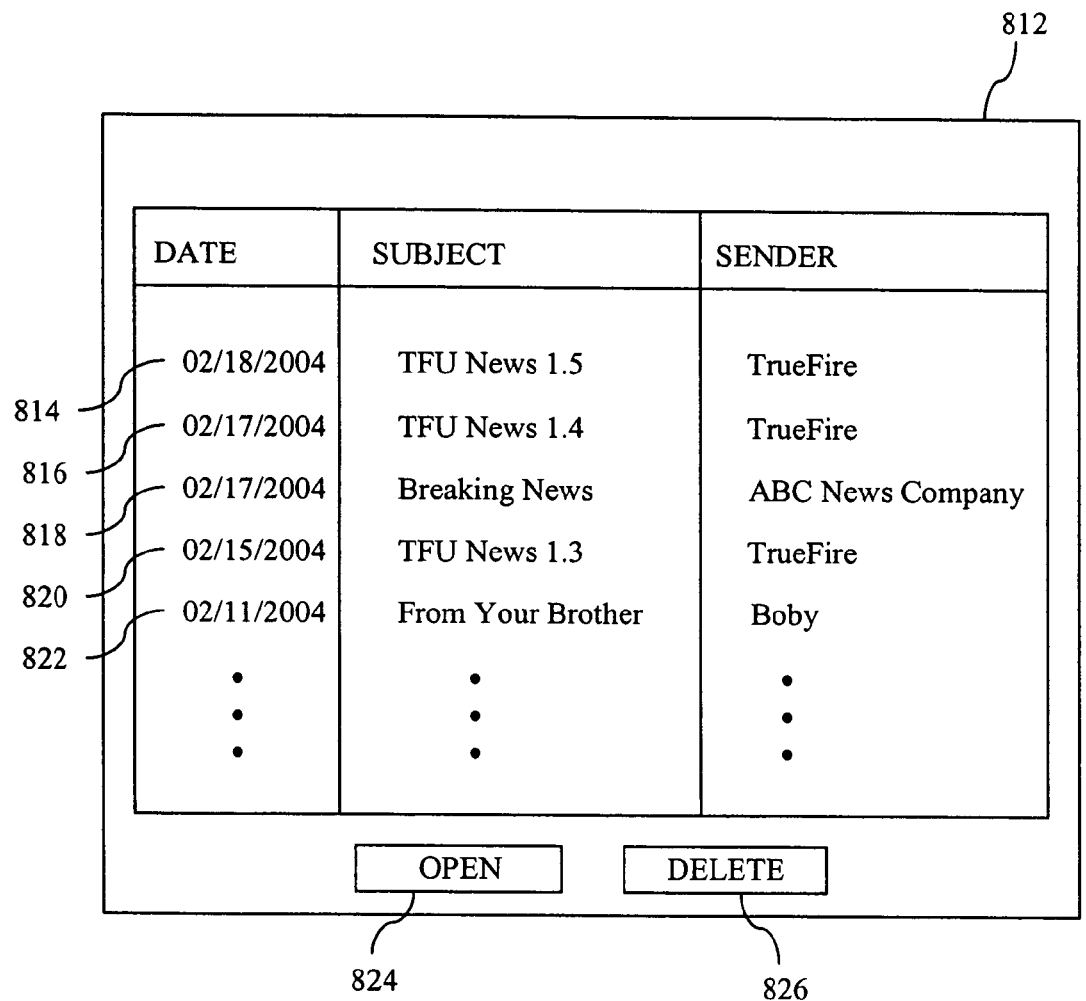
FIG. 8B shows a communication selection window that a recipient can use when to retrieve a previously received communication in accordance with at least one embodiment of the present invention.

FIG. 8B shows one example of a communication selection window 812 that appears to the recipient upon selection of the history function of the PMP utility program. As shown, selection window 812 includes a list of the archived communications 814-822 that can be either opened or deleted by the recipient by using the appropriate one of buttons 824 and 826. Other types of communication selection windows are also contemplated.

Referring back to FIG. 8A, at step 806, the recipient clicks or otherwise selects the one (or ones) of the previously archived communications that he desires to view. Finally, at step 808, the selected communication(s) are retrieved form the PMP servers and opened in one or more Web browsers (depending on how many communications were selected for viewing).

According to various embodiments, the PMP utility program installed on the recipient's computer provides the recipient with various subscription management tools that can be used by the recipient to manage various aspects of his subscriptions. For example, a recipient can use an opt-out tool (as referenced above in connection with FIG. 3) to unsubscribe from certain mailing lists associated with one or more particular senders, or elect to stop receiving all communications from one or more particular senders. The recipient can also use, for example, a pause tool to temporarily stop the delivery of communications from particular (or all) senders. Using this or another tool, the recipient could also elect to restart delivery of the communications whose delivery has been temporarily stopped (paused).

Various other subscription management tools can also be used by the recipient to update his personal information being stored with the PMP servers, and to switch the preferred mode of communications delivery for some or all senders between traditional email and BrowserMail. Additionally, for example, a routing tool can be used by the recipient to have all traditional emails associated with one or more particular email addresses of the recipient routed to the PMP servers and delivered to the recipient as BrowserMail communications in accordance with the BrowserMail application of the present invention. Additionally, the subscription management tools can be used to adjust various miscellaneous settings of the PMP utility program (some of which may be default settings from installation). For example, the recipient may be able to use the subscription management tools to modify the frequency with the PMP servers are polled for new messages.

Figure 8C:
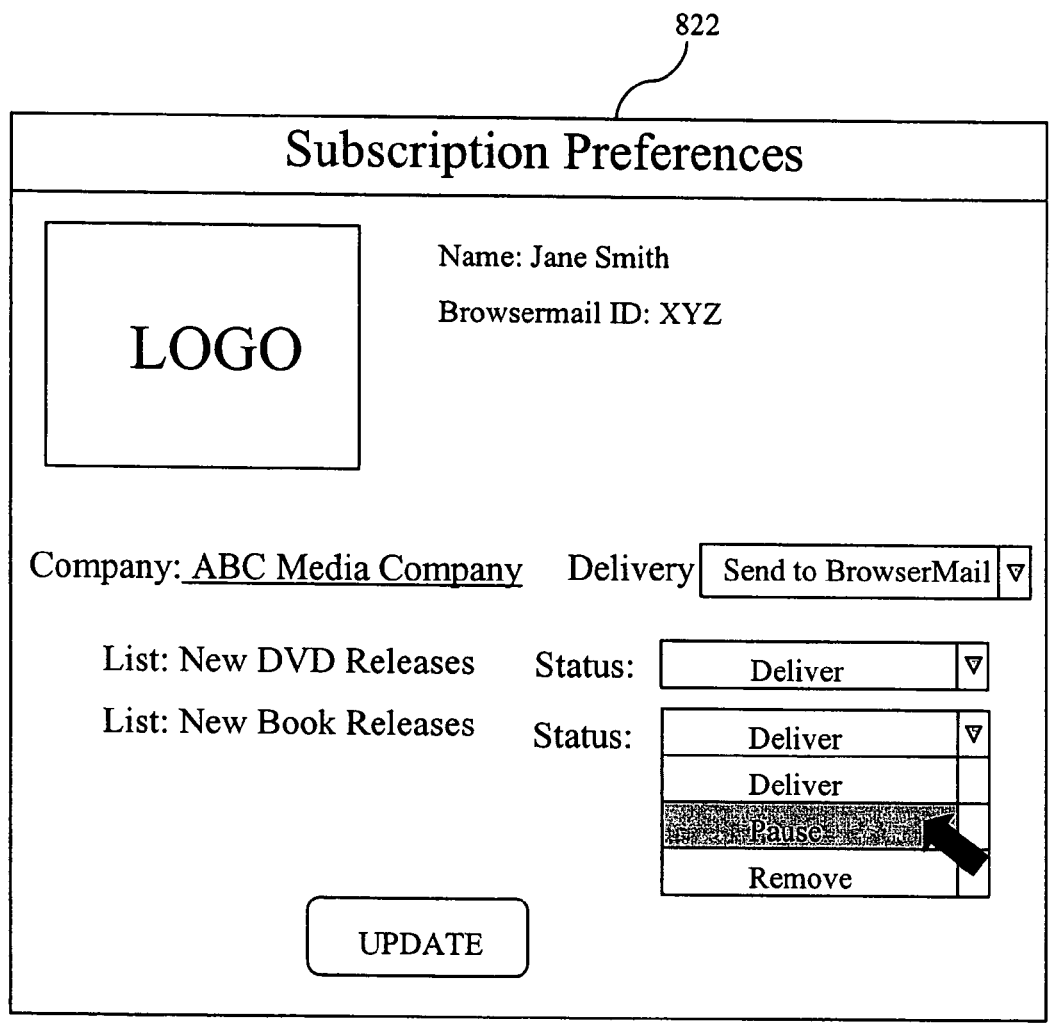
FIG. 8C shows a subscription management tool window that a recipient can use to review and/or modify his preferences with regard to one or more subscribed-to communications lists in accordance with at least one embodiment of the present invention.

FIG. 8C shows a subscription management tool window 822 that a recipient can use to review and/or modify his preferences with regard to one or more subscribed-to communications lists in accordance with at least one embodiment of the present invention. As shown, the recipient is able to view the lists (or other types of communications) that he has subscribed to for a particular sender (in this case, ABC Media Company). The recipient is also able to select the preferred manner of delivery (e.g., BrowserMail or traditional email), and can manage the subscription to particular lists or other types of communications by selecting, for example, one of a delivery option, a pause option (to temporarily stop communications), or a remove option (to opt-out of a particular communication or list). When the recipient receives communications in accordance with the invention from more than one sender, he will be able to set his preferences for each of the other senders in a similar manner.

According to various embodiments, senders of communications in accordance with the principles of the present invention are also provided with various campaign management tools. As explained in greater detail below, these campaign management tools offered to senders can be used, for example, to create and send new communications, modify existing communications that were previously sent and are being maintained (e.g., stored) on the PMP servers, track communications, analyze the performance of a communications campaign, create new mailing lists, modify existing lists, sort and query lists, create segments of lists, and so on. Among other things, these campaign management tools can also be used to automatically update mailing lists with response data generated from a communications campaign, such as how many times a recipient has received a communication from the sender, opened a communication, responded to a communication, and other response statistics that an organization might desire to help evaluate performance and profile the recipient.

Figure 8D:
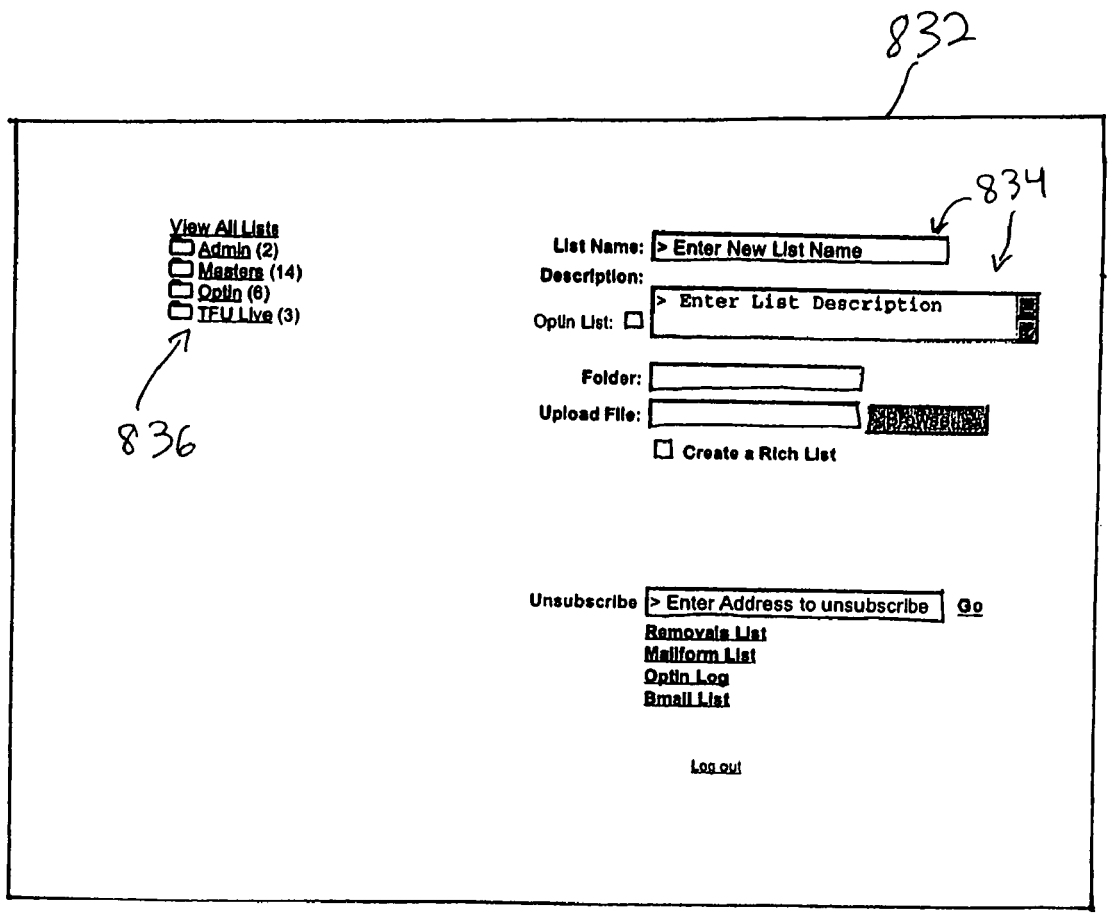
FIG. 8D shows a list manager tool window that can be used by a sender to view and/or modify one or more mailing lists in accordance with at least one embodiment of the present invention.

For example, FIG. 8D shows a list manager tool window 832 that can be used by a sender to view and/or modify one or more mailing lists using a list manager tool in accordance with the invention. For example, the sender can enter list information for an existing (previously created) list in the form boxes 834 shown in window 832 in order to search for and access the particular list. If the list information entered into boxes 834 does not correspond to an existing list, then according to various embodiments, a new list having the entered information may be automatically created for the sender. According to various embodiments, the sender may also be prompted to verify that the entered information is correct if a match is not found. Moreover, rather can manually entering list information as described immediately above, the sender can also select an already existing list that he desires to view and/or modify, for example, by clicking on one of the folders 836 shown in the upper left portion of window 832.

FIG. 8E shows another list manager tool window 842 that is provided to the sender when the sender clicks (or otherwise selects) the folder titles Masters shown in FIG. 8D. As shown in FIG. 8E, the Masters folder includes fourteen separate lists 844 that have been previously created. By selecting one of these individual lists (in this case, OfficialFriends has been selected), various information associated with the selected list is displayed for the sender in the various form boxes 846 to the right of the displayed list names. The sender is then able to view and/or modify this information as desired, for example, to add or remove certain recipients from the selected list. Additionally, various statistics 848 can also be displayed to the sender using window 842. For example, as shown in FIG. 8E, statistics 848 can include the total number of recipients that have chosen to receive BrowserMail communications rather than traditional emails, and the number of these recipients that are considered active and inactive for various reasons. As shown, statistics 848 can also include, for example, the number of recipients that have chosen to switch from BrowserMail communications to traditional email, the number of "incomplete" recipients that have chosen to receive communications but have not yet completed the utility program installation process, and the number of "uninstalled" recipients that have chosen to uninstall the utility program from their respective computers.

In order to create and send a new communication (using, e.g., a message manager tool in accordance with the invention), a sender first establishes a connection with the PMP servers that are hosting the campaign management tools. In accordance with the principles of the present invention, communication between senders of BrowserMail communications and the PMP servers may be achieved using any suitable means. For example, a sender may use a Web browser to and an Internet connection to log onto a private account that is hosted by the PMP servers. In this case, it may not be necessary for the sender to have any PMP software installed in order to communicate with the PMP servers. Moreover, once logged in, a sender may send not only private communications according to the invention, but also traditional emails (e.g., if a recipient has given permission only to receive traditional emails) using the PMP servers.

Communications to be sent to recipients in accordance with the present invention can be crafted, for example, using HTML, and can include, among other things, formatted text, images, graphics, links, forms, rich media (e.g., video and animation), and other useful interactive elements. Personalized elements can also be included in the communications by, for example, merging recipient-specific data that is stored by the PMP servers. According to various embodiments, using the connection that has been established between the sender and the PMP servers, the sender transmits (e.g., uploads) all elements that are to be included in the communications to be later retrieved by the intended recipients (using respective encrypted URLs in the manner described above). According to various embodiments, a sender may also be provided with one or more design wizard tools to assist in the creation (or modification) of sophisticated HTML communications, such that even non-technical users are able to create communications.

Figure 8F:
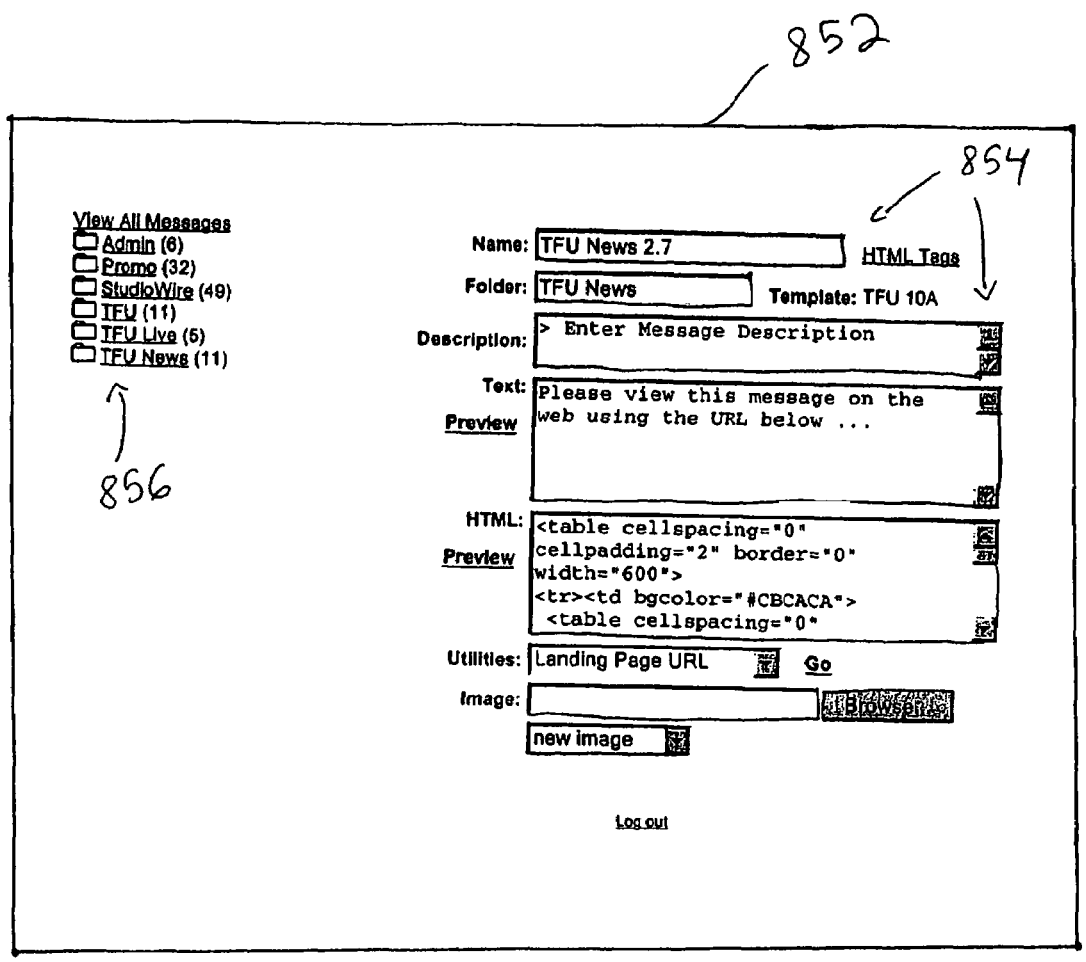
FIG. 8F shows a message manager tool window that can be used by a sender in viewing existing communications or crafting a new communication to be made available for one or more recipients in accordance with at least one embodiment of the present invention.

FIG. 8F shows a message manager tool window 852 that can be used by a sender to view existing communications and/or to craft one or more new communications to be made available for one or more recipients. As shown, the sender can use form boxes 854 of window 852 to enter the name of the communication to be created, the folder in which to store the communication, description information, and so on. When a sender desires to view a previously created communication, the sender can select the folder that the communication is stored in (using the folder links 856 located in the upper left portion of window 852), and on a subsequently provided window, thereafter select the particular communication of interest. For example, when the sender selects folder titled StudioWire, a window such as window 862 shown in FIG. 8G may be provided to the sender. The sender is then able to select to view and/or modify one of the communications 864 in the StudioWire folder.

As mentioned above, one or more design wizard tools can be used by recipients to create new communications and/or to edit existing communications. For example, FIG. 8H shows an example of a design wizard tool window 872 that can be provided to the sender when he elects to view and/or modify the StudioWire: Tony McManus communication located in the StudioWire folder (as can be seen from FIG. 8G). Using window 872, which provides the sender with, for example, a two feature template, the sender is able to modify the communication to include a logo (which the sender can upload to the PMP servers), a first feature (which may be, for example, a video clip), and a second feature (which may be, for example, an audio clip). It will be understood that other types of template wizards, providing a sender with similar and/or other capabilities in creating a communication, may also be used in accordance with the invention.

Once a communication has been created, using one of the available campaign management tools, a sender can also specify a date and time for a particular communication to be made available to a specific list of recipients. Moreover, as shown in FIG. 6B described above, a sender may also specify information that is to appear in the alert windows received by the recipients, such as a subject line, a name and reply-to email name of a representative of the sender, and any graphics that may be present.

In accordance with the invention, senders may also be provided one or more reporting tools that can be used for tracking and analyzing various aspects of a communication's campaign down to the recipient level. For example, reporting tools may be made available to senders that can provide the senders information pertaining to the following metrics: date and time of communications alert delivery and opening by recipients, the total number of intended recipients, the total number of alert deliveries, the number of "opens" (i.e., how many recipients opened the communication in their Web browser), the number of "clickthroughs" (i.e., how many recipients clicked on one or more links in the communication), the numbers of specific clickthroughs (i.e., how many recipients clicked on a specific link in the communication), and the type of operating systems and Web browsers the recipients use. Other types of information may also be provided to the sender in accordance with the invention. Moreover, such information (e.g., data, lists, reports, etc.) can be saved by the sender to a local location, and analyzed using proprietary or other commercial applications.

FIG. 9A shows one example of a campaign report 902 that can be provided to a sender in accordance with the principles of the present invention. As shown, report 902 includes columns 904-918, which will now be explained. Columns 904 and 906 respectively provide the titles and launch dates of the campaigns for which various pieces of information are being reported. Column 908 provides the name of the particular communication of the campaign being reported on, while columns 910 and 912 respectively provide the recipient list name and the total number of targets for the message (i.e., the total number of recipients that have given their permission to receive the communication by, for example, subscribing to the list name shown in column 910). The final columns (i.e., columns 914-918) respectively provide the total number of recipients that have unsubscribed from receiving communications associated with the campaign in the future, the number of recipients that have opened the communication, and the number of recipients that have clicked on at least one link provided in the communication. It will be understood that FIG. 9A merely shows one example of a campaign report in accordance with the invention, and that various other types of reports, differing in both content and manner of display, are contemplated. For example, a more detailed report relating to a particular communication may indicate the number of times that each particular link provided in the communication has been clicked, and by which recipients.

Figure 9B:
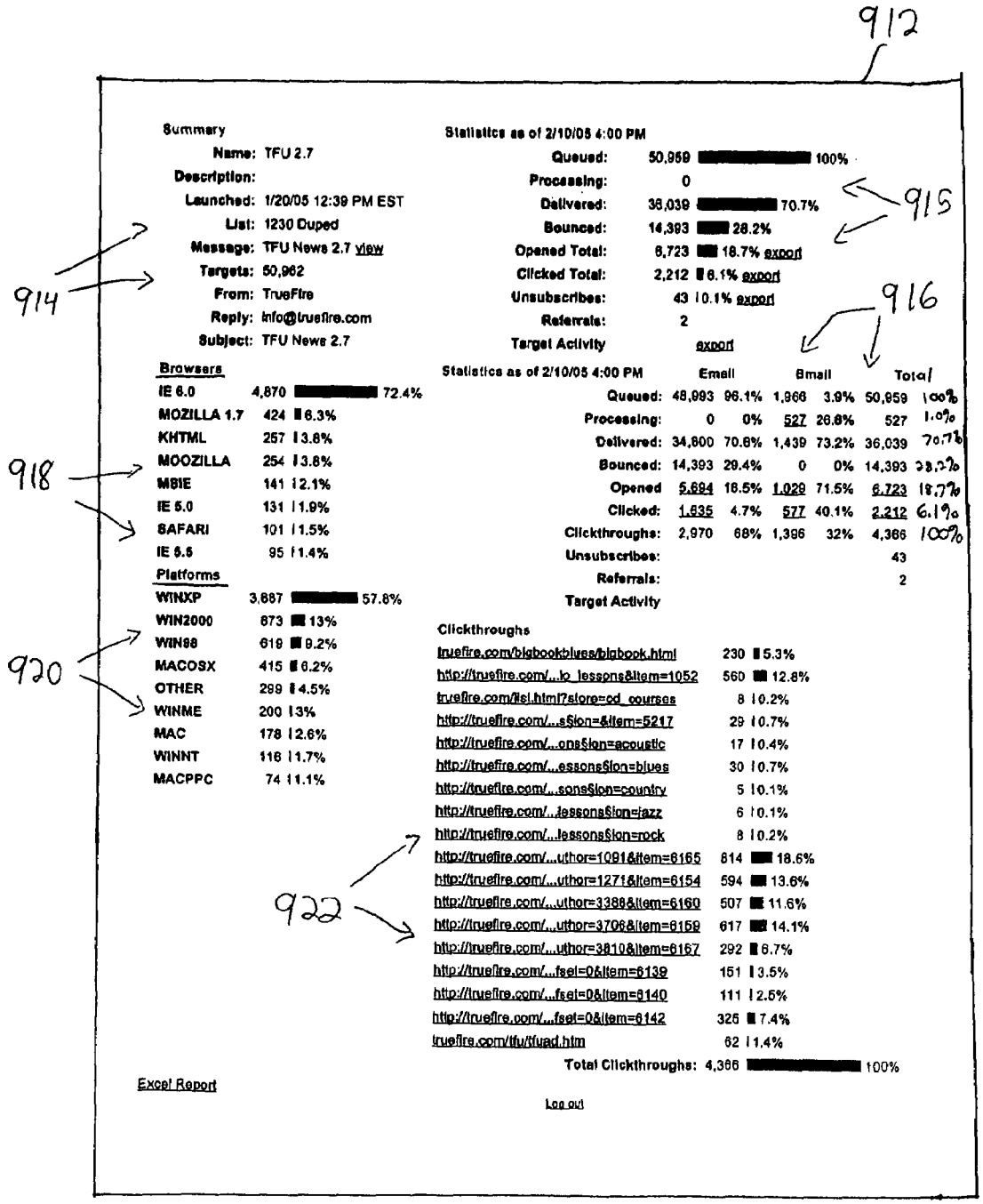
FIG. 9B shows another, more detailed campaign report that a sender of communications can be provided in accordance with at least one embodiment of the present invention.

As another example, FIG. 9B shows another, more detailed campaign report 912 that a sender of communications can be provided in accordance with at least one embodiment of the present invention. As shown, report 912 includes information 914 relating to the communication being reported on, such as its name, description (if any), launch date, etc. Report 912 also includes current statistics 915 regarding the communication, such as the total number of queued deliveries (e.g., the total number of targets to which delivery will be and/or has been attempted), the number of deliveries that are still being processed, the number of deliveries that have already occurred, the number of deliveries that were bounced, opened, and clicked (e.g., the number of unique recipients that clicked on one or more links in their received communication), etc. Report 912 also provides current statistics 916, which enables a comparison of the email deliveries versus BrowserMail deliveries of the communication being reported on. For example, statistics 916 provides information such as provided in statistics 915 (but broken down by delivery method). In addition, statistics 916 also provides information relating to, for example, clickthroughs. In the report 912 shown in FIG. 9B, it can be seen that of 4,366 total clickthroughs (the total number of links clicked by all the unique recipients), 32% of the 4,366 clickthroughs came from BrowserMail deliveries, even though these deliveries made up only about 4% of the total deliveries counting emails. According to various embodiments, as also shown in FIG. 9B, both browser information 918 and platform information 920 associated with the recipients of the communication are also provided in report 912, as is information 922 relating to the clickthroughs (e.g., what links were clicked on in the opened communications and the total number of links clicked for the communication).

Persons versed in the art will appreciate that the BrowserMail application according to the invention which has been described immediately described above can be used to overcome several (if not all) problems associated with the use of traditional email communications alone. For example, BrowserMail communications that are delivered in accordance with the principles of the present invention are not delivered through traditional email networks, and are thus not as likely to be delayed, or to be overlooked by recipients as is commonly the case when a legitimate email is grouped together with the myriad of SPAM messages commonly found in a recipient's inbox. Additionally, given the manner of delivery, and assuming that the recipient has installed the PMP utility program and personal security key, and has given appropriate permission to bypass any firewalls that may be in use, BrowserMail communications according to the invention are not subject to being bounced, blocked, or blacklisted by ISPs. Moreover, according to various embodiments, the present invention uses the Hypertext Transfer Protocol (HTTP) to bypass end user firewall issues which might be incurred by a more lightweight custom protocol. In addition, due to the requirement that a recipient subscribe to communications and install a PMP utility program and personal security key, legitimate senders of BrowserMail communications in accordance with the principles of the present invention are also significantly less likely to be forced to deal with abuse complaints. Moreover, due to the direct manner of communication that is possible in accordance with the BrowserMail application of the present invention, legitimate senders will likely not be subject to anti-SPAM compliance measures required of traditional email senders.

As explained above, BrowserMail communications in accordance with the principles of the present invention also provide legitimate senders with significantly less limitations with regard to creative control of messages. For example, legitimate senders need not be concerned with sending certain words, images, links, or HTML messages that are commonly stripped by SPAM filters or that cause SPAM filters to completely block messages. Additionally, because recipients view messages in Web browsers, there are no (or significantly less) reader compatibility issues to deal with, and thus, it is much easier to incorporate rich media such as video, audio, and animation (and/or other elements that are not yet available, but will be compatible with future generations of Web browsers). Additionally, because messages are viewed by Web browsers as personalized Web pages, reporting is web-centric (or web-based) and thus significantly more precise than reporting associated with traditional emails.

Figure 10:
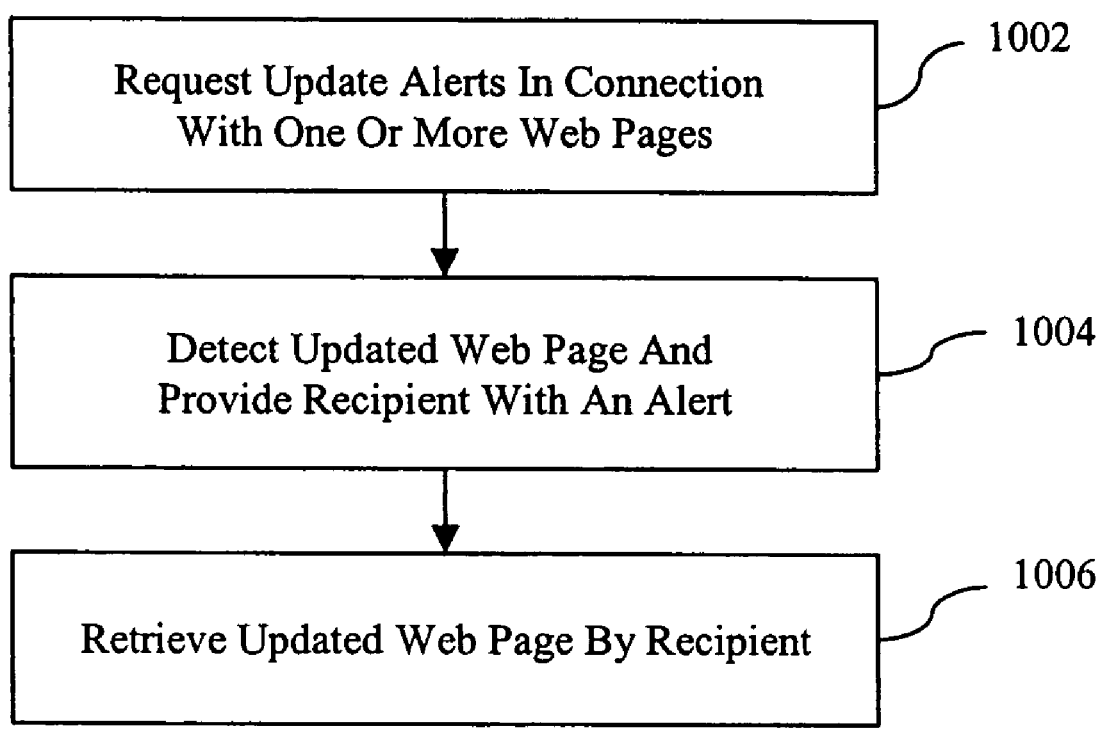
FIG. 10 shows a simplified flow chart illustrating several of the steps involved in the receipt of an alert indicating that a particular Web page has been updated in accordance with at least one embodiment of the present invention.

As now explained in greater detail; according to various embodiments of the invention, PMP servers such as those shown in FIG. 3 can also be used in connection with a "WebPager" application. For example, FIG. 10 shows a simplified flow chart illustrating several of the steps involved in the receipt of an alert indicating that a particular Web page has been updated. At step 1002, the recipient requests update alerts in connection with a particular Web page (or more than one Web page, such as independent Web pages or the multiple Web pages of a single Web site). At this time, if not already present and functioning on the recipient's computer, a PMP utility program and personal security key are installed. It will be understood that the same PMP utility program may be used for both the BrowserMail and WebPager applications, or each application may use its own PMP utility program and personal security key.

As with the BrowserMail application described above, requesting alerts when one or more Web pages has been updated can be accomplished according to the invention in a variety of different ways. For example, a recipient may complete an online subscription form directly on the Web page(s) the recipient wishes to monitor, during which process personal information such as name, email address, phone number, etc. may be provided. Alternatively, for example, a recipient can select an action button on the Web page to be monitored that automatically adds the Web page to the list of Web pages being monitored by the recipient (where the list is again stored with the PMP servers). According to various other embodiments, a recipient may be provided, in a single location (e.g., a Web site), a list of Web pages that can be added to the recipient's list of Web pages being monitored for updates.

Next, at step 1004, when an update is detected to the Web page being monitored, an alert containing the URL of the updated Web page is provided to the recipient. According to various embodiments, this detection occurs in much the same manner in which new communications are detected in the BrowserMail application described above (i.e., through the process of polling the PMP servers). In accordance with the invention, updates to Web pages can be detected manually by the Web page owner or operator, or by an independent authority that monitors and reports Web page updates. Alternatively, for example, one or more Web pages can be periodically scanned, whereby updates are automatically recognized when the content on any of the Web pages changes by more than a predetermined amount. In this case, the Web page owner or operator can be, but is not necessarily, aware of (or involved in) the process by which updates are determined and alerts are provided to a recipient.

Finally, at step 1006, the updated Web page is retrieved (opened) by the recipient in his Web browser by clicking (or otherwise selecting) the received alert. According to various embodiments, the URL provided to the recipient with the update alert is a personalized URL, and can be used to instruct the PMP servers or another program to highlight (or otherwise indicate) on the opened Web page the exact location(s) of the updated content. In this manner, the recipient is able to focus his or her attention solely on the updated content of the Web page. It is noted that, as with electronic communications sent according to the BrowserMail application described above, a recipient of a WebPager alert may also choose to close (or ignore) the alert, and later visit the updated Web page using a history function of the PMP utility program installed on his computer.

In accordance with various embodiments of the present invention, many of the tools available for senders of BrowserMail communications, and optionally other tools as well, are available to those involved with Web pages that are being monitored by one or more recipients. For example, FIG. 11 shows one example of a report 1102 that can be provided to an owner of a Web page that is being monitored. As shown, report 1102 can include, for example, a column 1104 in which the names of the Web pages being monitored is provided. Column 1106, on the other hand, is used to provide the URL of the Web page being monitored for updates. It is noted that this URL may be the same URL provided to recipients (when all recipients are provided an alert to view the updated Web page), or it may be different (when recipients are provided personalized URLs, e.g., when updates since the recipients' last visit to the Web page will be indicated). The date on which the Web page is updated and/or an alert is provided to the recipients is provided in column 1108. Finally, columns 1110 and 1112 respectively provide the number of recipients that have received a Web page update alert, and the number of recipients that have clicked on the alert to view the updated Web page.

Several features that are provided in accordance with various embodiments of the present invention are also discussed in the Appendix below, which is hereby incorporated by reference herein in its entirety.

Although the invention has been described and illustrated in the foregoing illustrative embodiments, it will be understood that the present disclosure has been made only by way of example, and that numerous changes in the details of implementation of the invention can be made without departing from the spirit and scope of the invention. For example, although new communication alerts (according to the BrowserMail application) and Web page update alerts (according to the WebPager application) are described above as being provided to a recipient when a PMP utility program polls the PMP servers and detects a new communication or updated Web page, the invention is not limited in this manner. For example, it is contemplated that some type of signaling be sent by the PMP servers to a PMP utility program when it is appropriate for a new alert to be presented to the recipient. In addition, although alert windows are described above as appearing on a recipient's desktop, the invention is not limited in this manner. Rather, any suitable type of indication can be used to provide recipients with new communication alerts or Web page update alerts in accordance with the invention.

Moreover, additional features may be implemented without departing from the principles of the present invention. For example, rather than using a personal security key that is generated by a utility program according to the invention to authenticate recipients prior to the recipients being able to retrieve electronic communications in accordance with the invention, any other suitable mechanism may be used for this purpose. Additionally, for example, when a recipient receives an alert for a new BrowserMail communication, instead of opening the communication (e.g., by clicking on the alert), or leaving the communication alone to be archived for later retrieval, the recipient may also elect to forward the communication as a traditional email (subject to the limitations of email communications). In this case, the recipient may enter his own personal email address, and/or other email addresses belonging to him or not, and the communication is formatted by the PMP servers and sent to the entered email address(es). Additionally, for example, when a recipient of BrowserMail communications desires to view his available communications without using the PMP utility program (e.g., when he is using a public computer on which a PMP utility program is not installed), according to various embodiments, the recipient can login to his private account using any Internet connection and be provided with access to the communications using a Web-based version of the invention. In this case, the login procedure, rather than the PMP utility program and personal security key, is used to verify the recipient and provide access to his available communications. Additionally, it is noted that the steps described above in connection with the various flow charts are for illustration purposes only, and are not meant to limit the scope of the present invention. For example, various steps discussed above may be rearranged in order without departing from the principles of the present invention. As an example, referring to the flow charts of FIGS. 6 and 7, it is contemplated that the step of archiving a BrowserMail communication (step 704) take place even before an alert is provided to the recipient, or, for example, after the recipient has clicked the alert but before the communication has been opened.

Regarding the PMP servers described above, according to various embodiments, these servers may be owned, maintained, and/or operated independently of the senders and recipients using them. However, the invention is not limited in this manner. For example, it is contemplated that a sender (e.g., a corporation) be able to send BrowserMail communications and/or WebPager alerts to one or more senders using its own (e.g., proprietary) servers in accordance with the principles of the present invention.

Therefore, other embodiments, extensions, and modifications of the ideas presented above are comprehended and should be within the reach of one versed in the art upon reviewing the present disclosure. Accordingly, the scope of the present invention in its various aspects should not be limited by the examples presented above. The individual aspects of the present invention, and the entirety of the invention should be regarded so as to allow for such design modifications and future developments within the scope of the present disclosure. The present invention is limited only by the claims which follow.

Appendix

The following describes several features that are provided in accordance with various embodiments of the present invention.

Bounce Manager

Auto Bounce Posting

Any undeliverable email is automatically flagged in your account as a Bounce. "Bounces" are emails that could not be delivered for a variety of reasons: incorrect addresses, canceled email accounts, bad domain names, SPAM blocking, Firewall filtering, full mailboxes, or even malfunctioning servers on the recipient's end. They are flagged as either a hard or soft bounce. At any time you can check to see who didn't receive your campaign and whether or not their email address bounced hard or soft. Gives you the information you need to know to do list cleanup. After your campaign has been sent, you can check Reports for the number of emails that bounced, then go to Lists to see who. Load the list you'd like to investigate, use the various bounce management tools to 'clean up' your list. Hard bounces are emails that return to us with a permanent and fatal error message (these are typically undeliverable in the future). Soft bounces are emails that return to us with a temporary error message (these are typically deliverable in the future).

Auto Bounce Suppression

After using a list, emails that are undeliverable are flagged as bounced in your account. Before using the list in another campaign, the emails flagged as bounced are automatically suppressed before transmission. You aren't sending messages to undeliverable emails and you're in control for how you'd like to manage your bounces. After using a list, the emails that bounced have been flagged. Before sending to a list again, simply determine what you'd like to do with those emails. You can elect to unbounce them, remove them, or export them into a segmented list for follow-up. If you leave them in the list flagged with the bounced symbol, they will be suppressed before the email campaign goes out again.

Automated Bounce Retry

Allows you to automate the bounce resending process in 24-hour intervals. Any hard and soft bounces left after the initial campaign send will be pulled and resent once per day for the number of days you designate in the retry counter. Attempting to deliver to bounced addresses over the course of multiple days will decrease your bounce rate, often by a significant margin. Doing everything you can to get through to each recipient on your list is one of the keys to good permission marketing! Before scheduling your campaign simply select the number of 24 hour intervals you would like your bounced addresses to be retried from the drop down menu above your campaign scheduler. Leave it at zero if you'd like to handle them manually or choose 1, 2 or 3 days for retrying. Test various retry counts to see what number works best for your list! Results of the retries are found in your Account Activity (on your Account page.)

Bounce Management Tips

The bounce management tools provide everything you'll need to handle the successful and sometimes unsuccessful delivery of your email. Bounces are a reality in permission email marketing and having the data you need to make educated decisions about your lists are key. With hard bounces, you should not unbounce these addresses; rather you should remove these addresses from your main list and create a new list of just bounced emails so that you can closely monitor them. Schedule a campaign to the list in a few days to attempt again. Typically you'll find a small percentage of the addresses are deliverable. Additionally, you may want to export them to follow up and get the individual's new or correct address. With soft bounces, it is probably best to export these emails and move them to a new list (along with any hard bounces) and try to deliver to them again. Alternatively, you could unbounce these addresses, as it is possible (but not necessarily guaranteed) that you will be able to deliver email to them eventually. Bounce error messages occur because at the precise time that our server attempts to connect with your recipients' servers there has been a failure. So if a recipient's server was malfunctioning, a bounce message would generate and the email would be flagged as undeliverable. Don't delete your emails flagged as hard the first time a notice is generated. Give it a few times before removal.

Bounced Campaign Report

After sending a campaign, the number of emails that bounced is reported in the drill-down view so you know how many of your targets didn't get the message. Stay informed about the successful delivery of your campaign. Go to Reports, load the campaign you'd like detailed information on by clicking on its name. In the statistics table, you'll see the number of emails that bounced from the campaign. Reports are real-time so refresh your browser for the most current stats. We try for 48 hours to reach unresponsive servers so you may get a push of new bounces at the 48-hour mark after scheduling your campaign. Also, if you're using the Automated Bounce Retry option when scheduling a campaign you will notice your bounce percentage fluctuate after each retry.

Bounced Email Counter

Count the number of emails that have bounced in a list. See at a glance the number of undeliverable emails in any list. Load the list you'd like to work with by clicking on its name from the directory, view the number next to the bounce management tool.

Edit Bounced Tool

Fix an improperly formatted email or just update a bounced email. Keep your list up-to-date and your bounces in control and maximize the success of your campaign by ensuring that your list is updated and properly formatted before you send to it. Just a few? From the Bounce Tool, select Show Hard Bounces, in the Results box, click on an email, fix it in the Add/Search Box, and then click Add. Remove the improperly formatted version by finding it in the Results box and clicking Remove. Be sure to confirm the removal. More than a few? From the Bounce Tool, select Export Hard Bounces. Depending upon your browser and operating system, you will either get a box prompting an open or save feature, or the list will be displayed in the web browser window. If displayed in the browser window, copy and paste the emails into Notepad (PC)/SimpleText (MAC) and save to your desktop. If prompted to open or save, click save to export the file to your desktop. Edit the emails in Notepad (PC) or SimpleText (MAC), then resave the file. From the bounce management drop-down tool, select remove the hard bounces, then click go. Finally, upload the newly-saved file of fixed emails by clicking browse, find the file, click open, then save.

Expandable Results Pane

The expandable results pane shows you the top portion of your list, plus displays the results of searches and bounce display commands. Expandable from 5-10 lines, it also facilitates removing emails and unbouncing individual emails from a list. Essential to list management, the expandable results pane shows you all your searches and queries. The results pane does not display your entire list. To see your whole list, you may need to use the List Export feature. Hold the ctrl key down to select multiple emails in the box. To expand the view, check the Expand box, then click Save. To return to your original view, uncheck the Expand box, then click Save.

Export Hard Bounce Tool

This tools enables you to export the emails flagged as hard bounces.

You can print out the list, pass it on to someone for follow-up, or even upload a list of bounces into your account to try and resend. Load the list you'd like to work with by clicking on its name in the directory, from the bounce management drop-down tool, select export hard bounces, then click go. Depending upon your browser and operating system, you will either get a box prompting an open or save feature, or the list will be displayed in the web browser window. If displayed in the browser window, copy and paste the emails into Notepad (PC)/SimpleText (MAC) and save to your desktop. If prompted to open or save, click save to export the file to your desktop, click open if you'd like to view the list in its entirety.

Export Soft Bounce Tool

This tools enables you to export the emails flagged as soft bounces. You can print out the list, pass it on to someone for follow-up, or even upload a list of bounces into your account to try and resend. Load the list you'd like to work with by clicking on its name in the directory, from the bounce management drop-down tool, select export soft bounces, then click go. Depending upon your browser and operating system, you will either get a box prompting an open or save feature, or the list will be displayed in the web browser window. If displayed in the browser window, copy and paste the emails into Notepad (PC)/SimpleText (MAC) and save to your desktop. If prompted to open or save, click save to export the file to your desktop, click open if you'd like to view the list in its entirety.

Remove Hard Bounces Tool

This tool lets you, in a single click, remove the emails flagged as hard bounces from any list. Manage your lists as you see fit. After trying a few times, removal is sometimes the best option.

Load the list you'd like to work with by clicking on its name in the directory, from the bounce management drop-down tool, select remove hard bounces, then click go. You will see the bounce counter reflect the new total of bounces. The number might not be zero if there are soft bounces in the list.

Remove Select Hard Bounce Tool

This tool lets you remove any emails flagged as a hard bounce in the list. Don't want to remove all your hard bounces? No problem. Just pick the ones you'd like deleted. Load the list you'd like to work with by clicking on its name in the directory, from the bounce management drop-down tool, select show hard bounces, then click go. In the results pane, select the email or emails you'd like to remove (hold the ctrl key to select multiple emails), click remove. Be sure to confirm the deletion.

Remove Select Soft Bounce Tool

This tool lets you remove any emails flagged as a soft bounce in the list. Don't want to remove all your soft bounces? No problem. Just pick the ones you'd like deleted. Load the list you'd like to work with by clicking on its name in the directory, from the bounce management drop-down tool, select show soft bounces, then click go. In the results pane, select the email or emails you'd like to remove (hold the ctrl key to select multiple emails), click remove. Be sure to confirm the deletion.

Remove Soft Bounces Tool

This tool lets you, in a single click, remove the emails flagged as soft bounces from any list. Manage your lists as you see fit. After trying a few times, removal is sometimes the best option.

Load the list you'd like to work with by clicking on its name in the directory, from the bounce management drop-down tool, select remove soft bounces, then click go. You will see the bounce counter reflect the new total of bounces. The number might not be zero if there are hard bounces in the list.

Search Bounced Tool

Search a list for an email address that you think may have bounced. Don't know the whole email? You can also search for a string of characters in a list. After searching if it finds the email and it's bounced, it'll have a bounced symbol in front of it. Search for a specific email or all the emails that begin with a single letter. Enter the email or string of characters in the Add/Search box and click on Search. The results will be displayed in the Results box. If no email is found it will let you know. If the email has bounced hard there'll be an asterisk "*" in front, if the email has bounced soft there'll be a "+" in front of it.

Show Hard Bounce Tool

Displays the emails that have been flagged as bouncing hard in the results box. This tool shows you who didn't receive your email and enables you to edit or follow-up to get a working email.

Hard Bounces are addresses that usually can never be delivered to (ex. cancelled account, bad syntax, bad domain). We've received a permanent error message back from their server. Hard Bounces are marked with an "*" sign in the results pane.

Show Soft Bounce Tool

Displays the emails that have been flagged as bouncing soft in the results box. This tool shows you who didn't receive your email and enables you to edit or follow-up to get a working email. Soft Bounces are addresses that may be only temporarily undeliverable (ex. server malfunctioning, full mailbox, blocking). Soft Bounces are counted as a Bounce in your Report statistics and marked with a "+" sign in the results pane.

Unbounce Hard Bounces Tool

This tool lets you, in a single click, remove the bounce flag in front of all emails flagged as a hard bounce in the list so that you can send to them again. Manage your lists as you see fit. Trying bounced emails again before removing them permanently is a good practice. Load the list you'd like to work with by clicking on its name in the directory, from the bounce management drop-down tool, select unbounce hard bounces, then click go. You will see the bounce counter reflect the new total of bounces. The unbounced emails will be eligible for transmission again if you use the list in another campaign. The number might not be zero if there are soft bounces in the list.

Unbounce Select Email Tool

This tool lets you remove the bounce flag in front of any emails flagged as either a hard or soft bounce in the list so that you can send to them again. Maybe you'd like to try resend to select emails and not all of them flagged as bounced. Load the list you'd like to work with by clicking on its name in the directory, from the bounce management drop-down tool, select show soft bounces or show hard bounces, then click go. Select the email or emails you'd like to unbounce in the results pane (hold the ctrl key to select multiple emails), click unbounce. The unbounced emails will be eligible for transmission again if you use the list in another campaign.

Unbounce Soft Bounces Tool

This tool lets you, in a single click, remove the bounce flag in front of all emails flagged as a soft bounce in the list so that you can send to them again. Manage your lists as you see fit. Trying bounced emails again before removing them permanently is a good practice. Load the list you'd like to work with by clicking on its name in the directory, from the bounce management drop-down tool, select unbounce soft bounces, then click go. You will see the bounce counter reflect the new total of bounces. The unbounced emails will be eligible for transmission again if you use the list in another campaign. The number might not be zero if there are hard bounces in the list.

Validate Email Tool

If you're feeling geeky you can select and then "validate" an individual address. We will attempt to validate the address with the recipient's server and then return the server's response.

Unsure of an email's deliverability? Want to know if it would still bounce? Try to validate it before you send or check its status after it's bounced to see what message their server is sending to us. First select the list you'd like to work with, and find the email you'd like to validate in the results box (you may need to perform a search or display function first), then click on it in the results box. Next click on Validate and view the results in the pop-up box. Please note: an actual email is not sent, so no final determination regarding the email address' validity can be made.

Account Manager

Account Activity

Logs all campaign activity (including automated bounce retries) and billing activity (including your standard monthly fees and special projects). Stay up-to-date and see real-time information about all your campaigns, invoices, payments etc. Log in and click on Account. Click on the link to Account Activity and view activity sorted by date, click on any of the Invoice numbers to see the details of that billing cycle and charges incurred.

Billing Contact Info

Insert the contact information of the billing contact handling the account. This information facilitates accounting and customer service. Simply fill in the name, phone and email. Keep it updated—edits can be made at any time, simply click Save after modifying any field. This information is kept confidential. Are you an agency or consultant managing an account for another company? You can reference this in the comments field.

BrowserMail Logo Selector Tool

Select the image or logo you'd like to have your subscribers see upon opting in and also on the BrowserMail alerts. You get to customize your interface and subscriber experience with branded images. Simply upload your logo into the tool making sure that the size parameters and file types are followed.

Client Contact Info

Insert the contact information of the main person handling the account. This information facilitates training and customer service. Simply fill in the name, phone and email. Keep it updated—edits can be made at any time, simply click Save after modifying any field. This information is kept confidential. Are you an agency or consultant managing an account for another company? You can reference this in the comments field.

Footer Company Name

Inserts the name of your company or organization into the footer of every outgoing email message. Clearly identifying who you are and reinforcing permission is an essential component to successful permission email marketing. Enter your most recognizable company name to your recipients. If you'd like to update that information at any time simply correct the information in the company field and click Save.

Footer Disclaimer Override Tool

This tool provides you with a way to control the permission line in the footer of your email. Want to add a little more marketing information about what you do? Customize the text? Insert a logo? Add additional links? It's up to you, although keeping it permission-based is essential.

Log in and visit Account, click 'edit' after Disclaimer. Simply type your text and/or links in the appropriate box and click Submit to update the information. Don't forget to create both text and HTML versions of your disclaimer so all recipients will be able to view the information.

Use your editable disclaimer areas to add legal notices, copyright information and more to all of your emails.

Footer Privacy Policy Link

There is a link to your privacy policy in the footer of every email. Put your best foot forward and prepare a detailed privacy policy about what you do with your customer's email and information you gather. A privacy policy is an essential component to permission marketing. Always having a link to it will reassure your customers that you're a professional and ethical company to do business with. Enter in the URL to your website's privacy policy (no http required). Don't have one? Use ours as a base and get one together today. Don't have a website to post one to? You can still prepare one and post it to a Landing Page so that it is accessible from every outgoing email message.

Footer Website Hyperlink

Want to make your company name a hyperlink in the footer? Enter your URL in this field upon activation. Offer a quick and easy way for your customers and prospects to reach your website by using this field in your Account page. No website? No problem, simply leave the field blank and only your company name will appear in your footer. Enter your URL (no http required) into the field. Want to edit the page your customers can click to? Simply change the URL and click Save to update your changes.

Optional Header Tool

This tool allows you to add a top-line disclaimer in the header of your messages. Want to add a little more marketing information about what you do? Customize the text? Insert a logo? Add additional links? It's up to you. Log in and visit Account, click 'edit' after Disclaimer. Simply type your text and/or links in the appropriate box and click Submit to update the information. Don't forget to create both text and HTML versions of your disclaimer so all recipients will be able to view the information. Use your editable header to add legal notices, copyright information and more to all of your emails.

Password Update Tool

When activating your account, you select your account's password. Access to your account requires knowledge of your login information. Change your password at any time with this tool.

You control who shares access to your account. You can change your password at any time and rest easy knowing your data is safe. Upon activation, you select a password. Your password needs to be at least four characters; it can include numbers, but no spaces or punctuation. Your password can be modified from your Account page. To change your password, visit Account, enter and re-enter the new password and click Save.

Preferences

A selection of preferences that let you control certain elements of your account. You get to customize your interface. Simply select your preferences by clicking on the checkboxes.

Support Contact Info

Provide us with the appropriate support contact information (phone and email for your account).

If we ever receive communication about your account, it may be necessary to contact you. While we never provide client contact information, the support contact information, if necessary, may be shared. These are required fields and may be either your phone and email or main numbers and emails at your company.

Terms & Policies Access

Access the set of terms and policies agreed to upon activation. If you have a question, you can always check the policies! Log in and click on Account. Click on the link to any of the policies in your account. You can print them out at any time.

Time Zone Log

Indicate what time zone you reside in. This information facilitates training and customer service. Select your time zone from the drop-down menu upon activation.

Username Select Tool

When activating your account, you select your account's username. Access to your account requires knowledge of your login information. Your username is unique to your account. Upon activation, you select a username. Your username needs to be at least four characters; it can include numbers, but no spaces or punctuation. Your username becomes hard-coded in your account and cannot be edited.

BrowserMail Delivery

Subscriber Experience

The Opt-in Process

Subscribers opt-in to a list by completing the marketer's online opt-in form. After clicking "Go", a confirmation window appears (shown below) and the BrowserMail loading process begins . . .

Activation Confirmation

To confirm that a secure, private connection has been established, the subscriber will see the BrowserMail icon in their system tray (see below). Mac users will have a similar icon in their system dock. Subscribers will then receive their first BrowserMail message (an activation alert), which will open above your system tray. Subscribers can subscribe to as many lists, from as many organizations as they like with their personal BrowserMail key and utility.

BrowserMail Messages

Whenever subscribers receive a new message alert, a single click opens a new browser window and displays the message in the browser—NOT in their inbox. If they choose not to view the message at that time, a single click on the "X" in the upper-right corner will close the alert window and store the message in their History folder.

How to View Messages in the History Folder

All of a subscriber's BrowserMail messages are archived in their History folder and can be viewed at any time. Subscribers simply select the message they'd like to view or permanently delete. They can view messages by sender, view only unread messages and even sort by date, sender and subject line.

Managing Subscription Preferences

Subscribers have total control over all their subscriptions. For each company subscribers have subscribed to, they have company-specific controls and settings.

Delivery Options and List Management

Delivery options are "Send to BrowserMail," "Send to Email," or "Unsubscribe." The Subscription Preferences page also shows all of the lists a subscriber is on for a particular company. They can set the status for a list to "Deliver," "Pause," or "Remove."

Geek Speak

Here's a more technical description of BrowserMail for our geeky brothers and other inquiring minds: BrowserMail servers are Linux/MySQL/Apache platforms. BrowserMail applications are coded in PHP, C++ and Objective C. BrowserMail servers are maintained in geographically disparate tier-one, enterprise-class hosting facilities with five nines of availability and private OC-192 capable optical connectivity (no local loops) to the Level3 POP, coupled with redundant bandwidth through UUNet. Security is maintained with premium IDS, Cisco Firewall and 24/7 monitoring by CISSP certified Network Security Professionals. When a BrowserMail subscriber opts-in and downloads the Browser-Mail utility and personal key for the first time, BrowserMail inserts an entry in the Windows registry that allows it to run automatically at startup. The BrowserMail utility lives in a folder in Program Files, takes up less than 200 k of space and can be easily and permanently uninstalled whenever desired. BrowserMail does NOT deploy adware, spyware or any other invasive elements. BrowserMail does use a single cookie to identify existing subscribers' computers during the opt-in process for new subscriptions. The cookie does not contain personal information, nor does it track or otherwise monitor subscribers' activity. When BrowserMail is active, its icon appears in the system tray, and the utility periodically checks for new messages by transmitting its unique security key ID to BrowserMail's polling servers. When a new BrowserMail message is available, an alert window opens. If the subscribers elects to view the message immediately, the utility receives the message's encrypted URL, opens a new browser window and then displays the subscriber's message in the browser.

What is BrowserMail?

What is BrowserMail? BrowserMail is a next-generation messaging solution for permission and enterprise communications. Speed, security, reliability, creative control and unprecedented response rates make it ideal for permission marketers struggling with the limitations of email. Browser-Mail sets a new standard for permission marketing communications. For a complete description, please download the BrowserMail PDF Brochure.

How does BrowserMail work? Your subscribers opt-in and download a personal BrowserMail key and utility, which establishes a secure, communication stream through which you send your permissidon communications. Subscribers are alerted when they have a new message, which they view in their browser of choice. An extensive suite of BrowserMail tools help you manage every aspect of your campaigns. View a complete overview of the process from a subscriber's perspective.

Why is BrowserMail better than email? BrowserMail bypasses the email network and subscribers' inboxes to deliver highly targeted communications instantly, reliably and without being subject to filters, blocking, stripping or any of the other pitfalls of email delivery. You have full creative control, can include rich media, your reporting statistics are more accurate, and your response and conversion rates will be significantly higher than with email.

Can you send traditional email with BrowserMail? Yes, your subscribers can elect to receive your communications by email and can control all aspects of their subscription preferences. All BrowserMail production, list management, campaign and reporting tools will integrate and manage email communications as well.

Is rich media compatible with BrowserMail? Absolutely. BrowserMail can deliver communications with rich media elements such as video, audio, and animation without the compatibility restrictions typical of email. Now you can leverage rich media in your permission communications to drive even higher response and build affinity with your subscribers.

How much does BrowserMail cost? BrowserMail offer three solutions: a web-based, do-it-yourself solution where you access your account over any internet connection; a premium managed services solution where your account team would manage all aspects of your campaigns; and a enterprise solution where you would install a BrowserMail server in your own facility, managed by your own staff. Please use our contact form to request pricing information for your organization.

Campaign Manager

Campaign Description

Describing your campaign is an optional tool that enables you to insert a little more information about it. Your recipients never see this information. Keeping track of all your campaigns over time is a snap because you get to design your own "dewey decimal" system for organizing your email marketing assets. Enter a short description for your campaign (up to 255 characters) and then click save. This will help you identify the campaign in the future. Want to change a description before scheduling? Simply type in the new description and click Save.

Campaign List Selector

Tool enables you to assign the list used in your campaign. Select any of your lists for a mailing quickly and easily from the drop-down menu. Select the list of recipients for this campaign. If your desired list is already loaded in the system, use the drop down list to select it. If you would like to change the list that is already assigned to your campaign, just select the new list from the drop-down menu and click Save.

Campaign Message Selector

Tool enables you to assign the message used in your campaign. Select any of your messages for a mailing quickly and easily from the drop-down menu. Select the message for this campaign. If your message is already loaded in the system, use the drop down list to select it. If you would like to change the message that is already assigned to your campaign, just select the new message from the drop-down menu and click Save.

Campaign Name

Label your campaign according to whatever naming convention you would prefer. Your recipients never see this information. Keeping track of all your campaign over time is a snap because you get to design your own "dewey decimal" system for organizing your email marketing assets. Enter a name for your campaign (up to 100 characters) and then click Save. Want to rename a campaign before it's scheduled? Simply type in the new name and click save.

Campaign Scheduler

Schedule the launch day and time for your campaign. Kick back and relax, message delivery can be set up for any time in the future. You could be in Cancun when your campaign is launched. Once you have all the details filled in, you can schedule the delivery of your campaign by entering the month, day, year and time in the proper format (MM/DD/YY+HH:MM AM/PM+time zone) and click Save. This scheduler is smart—enter in minutes, hours or days (i.e. "10 minutes" or "1 hour") and the engine will do the math for you. Remember, we work round the clock so you can schedule your campaigns in advance!

Create New Campaign

Create a new campaign at any time. There's no restriction to the number of campaigns you can have. Send the same message to different segments of your list to compare performance or send targeted messages to your lists. Test offers, schedule times, you get the picture. Click Campaigns from the main navigation. Name and describe (optional) your campaign. Click Save. See your campaign appear in the directory.

Delete Campaign

Delete any pending campaign in your directory. Control your directory of campaigns. Change your mind? Delete unscheduled or scheduled campaigns. Load the campaign you'd like to delete. Click Delete and confirm the deletion. Scheduled campaigns can also be deleted, but you'll need to catch it before it's too late. You have approximately 90 seconds before the scheduled time to delete it before it's sent to the queue for delivery.

Delivery Selection Tool

When scheduling a campaign you will need to select what type of delivery method you'd like to use. Sometimes you will want to send a campaign only to your BrowserMail subscribers and other times to your email subscribers—you can choose. From the drop-down menu, select Bmail and Email (to go to all of the subscribers on your list and based on the subscriber's delivery preference they will receive the appropriate version for them), Bmail Only (will go only to subscribers who have their preference set to BrowserMail), Email Only (will go to the subscribers who have their preference set to email), and Email all will send the campaign via email to all subscribers on the list.

Edit Campaign Tool

Make changes to any element of your campaign. Change your mind or make a mistake? No problem, you can edit a campaign's subject line, reply-to email, message, you get the picture. Load the campaign you'd like to edit. Edit the text in the text boxes or select a different list or message from the drop-down menus. Once you've made edits, click Save. If you're editing scheduled campaigns, you'll need to re-confirm the delivery.

Header: From Email

Tool populates 'from' email in recipient's email. The From Email Assign Tool allows you to control what email address responses to your mailing go back to and because this is determined on a campaign-to-campaign basis, you may have multiple emails to facilitate streamlined communication. Insert the valid and working From Email, click Save. Your readers will be able to reply to this email.

Header: From Name

Tool populates 'from' field in recipient's email. The From Name is one of the most important factors to getting your email message opened and read. Recognition is key. Insert the From Name (typically this is your company name and not your individual name), click Save.

Header: Subject

Tool populates the subject line of recipients' email. Entice them to read on with a short, to the point subject line. Often this feature (along with the From Name and Preview Pane) makes all the difference. Enter the Subject that your recipients will see in the header section of your email. Keep it short and compelling (3 or 4 words max). Spam filters often search the subject line looking for triggers such as all caps, exclamation points, dollar signs, use of the word Free, etc, so keep it relevant and professional.

Pending Campaign Directory

Keep your directory of pending campaigns handy. With your most recently modified campaign on top, finding your campaigns is quick and easy. There's no restriction to the number of campaigns you can have. If you have your assets ready, simply schedule your campaigns to go out automatically. The pending campaign directory shows you the name of the campaign, whether or not it's scheduled, and the number of targets (emails) in the list. Click on a campaign's name to load it for editing. Pending campaigns stay put until they have all the assets they need to get scheduled or it's time for them to get transmitted, then you can learn about them in Reports.

Save Campaign

Save a new campaign or save changes to a newly-updated campaign. As long as you save, you can come back at any time and pick up where you left off. For new campaigns, name and describe the campaign and click on Save. For editing existing campaigns, simply make the changes and click Save. When you see a date plugged into the pending campaign table you know that you've saved and confirmed the sending of the campaign!

Send Test

Send a test version of a campaign before you launch the real deal. Put your colleagues to work for you and do a final QC! Preview the way a campaign will look when delivered. Always send a test before launching your real campaigns. The send test feature takes a snapshot of your campaign and sends it to the emails residing in your Test List (the hard-coded list in your List Tool). You can leave your List 'not assigned' or have your real targets selected in the List Tool, either way, your Test Campaign goes by default to the Test List. Load your campaign vitals, Save, then click Send Test. A message will appear confirming the delivery of your test campaign. You won't find tests in your Reports and features like Unsubscribe and Send-to-a-Friend aren't operational until the campaign is officially sent. Schedule an actual campaign to your Test List to check the reports and referral feature.

Form-Survey Producer

Auto Link

Landing Page URL tool automatically hosts and generates the unique URL of your message that you can use to link to your form or survey. Link your email message to forms & surveys that you create in your account. Link the pages to your website or even to other landing pages. Create the message in your account that you'd like to use as the page to host your form or survey (either by doing your own HTML or using the Design Wizard). Insert the appropriate form code. Click here for the samples. After saving the message, you'll find the Landing Page URL in the Utilities drop-down on the main message page. Click Go next to Landing Page URL and copy the link in the pop-up window and paste it into the appropriate link. Bear in mind that messages used for forms or surveys must remain in your account or the link will no longer work for your recipients. If you make edits to the page, those edits will also be viewable to your target audience.

Edit Mailform List

Allows you to designate which email addresses you would like to use with the Dog's Send Email Code. This security feature ensures that your form code is not misused by any third parties.

Simply click "Edit Mailform List" at the bottom of Lists and then add or remove email addresses from the list at any time.

Fixed Asset Tool

Create tools like brochure request forms or surveys and post them to your website.

Once you create the forms and surveys within your account, you can use them in many ways. Link components of your own website to the forms you create in your account or use the Landing Page URL in links to outbound email messages.

Simply use the Landing Page URL from a message and post it on your own site to link to forms & surveys or use it to insert into your email messages.

Post to Rich List

Use provided code to do your own forms or surveys. This code enables you to take the content from the form and send it to a rich list in your account. Upon submission of the form, the recipients sees a custom pop-up message and gets a confirmation email. There is a limit to 10 fields. Sometimes you don't want to receive a unique email from each respondent, but have the data posted to a list in your account where you can check the status and export the data on demand. Use the sample to prepare your version and insert the code into the design wizard or your own HTML.

Send Email Code

Use the provided code in your Help section to do your own forms or surveys. This code enables you to take the content from the form and send it to the email of your choice, under a specific subject line. Upon submission of the form, the recipient sees the URL of your choice (can even be another landing page in your account as a confirmation). There is no limit to the number of form fields used. This form code enables you to capture recipient data or preferences and generate real-time response. Use it for Contact Us pages, brochure request forms, quick surveys, RSVP for events and a host of useful tricks! Use the sample to prepare your version and insert the code into the design wizard or your own HTML.

Template Gallery

Check out the templates you can use to craft your forms & surveys. Templates are organized by the number of features that they offer (1 to 10). Both your custom templates and standard account templates are available in the Gallery. You can see the thumbnails at a glance and get a full-size view if desired by clicking on the thumbnail. Select Template of your choice by clicking the radio button underneath the template you want and then click Wizard. Forms and surveys are ideally viewed in web browsers. The Landing Page templates are designed at 750-800 pixels wide as typically web browsers are set to be viewed at 800 pixels wide. However, you can use any of the templates for forms & surveys.

HTML Design Wizard

HTML Editor

Grants you complete creative control over your finished product. The HTML editor allows you to tweak and finesse content until you're blue in the face; change font size/type/color/face, insert additional images, insert hyperlinks and mailtos. Do anything and everything with no HTML tagging required! You can quickly and easily create any aesthetic in your messages, altering the look and feel of your message has never been easier. Under the text box of any feature in the Design Wizard you can click the HTML Editor link to open the formatting window. Use the menu bar across the top to indicate what formatting changes you need to make. Close the Editor when your alterations are complete and check your text box for the newly inserted tags. Save and Preview to see your own creative genius at work.

HTML Tags

Finesse your message by editing it right in the Wizard with HTML Tags. Control the look and feel of your message. Add additional links, images, format the text as you wish, insert forms and mailto tags. you get the picture! Simply enter in the applicable HTML tag in the form fields. Click on the link HTML Tags to provide you with a selection of the most popular ones.

Image Preview

After uploading an image into the Wizard, you can see the newly uploaded image in the preview screen. At a glance, see the image you've uploaded and the feature it is assigned to. The image preview is automatically displayed upon upload on the left side of the wizard screen. The images are not to scale, so you will have to click on Preview to see the actual size and placement of your image in the message.

Link Creator

Want to insert links in your HTML message? No problem. Use the link creator tool to automatically create the HTML formatting for you. It's easy and your link will be instantly trackable when any of your targets clicks on the link in your message. Fill out both Link Text and Link URL to make it work. Link Text is the call-to-action your recipients will see in the message like "click here for more details". Link URL is where they go when they click. Be sure to put the whole URL into the box (including the http://).

Logo/Image Delete Tool

Remove images inserted into the design wizard. Insert the wrong image? Change your mind? These tools offer you the flexibility to edit the images you're using in your message. To delete an image, click Message on the right to return to the main message screen. Click the drop-down next to the Image Publishing Tool to identify the image you'd like to delete. Click on the name of the image. If desired, you can Preview the image to confirm. Check the box Delete image, finally click Save. Return to the Wizard, if needed, to continue working on your message.

If you see a little red 'X' in your message after deleting, simply save your message in the wizard so that your browser releases that image from its memory. Be sure to change your settings to ensure that you're checking for new versions of the page for every save.

Logo/Image Replace Tool

Replace your logo or images inserted into the design wizard. Insert the wrong image? Change your mind? These tools offer you the flexibility to edit the images you're using in your message.

To replace an image, click the Browse button in the feature you'd like to work with. Find the new image on your computer, click Open, after seeing the path to the file on your computer click Save. The image will be replaced with the newly uploaded image. If you don't see the new image after replacing an image, refresh your browser screen or change your settings to ensure that you're checking for new versions of the page for every save.

Logo/Image Uploader

Insert your company logo, masthead and images into the Design Wizard. Your logo and images will really make your email communications pop in your recipients' inbox. From within the feature you're working with, click Browse to search your computer for the desired image, click Open, then when you see the path to the image in the box, click Save to upload it. Be sure to use only web compatible images (*.jpg or *.gif), optimized for the web (72 dpi), and sized within the recommended pixel width.

Masthead Creator

This tool assembles your masthead including your logo, title and subtitle of your message. The top portion of your HTML email message that would show up in a target's preview pane is one of the most important elements to getting your message opened and read. Be sure to make the top portion attractive and compelling so that your readers will want to open it to read more.

Upload your logo and type (or paste in) your Title and Subtitle. Click Save and then Preview to see how it will look. When you send out your test message, be sure to pay attention to the preview pane to maximize your results.

Message Page Return

This feature sends you back to the main message screen where you can see your HTML loaded. Move back and worth from the main message screen to the HTML design wizard. When completed, click Message (on the right) and return to the main message area where you'll find your HTML loaded.

Message Preview

See what the HTML version of your message looks like. Even before you send out email, you can check the appearance of your message and even test the links. After working in the Wizard, click Save, then Preview. You don't need to fill out the entire form before you can Preview. The automatically-appended footer is depicted in the preview. Your company-specific information is loaded into the message upon transmission, along with the URL where the HTML version of your message can be found on the Internet.

Save Message

Save your edits in the Wizard. As long as you save, you can come back at any time and pick up where you left off. After working in the Wizard, click Save, then Preview. You don't need to fill out the entire form before you can Preview.

Template Gallery

Check out the templates you can use to craft your Message and Landing Pages. Templates are organized by the number of features that they offer (1 to 10). Both your custom templates and standard account templates are available in the Gallery. You can see the thumbnails at a glance and get a full-size view if desired by clicking on the thumbnail. Select Template of your choice by clicking the radio button underneath the template you want and then click Wizard.

Template Thumbnail & Tips

At a glance, see an image of the template you're working in and check out the template-specific tips. You'll stay oriented to the template you're working with and the tips will guide on the recommended size of images and other pertinent info. Look to the right to see the thumbnail and be sure to read the tips. You might want to check out the image parameters and have your images sized and ready to go—it makes assembly a snap!

Template Wizard

Dial in to the template–of your choice. You can not only switch to another template, but you can also change the number of features you're working with and the template wizard will move your content into another template. This is very convenient for seeing how your content will look in other templates. Simply select your choice from the drop-down menus at the top, click Save, then you can preview your new selection. You can safely move to other templates with the same number of features, and even move to templates with greater number of features. If you "downgrade" you will lose the content if moving to templates with fewer number of features.

Text Input Forms

Fill out a simple form to insert the text for your HTML message. Text for each of your feature articles can be typed or simply copied and pasted into the wizard input forms. It's easy to do! Write your copy ahead of time and simply paste it into the wizard or compose online. It's up to you. Need a lot of copy or a little, you're not limited. There are even forms for your captions for images. Type in the boxes or copy and paste. Just be sure you Save. Click Preview to see how your message is shaping up. You can edit your text with HTML tags to format it. See the link HTML Tags for a quick listing.

Image Manager

Delete Image Tool

Delete an image you've uploaded into the Image Publisher. Insert the wrong image? Change your mind? These tools offer you the flexibility to edit the images you're using in your message. Click the drop-down next to the Image Publishing Tool to identify the image you'd like to delete. Click on the name of the image. If desired, you can Preview the image to confirm. Check the box Delete image, finally click Save. Image caching in your web browser can be tricky. If you see an image you believe you've deleted try refreshing your page or clicking 'save' again to be sure!

Image Library

This tool provides a library to store frequently-used images in your own HTML or the Design Wizard. Want to add an additional image into the message you're creating in the Wizard? Or perhaps you'd like to make the text wrap around the image, but the template is not designed that way. Simply copy and paste the full image source right into the Wizard. Upload images into your library by using the Upload Image Tool. You can delete, replace or add images as needed. To find its source, click the drop-down next to the Image Publishing Tool. Click on the name of the image, and then click Preview. Your previewed image will pop-up into a window. Underneath the image will be its full source (location on our servers within your account). All of this information is needed in your own HTML. Highlight and copy the tag and paste it into the source code of your HTML or right into the Design Wizard. Using an HTML editor like FrontPage? Usually, all you'll need is the full URL (http:// . . . ).

Image Preview

Image Preview shows you the image you've uploaded into your message. Offers a quick and easy way to ensure you're using the right image and it's sized properly. Click the drop-down next to the Image Publishing Tool to identify the image you'd like to preview. Click on the name of the image, then click Preview. Your previewed image will pop-up into a window.

Image Source Tag Generator

Your images are hosted in your account and renamed in the process. Their full image source link is provided to you to use in your own HTML. Not only does this tool host your images, but the naming convention it uses offers you a quick and easy way to find your images in a hurry. The first image you upload is always named 'logo'. After that, each subsequent image is named 'img 1-10'. (Note that the first number in its name is the unique message ID number).

Click the drop-down next to the Image Publishing Tool to identify the image you'd like to preview and find its source. Click on the name of the image, and then click Preview. Your previewed image will pop-up into a window. Underneath the image will be its full source (location on our servers within your account). All of this information is needed in your own HTML. Highlight and copy the tag and paste it into the source code of your HTML. Using an application like FrontPage? Usually, all you'll need is the full URL (http:// . . . ). Need to know how wide an image is in pixels? Preview it and check out the width in the full source link.

Replace Image Tool

Replace images uploaded into the Image Publisher Tool.

Insert the wrong image? Change your mind? These tools offer you the flexibility to edit the images you're using in your message. Click the drop-down next to the Image Publishing Tool to identify the image you'd like to replace. Click on the name of the image. If desired, you can Preview the image to confirm. Click the Browse button to find the new image on your computer. Click open to see the path to the image on your system, finally click Save. If you don't see the new image after replacing an image, refresh your browser screen or change your settings to ensure that you're checking for new versions of the page for every save.

Upload Image Tool

Doing your own HTML and need somewhere to host your images? Upload your logo or images with the Upload Image Tool. Images in your own HTML need to be hosted on the Internet in order to display in your recipients' inbox. No server? No problem. Use this tool to upload your images right into your account. To upload an image, click the Browse button next to the Image Publishing Tool. Find the image on your computer, click Open, after seeing the path to the file on your computer, click Save. After the page refreshes, you will see the image's name within the drop-down menu below the tool. To upload another image, be sure to have the drop-down selected to New Image and repeat.

Landing Page Publisher

Archive Tool

Archive messages like newsletters and post them to your website. Keep track of your messages and offer your target audience a way to see old issues of your newsletters or resources. Simply use the Landing Page URL from a message and post it on your own site to link to past issues.

Landing Page Auto Link

Tool automatically hosts and generates the unique URL of your message that you can use as a landing page. Link your email message to landing pages that you create in your account. Use the pages for longer stories, photos, charts, graphs, order forms, surveys or anything you need to communicate with your target audience. Link the landing pages to your website or even to other landing pages. Create the message in your account that you'd like to use as the landing page (either by doing your own HTML or using the Design Wizard). After saving the message, you'll find the Landing Page URL in the Utilities drop-down on the main message page. Click Go next to Landing Page URL and copy the link in the pop-up window and paste it into the appropriate link. Bear in mind that messages used as Landing Pages must remain in your account or the link will no longer work for your recipients. If you make edits to the page, those edits will also be viewable to your target audience.

Landing Page Tracker

Allows you to track the click-throughs on landing pages published in your account. Find out not only which links your recipients are clicking on in your Messages but also the links they choose to click from your landing pages to other destinations.

Publish landing pages in your account and be sure to format any hyperlinks you'd like to track with quotes around the URL (<a href="URL">). When you're ready to view the click-throughs after the Campaign has launched, select the Landing Page Tracker from the Utilities menu on the Messages page and hit Go. A table of tracked URLs and the number of times each was clicked will be produced. The stats are given to you in real time.

Template Gallery

Check out the templates you can use to craft your Landing Pages. Templates are organized by the number of features that they offer (1 to 10). Both your custom templates and standard account templates are available in the Gallery. You can see the thumbnails at a glance and get a full-size view if desired by clicking on the thumbnail. Select Template of your choice by clicking the radio button underneath the template you want and then click Wizard. Landing Page templates are designed to be 750-800 pixels wide as they are viewed in the web browser and not the email reader. Typically web browsers are set to be viewed at 800 pixels wide.

List Manager

List Folders

The Lists Folder Tool allows you to organize your Lists into categories or folders.

When naming your list, simply enter the desired folder destination in the folder text box. If you want your list to go into an existing folder, make sure the names match exactly. Or, type in a new name to create a new folder. If no folder is designated the list will be added to the Default folder.

Keep your Lists organized any way you'd like. Have customers in one folder, vendors in another, the sky's the limit!

Add Address Tool

Add emails one-at-a-time to an existing list or start a new one. Sometimes you have a last minute addition or just want to create a small list segment. Select the list you'd like to work with, type in the email in the Add/Search box, click Add.

Add to List Tool

Adds or appends emails to a new or existing list. It's a snap to add emails and merge lists.

To add to a new list, click on Browse, ('Add to list' radio button is pre-checked), find file on your computer and click Save. Only new email addresses will be added as the platform de-dupes appended lists. Remember to check to for emails with bad syntax after each upload and fix them before using the list.

BrowserMail List Management Tool

The BrowserMail List Management tool will provide you with the ability to search and work with your list of BrowserMail subscribers. View a BrowserMail subscriber's name, email, unique BrowserMail ID, and their communication preference (whether they've elected to receive communications via email or BrowserMail. You can even switch their preference for them if needed. Go to Lists, and before loading a list, click on Bmail List to bring up the interface to query your BrowserMail list of subscribers.

BrowserMail List View & Export Tool

Allows you to display and/or export the number of subscribers in a list who have BrowserMail loaded and their communication preference set to BrowserMail. View or export the list of subscribers who have their preference set to BrowserMail, how many are active users, inactive users, have switched to email, have uninstalled or have opted in, but not yet completed the install process so that you can either optimize your messages or schedule segmented campaigns.

The counter engages automatically when loading a list. Load the list you'd like to work with and the BrowserMail statistics are loaded automatically for you.

BrowserMail Statistics Counter

Counts and displays the number of subscribers in a list who have BrowserMail loaded and their communication preference set to BrowserMail. See how many of your subscribers have their preference set to BrowserMail, how many are active users, inactive users, have switched to email, have uninstalled or have opted in, but not yet completed the install process so that you can either optimize your messages or schedule segmented campaigns. The counter engages automatically when loading a list. Load the list you'd like to work with and the BrowserMail statistics are loaded automatically for you.

Database Editor

Edit the profile information you have stored with an email address.

Add more information about an email or update existing info. Either way, you can manage your contacts using this tool. First select the list you'd like to work with, find the email in the results box (you may need to perform a search or display function first, click on it in the results box). Then click on Edit. The information stored with that email will pop-up into the Profile Page. If you make any changes, simply click Update to save your edits. Your list must be a Rich List in order to use the profile database tool.

Delete List Tool

Delete any list in your account as long as the list is not designated as an opt-in list. Control your directory of lists. Once a scheduled campaign has gone out to a list, you can delete it at any time (bear in mind that in the case of email it may take several days for a full reporting of bounce information to post to a list if you're using the bounce auto-resend feature).

Load the list you'd like to delete. Click Delete and confirm the deletion. There is no list recovery mechanism so be certain before deleting. While you can technically delete any list, you might want to carefully consider before you delete an opt-in list as these lists are visible in your subscribers' Subscription Management page.

Edit Mailform List

When using the form and survey engine to forward responses via email, this tool allows you to designate which email addresses you would like to designate as authorized emails. Responses will only be forwarded to authorized emails in your account's Mailform list. This security feature ensures that your form code is not misused by any third parties. Simply click "Edit Mailform List" at the bottom of Lists and then add or remove email addresses from the list at any time.

Email Address Editor

Update or fix improperly formatted recipient data.

Keep your list up-to-date and your bounces in control and maximize the success of your campaign by ensuring that your list is updated and properly formatted before you send to it. Just a few? From the Bounce Tool, select Show Hard Bounces, in the Results box, click on an email, fix it in the Add/Search Box, and then click Add. Remove the improperly formatted version. More than a few or working with Rich Lists? From the Bounce Tool, select Export Hard Bounces, save the file to your computer. Remove the hard bounces, by clicking Delete Hard Bounces, then Go (confirm deletion). Next edit subscriber data in Notepad (PC), SimpleText (MAC), or Excel, reformat the file if necessary, and append the fixed file.

Expandable Results Pane

The expandable results pane shows you the top portion of your list, plus displays the results of searches and bounce and unsubscribe sort results. Expandable from 5-10 lines, it also facilitates removing emails and unbouncing individual emails from a list. Essential to list management, the expandable results pane shows you all your searches and queries. The results pane does not display your entire list. To see your whole list, you may need to use the List Export feature. Hold the ctrl key down to select multiple emails in the box. To expand the view, check the Expand box, then click Save. To return to your original view, uncheck the Expand box, then click Save.

Export List Tool

Export a list out to your desktop or just view the list in its entirety.

Take a backup, export a list for printing, view a list in its entirety, you have full control to manage your data. Load the list you'd like to export. Click Export. Depending upon your browser and operating system, you will either get a box prompting an open or save feature, or the list will be displayed in the web browser window. If displayed in the browser window, copy and paste the emails into Notepad/SimpleText and save to your desktop.

Export Search Tool

Export a search for a specific recipient or group of recipients from a Rich List.

After searching a Rich List, you can export the query so that you can view, print, save or reupload your search. After searching, the results will be displayed in the Results box. If no data is found it will let you know. Results found within Rich lists will be available for export. Click on the link just under the Add/Search box for this feature. Open or save the file to your computer.

List Checker

When you add emails (via upload or individually), we check to be sure the email is properly formatted. Upon upload, any email with bad syntax is flagged in the list with a "?". When adding emails individually, you are alerted and given the opportunity to correct the problem. Keep your bounces in control and maximize the success of your campaign by ensuring that your list is properly formatted before you send to it. It's done automatically for you. Need to fix emails? You have two options. Just a few? From the Bounce Tool, select Show Hard Bounces, in the Results box, click on an email, fix it in the Add/Search Box, and then click Add. Remove the improperly formatted version. More than a few? From the Bounce Tool, select Export Hard Bounces, save the file to your computer, edit the emails in Notepad (PC) or SimpleText (MAC), remove the hard bounces, and append the fixed file.

List De-Duper

When you add emails individually or via upload, the emails are deduped from the list you're uploading and if applicable, into the list you're appending them to. You'll never have to worry about multiple entries in your list. It's done automatically for you. No need to worry.

List Description

Describing your list is an optional tool that enables you to insert a little more information about the list. Your recipients never see this information unless the list is designated as an opt-in list then the description provides your subscribers with details about the list they've subscribed to.

Keeping track of all your lists over time is a snap because you get to design your own "dewey decimal" system for organizing your marketing assets. Enter a short description for your list (up to 255 characters) and then click save. This will help you identify the list in the future. Want to change a description? Simply type in the new description and click Save.

List Directory

Keep your directory of lists handy. With your most recently modified list on top, finding your lists is quick and easy. Managing multiple lists? Numbered page flippers at the bottom of your list let you move through them easily. There's no restriction to the number of lists you can have (nor the number of subscribers in any list). Managing a master list or lots of segmented lists is up to you. They stay put until you delete them. The list directory shows you the name of the list, its most recent modification date and the number of subscribers in the list. Don't see your list, check to see if it's on another page using the numbered page flippers. Click on a list's name to load it for editing.

List Name

Label your list according to whatever naming convention you would prefer. Your recipients never see this information unless the list is designated as an opt-in list. Keeping track of all your lists over time is a snap because you get to design your own "dewey decimal" system for organizing your marketing assets. Enter a name for your list (up to 100 characters) and then click Save. Want to rename a list? Simply type in the new name and click save.

List Uploader

Start a new list or add emails to an existing list with the upload tool in 3 quick steps. Whether your list consists of 10 emails or 100,000 emails, the process is quick and easy. Plus, the required file format (*.txt) is universally accessible. Whether your emails are in a sophisticated database now or in an application like Excel or Outlook, it's a snap to create a text file.

1—Ready your file. PC users will need to prepare a Notepad file and save the file on their computer. MAC users will need to prepare either a SimpleText or TextEdit file and save the file on their computer ensuring that there is a (.txt) extension. Emails should be in a single column down the left with a single hard return between each record.

2—Click Browse and find the file on your computer. Click Open (you will see the path to your computer in the Upload file box).

3—Finally, click Save.

New List Tool

Create a new list at any time. There's no restriction to the number of lists you can have (nor the number of recipients in any list). Managing a master list or lots of segmented lists is up to you. Create targeted mailings to your subscribers based upon their demographic profile, campaign activity or other relevant segmentation requirement. Click New or Lists from the main navigation. Name and describe (optional) your list. Click Save. See your list appear in the directory. If you need to add profile information about the recipients, be sure to check the box Create a Rich List before saving.

Remove Address Tool

Remove an individual email (or selection of emails) from any list. Control who's on each of your lists. First select the list you'd like to work with, find the email in the results box (you may need to perform a search or display function first, click on it in the results box. Multiple emails can be selected by holding the ctrl key down. Click Remove, and then confirm the deletion.

Replace List Tool

Replace an existing list of emails with a newly imported one. Have a more current list you'd like to upload? Or just upload the wrong list? The Replace list tool gives you total control. To replace a new list, click on Browse, select the Replace radio button, find file on your computer and click Save. Existing emails in the list will be removed and only newly imported emails will remain in list.

Save List Tool

Save a new list or save changes to a newly-updated list. As long as you save, you can come back at any time and pick up where you left off. For new lists, name and describe the list and click on Save. For editing existing lists, simply make the changes and click Save.

Search List Tool

Search a list for an email address. Don't know the whole email? You can also search for a string of characters in a list. Search for a specific email or all the emails that begin with a single letter.

Enter the email or string of characters in the Add/Search box and click on Search. The results will be displayed in the Results box. If no email is found it will let you know.

Unsubscribe Filter

When you're adding emails to a new list or an existing list (whether you're uploading or adding individually), we're automatically checking against your master list of unsubscribes. If we find any, we flag them in the list for you.

Rest easy, even if you've deleted them from your list in the past, you can never mistakenly upload an email from someone who's opted out of your list.

It's done automatically for you. You can check to see if any emails were found by looking at the counter tool. Unsubscribed emails have a "#" symbol in front of them.

Upload Database Tool

Upload rich lists that contain not just the email, but up to 10 fields of information. Use these fields for names, addresses, contact information, tracking codes or preferences, it's up to you! Personalize your email communications with recipients' names, companies or other vital information. Or just more easily identify bounced or unsubscribed email addresses. The required file format (*.txt) is universally accessible. Whether your emails are in a sophisticated database now or in an application like Excel or Outlook, it's a snap to create a rich list.

1—Ready your file. PC users will need to prepare a Notepad file and save the file on their computer. MAC users will need to prepare either a SimpleText or TextEdit file and save the file on their computer ensuring that there is a (.txt) extension. Emails should be in a single column down the left with a single hard return between each record. Additional fields of information (max 10) should be tab-delimited after each email record.

2—Click Browse and find the file on your computer. Click Open (you will see the path to your computer in the Upload file box).

3—Finally, check the box Create a Rich List, click Save.

Validate Address Tool

If you're feeling geeky you can select and then "validate" an individual address. We will attempt to validate the address with the recipient's server and then return the server's response.

Unsure of an email addresses? Try to validate it before you send or check its status after it's bounced to see what message their server is sending to us. First select the list you'd like to work with, find the email you'd like to validate in the results box (you may need to perform a search or display function first, click on it in the results box. Next click on Validate and view the results in the pop-up box. Please note: an actual email is not sent, so no final determination regarding the email address' validity can be made.

View All Lists Tool

Use this tool to view all of your lists from a single page. At any time you view all your lists, their name, description, the folder they're in, the creation date, the last modified date, how many subscribers are in the list and whether or not the list is a rich list or an optin list. Go to Lists and click the View All Lists link.

WebPager List View & Export Tool

Allows you to display and/or export the number of subscribers in a list who have WebPager loaded and their communication preference set to receive WebPager. View or export the list of subscribers who have their preference set to WebPager, how many are active users, inactive users, have paused, have uninstalled or have opted in, but not yet completed the install process so that you can either optimize your messages or schedule segmented campaigns. The counter engages automatically when loading a list. Load the list you'd like to work with and the WebPager statistics are loaded automatically for you.

Message Producer

Message Folders

The Messages Folder Tool allows you to organize your Messages into categories or folders. When naming your Message, simply enter the desired folder destination in the folder text box. If you want your message to go into an existing folder, make sure the names match exactly. Or, type in a new name to create a new folder. If no folder is designated the Message will be added to the Default folder. Keep your Messages organized any way you'd like. Have newsletters in one folder, image galleries in another, the sky's the limit!

Auto Web-Link Generator

Tool automatically appends to the footer of every email the URL where the HTML version of your message can be viewed. For text-only readers, they have access to the HTML version of your message online. For HTML readers who have the HTML stripped or altered by their ISPs or SPAM filters, they have access to the HTML how it was intended to be viewed. Luckily, there's nothing to worry about as it's automatically appended every time you send email. The only exception to this is when using the Quick Mail feature.

Auto-Archive Tool

Upon transmission of your email campaign, the message is archived (or frozen) so that your targets will see the message as it stood when you scheduled it. Once a campaign is sent, you can modify the message or delete the message and it won't impact any previously sent campaigns. Additionally, you always have access to that archived version of your message so that you reference it at anytime. The auto-archive feature happens automatically so you can feel free to modify or delete messages after they've been sent. To access your archived messages, simply click Reports, load the campaign that your message was used in, click View in the detailed report to see your archived message.

Copy Message Tool

Use the Copy message tool to use an old message as the base for a new one—essentially a "save as" feature. This handy feature lets you create slightly different versions your message without having to re-create each message from scratch. Also useful for newsletters where a few of the features are recycled each month. Load the message you'd like to copy. From Utilities, select Save as new, click Go. A new message is created. Name and describe (optional) it, click Save. Edit the message as needed. Save all your edits.

Delete Message Tool

Delete any message in your account. Control your directory of messages. Once a scheduled campaign has gone out to a message, you can delete it or edit it at any time. Load the message you'd like to delete. Click Delete and confirm the deletion.

Design Wizard Connectivity

Use the design Wizard to create your HTML. Don't know HTML or pressed for time? Use this resource to put together the HTML for your message selecting from any of the templates in the Gallery. Custom templates are also available. Load the message you'd like to create. Click Wizard, select the template of your choice by clicking the radio button underneath the template you want and then Wizard again. Fill out the form, click Save, then Preview at anytime to see what you've created. When completed, click Message (on the right) and return to the main message area where you'll find your HTML loaded. Feeling adventurous? Edit the HTML in the box (or copy and paste it into an HTML editor to make your changes), Save the new version in the HTML box and Preview. Remember after making changes outside the Wizard, if you return to the Wizard and Save, your edits outside the Wizard will be lost. See HTML Design Wizard for more help.

HTML Version Loader

Most of your targets will receive the HTML version of your message. The HTML version of your message can be loaded by using the Design Wizard or you can simply copy and paste your own HTML into the HTML box. You have total flexibility should you want to create your own HTML. The engine will parse and track all of the links in your own HTML as well as any HTML generated by the Wizard. The MIME encoding ensures that recipients with text-only email readers will see the text version of your message when your HTML version can not be read. If you're doing your own HTML, simply copy and paste the source code into the box. Click Save, then Preview. Remember images must be hosted on a server and the link to their source must be included in the code. You can host images on your own servers or use the Image Publishing tool in your account to host the images. See Image Publishing Tool for details. All URLs in the code must have a set of double quotes around them in order to be tracked. See Reporting for more details.

Message Description

Describing your message is an optional tool that enables you to insert a little more information about it. Your recipients never see this information. Keeping track of all your messages over time is a snap because you get to design your own "dewey decimal" system for organizing your email marketing assets. Enter a short description for your message (up to 255 characters) and then click save. This will help you identify it in the future. Want to change a description? Simply type in the new description and click Save.

Message Directory

Keep your directory of messages handy. With your most recently modified messages on top, finding your messages is quick and easy. Managing multiple messages? Numbered page flippers at the bottom of your list let you move through them easily. There's no restriction to the number of messages you can have. Use old messages and modify them or use the Copy Tool to save an old message as a new one. Prepare standard messages that go out to new lists like welcome letters and electronic brochures. They stay put until you delete them. The message directory shows you the name of the message and its most recent modification date. Don't see your message? Check to see if it's on another page using the numbered page flippers. Click on a message's name to load it for editing.

Message Name

Label your message according to whatever naming convention you would prefer. Your recipients never see this information. Keeping track of all your messages over time is a snap because you get to design your own "dewey decimal" system for organizing your email marketing assets. Enter a name for your message (up to 100 characters) and then click Save. Want to rename a list? Simply type in the new name and click save.

New Message Tool

Create a new message at any time. There's no restriction to the number of messages you can have. Create segments of your customers based upon their purchases, lists of fresh prospects, internal lists of managers, and send them different versions of your message, you get the picture.

Click New or Messages from the main navigation. Name and describe (optional) your message. Click Save. See your message appear in the directory. If you need to use the Wizard to create your HTML you'd need to save a new message or load an existing message to find that option.

Preview HTML Tool

See what the HTML version of your message looks like. Even before you send out email, you can check the appearance of your message and even test the links. After creating your HTML version, click Save, then Preview. The automatically-appended footer is depicted in the preview. Your company-specific information is loaded into the message upon transmission, along with the URL where the HTML version of your message can be found on the Internet.

Preview Text Tool

See what the text version of your message looks like. Even if you receive HTML, you can see what the text-version of your message will look like to any of your targets who have text-only email readers. After creating your text version, click Save, then Preview. The automatically-appended footer is depicted in the preview. Your company-specific information is loaded into the message upon transmission, along with the URL where the HTML version of your message can be found on the Internet.

Quick Mail Tool

Send a copy of your message to an individual email without having to set up a campaign. Great for testing or sending a copy of your message to a colleague or last-minute addition to your list. Load the message you'd like to send. Click Quick Mail, fill out the headers completely (you can modify the subject line), click Send Mail. See confirmation of your request.

Save Message Tool

Save a new message or save changes to a newly-edited message. As long as you save, you can come back at any time and pick up where you left off. For new messages, name and describe the message and click on Save. For editing existing messages, simply make the changes and click Save.

Size Meter

Allows you to view the actual size (in bytes) of your message. Keep track of how large your messages are, being mindful of your email recipients and the size limitation of each message in your account. With any message in your account selected, go the Utilities dropdown and select Size Meter, hit Go. The table produced will tell you how large the text version (if your are working in an email message) and HTML version (if you are working on an email or BrowserMail message) of your message currently are (check the bytes for the current size and the percentage to know how much of the allotment you are using).

Text Version Loader

A portion of your recipients won't be able to view the HTML in their email reader. You can create the version of your message that they'll receive. Additionally you can elect to only send a text message (without an HTML version) but bear in mind that there is no technical way to track text-only email messages. The appropriate version of your message (HTML or text is automatically displayed to each of your targets). The MIME encoding ensures that your message can be viewed by all your targets. Create the text version by typing into the box or copying and pasting it from another application. Click Save, then Preview. Remember, clickable links are not a text-only feature in an email. You must include the full URL for any links.

Opt-In/Out Manager

Auto-Unsubscribe Filter

When you're adding emails to a new list or an existing list (whether you're uploading or adding individually), we're automatically checking against your master list of unsubscribes. If we find any, we flag them in the list for you.

Rest easy, even if you've deleted them from your list in the past, you can never mistakenly upload an email from someone who's opted out of your list. It's done automatically for you. You can check to see if any emails were found by looking at the counter tool. Unsubscribed emails have a "#" symbol in front of them.

BrowserMail Activation Message

After the subscriber successfully loads their BrowserMail Security Key and Utility, a BrowserMail Activation Message is immediately and automatically sent to the subscriber. The message gives the subscriber their first look at one of your BrowserMail communications and confirms that their subscription and BrowserMail preference is activated and working properly. The Activation Message is a fully-featured BrowserMail message which you design and can modify at anytime. We strongly recommend that you review the nature and frequency of the communications that you will sending them and also remind the subscriber that they can modify their preferences or unsubscribe at anytime. The Activation Message gives you an opportunity to show off the look and feel of your BrowserMail communications and inform subscribers with additional details about their subscription and your organization. Go to Messages and load the BrowserMail Activation message which is included in list of messages. Design or modify the message as you would any other BrowserMail message and then save the message. The message will be updated immediately and sent after all subsequent subscriptions.

BrowserMail Security Key and Utility

BrowserMail Security Keys are personalized and created during the subscription process to identify subscribers and establish private, secure communication streams between you and your BrowserMail subscribers. When a BrowserMail subscriber opts-in and downloads the BrowserMail security key and utility for the first time, BrowserMail inserts an entry in the Windows registry that allows it to run automatically at startup. The BrowserMail utility lives in a folder in Program Files, takes up less than 200 k of space and can be easily and permanently uninstalled whenever desired. BrowserMail does NOT use browser or session cookies and does NOT deploy adware, spyware or any other invasive elements. When BrowserMail is active, its icon appears in the system tray, and the utility periodically checks for new messages by transmitting its unique Security Key ID to BrowserMail's polling servers. When a new BrowserMail message is available, an alert window opens. If the subscribers elects to view the message immediately, the utility loads message's encrypted URL in a new browser window and then displays the subscriber's message in the browser. The BrowserMail Security Key and Utility is pivotal to establishing secure, private and permission-based communications with your subscribers. Third parties cannot tamper with your communications nor can they invade the communication stream you've established with your subscribers. Only you and other senders, which the subscriber has also given their express permission to, can send communications to the subscriber's BrowserMail account. The creation, authentications and operational process is all automatically managed by BrowserMail. You can view subscriber's security IDs and other profile information in your List Management set of tools.

BrowserMail Subscription Form

The BrowserMail subscription form is used to subscribe individuals to a particular list where the subscriber's preference is to receive their communications via BrowserMail. You can capture as much or as little subscriber information as you desire however it is recommended that you at least capture the subscriber's name and email address. When the subscriber completes the form, a personalized BrowserMail Security Key is produced and downloaded to the subscriber's computer. The subscriber's information is automatically posted to your BrowserMail account and their delivery preference is set to BrowserMail. Your BrowserMail subscribers are directly and securely connected to your BrowserMail platform and thus you can reliably and immediately communicate with them without third party intervention such as blocking or filtering. You can also craft your communications with complete creative control using optimal language, images, layout and/or rich media for your communications. Ask your BrowserMail support team for the BrowserMail form code that you would use on your web pages. You can tweak the look and language of the form to best fit the look and feel of your web page. Once the form is operational, the subscription process becomes automatic and you will be able to track subscriptions using BrowserMail's list tools.

BrowserMail Subscription Manager

BrowserMail's Subscription Manager provides a comprehensive set of tools and utilities for managing subscriptions (opt-ins), unsubscriptions (opt-outs) and subscriber delivery preferences.

You can offer four types of online subscription forms to your target audience: BrowserMail only, WebPager only, Email only or allow the subscriber to choose between BrowserMail and Email during the subscription process. Any of the subscription forms can be easily integrated into the HTML of your website pages, can be designed anyway you wish and can feature as many data fields as necessary to capture additional information from the subscriber. All of your BrowserMail communications feature a footer with links for the subscriber to access and modify their delivery preferences or unsubscribe from your lists. BrowserMail's Subscription Manager processes all subscriber requests instantly and filters all incoming and outbound lists to ensure that communications are not sent to anybody on your lists that has unsubscribed. Many other subscription tools and utilizes and features help you manage subscriptions and guarantee your compliance with responsible permission communication practices.

BrowserMail Subscription Preferences

Every BrowserMail communication has a link on the bottom for accessing their personal subscriber preferences. Subscribers can view every organization and list that they've subscribed to with BrowserMail. Subscriber's can pause delivery, restart delivery, remove themselves from a particular list, switch delivery to email, change their email address or unsubscribe from all lists from a particular organization. All modifications take effect immediately except an email address update which triggers an email confirmation message and requires a response back from the subscriber to confirm the address (subscriber simply clicks a confirmation link in the message).

Giving the subscriber instant and total control over their subscription preferences is a very important quality of permission-based communications. Your subscribers will feel more confident that their privacy and security is respected by you and that they have ultimate control over every aspect of their subscriptions. Subscribers click on the "Subscription Preferences" link at the bottom of their BrowserMail communications. Once authenticated, the subscriber can modify any or all of their preferences.

Counter Tool

Counts the number of emails who've unsubscribed from each list. Keep track of your subscribers and their preferences. You can never send email by mistake to them, but knowing how often it happens and who is unsubscribing will help you tailor your content and adjust your frequency accordingly. Find the list you'd like to check. You'll find the number of the emails who've unsubscribed from the list next to the Unsubscribe tool. Unsubscribed emails have a "#" symbol in front of them.

Custom Confirm Messages

Opt to use the default messages or control the pop-up window and confirmation email sent to people who subscribe or unsubscribe to your list. Insert your logo, text, and links. Start the selling process or just send them samples of your messages. It's up to you. Want to go custom? Simply create the subscribe and unsubscribe confirmation messages in your account. Be sure to create an HTML and text version of each. Use the unique ID number of the message in your opt-in form code. The HTML version of the message is the pop-up confirmation message. Remember to resize the pop-up window javascript in the form code based upon the size of your message.

Custom Opt-In/Out Forms

Custom opt/in out form allows users to add themselves to opt in (or out) to your list via a form on your website and the data is deposited into your account. Pop up windows validate requests and confirmation emails are automatically emailed. You decide what information you're requesting from your subscribers, what list they're subscribing to and what confirmation messages they see. Grow your list by offering visitors to your site an easy way to subscribe to your mailing list. This form also works in tandem with the referral tool. When you send out your email with a referral link on it, put a link in your message back to your site for people not on your list to subscribe themselves. Use the sample posted in Help for the basics. Email is a required field, but you can also collect up to 10 additional fields of information, electing to make each field optional or required. Need help? Just ask for assistance.

Email Confirmation Process

Whenever a new subscriber opts-in to one of your lists, a Confirmation Message is immediately sent by email to the email address used in the subscription form. The message gives the subscriber their first look at one of your BrowserMail email communications and confirms that their subscription and Email preference is activated and working properly. The Confirmation Message is a fully-featured BrowserMail Email message which you design and can modify at anytime. We strongly recommend that you review the nature and frequency of the communications that you will sending them and also remind the subscriber that they can modify their preferences or unsubscribe at anytime. The Email Confirmation Message can, if so desired, require a confirmation response from the subscriber. The Email Confirmation Message gives you an opportunity to show off the look and feel of your BrowserMail email communications and inform subscribers with additional details about their subscription and your organization. If you require a confirmation response (sometimes referred to as "double opt-in"), you will also have access to a log which archives the details of every subscription and confirmation for reference purposes when dealing with SPAM report issues. Go to Messages and load the Email Confirmation Message which is included in list of messages. Design or modify the message as you would any other BrowserMail email message and then save the message. The message will be updated immediately and sent after all subsequent subscriptions. Select "Confirmation Required" option if you wish the Email Confirmation Message to require a response from the subscriber prior to activating their subscription.

Email Subscription Preferences

Every BrowserMail email communication has a link on the bottom for accessing the recipient's personal subscriber preferences. Subscribers can pause delivery, restart delivery, remove themselves from a particular list, switch delivery to BrowserMail, change their email address or unsubscribe from all lists from a particular organization. All modifications take effect immediately except an email address update which triggers an email confirmation message and requires a response back from the subscriber to confirm the address (subscriber simply clicks a confirmation link in the message). Giving the subscriber instant and total control over their subscription preferences is a very important quality of permission-based communications. Your subscribers will feel more confident that their privacy and security is respected by you and that they have ultimate control over every aspect of their subscriptions. Subscribers click on the "Subscription Preferences" link at the bottom of their BrowserMail email communications. Once authenticated, the subscriber can modify any or all of their preferences.

Export Tool

Export the emails of people who've unsubscribed from any list or your master list. Want to update your internal database? Your data is always at your fingertips. From the Unsubscribe tool, select either Export or Export Master List, then click Go. The pop-up box will ask you to either open or save the file.

Instant Unsubscribe

The unsubscribe link is automatically appended to the footer of every email you send. Your recipients can click to opt out and their email communication preference is immediately recorded in your account. You can never mistakenly send email to someone who's unsubscribed from your list. The ability to opt out in a clear and easy fashion is the cornerstone of any permission marketing campaign. Making it an automated process just makes it a little easier for you. Luckily, there's nothing to worry about.

List Purge Tool

Remove either a single unsubscribed email or all of them from any list.

Although we don't mail to those addresses if they reside in your list, you may want to keep only valid targets in your list. Select the list you'd like to purge, to remove individual emails who've unsubscribed, first do a search to view them in the results pane. Click on the unsubscribed email you'd like to purge, click Remove, confirm the removal. To purge your list of anyone who's unsubscribed, select Remove all from list in the Unsubscribe tool, click Go.

List Selector

An integral component of your opt-in/out form will require you to think about where you'd like your subscribers' emails to go in your account. Use the default list in your account, or simply use the unique list ID number in your form to send subscriber data to the list of your choice.

Control your subscriber data and segment your lists based upon either the source of their subscription or the interests of individual subscribers. If you're capturing more than just an email, you'll need to work with a Rich List. Create a list in your account and use its unique ID number in your form code to direct subscriber data. The unique list ID can be found at the end of the url when you are working in any list in your account. Simply check the end of the url in your browser for ID=and the unique number will be listed.

Manual Unsubscribe Tool

Manually add an email to your master list of unsubscribes. Have someone who's let you know they would like to be removed but didn't click the link in the footer? It's easy to add emails to your master list of unsubscribes so you don't have to worry about them again. Go to Lists. Simply enter their email in the Unsubscribe Tool, click Go, then confirm the addition by clicking Yes.

Master Opt-Out List

Anytime a recipient clicks on the link to unsubscribe, their email is flagged in the list that they came from, but more importantly, a copy of that email is inserted into your Master List of unsubscribes. Anytime you add or send an email, a check is made to see if that email resides on your Master List, if it does, it's flagged in your account (if you're adding) and suppressed (if you're sending). Rest easy since you can never by mistake send email to someone who's unsubscribed from your account. This is an automated feature, but you can view your master list or export your master list at any time. From Lists, click on the link to Removals List; or from within a selected list, click on View Master or Export Master from the Unsubscribe drop-down tool and click on Go. Unsubscribed emails have a "#" symbol in front of them. You can also see the date the subscriber unsubscribed.

Optin Log

The Optin Log provides you with a listing of all your subscriber's who've used your account opt-in form, the date they've subscribed and the list that they've opted in to.

At any time you can check to see who's opted in and when.

Visit Lists and before loading any particular list, click on Optin Log to see a full accounting.

Pre-Loader

Add individual emails or have a list uploaded to your account of emails you'd like to unsubscribe from your list. If you've been doing permission marketing and have emails of subscribers who've already unsubscribed from your list, you can load them to your account's master list of unsubscribes even before sending a campaign so you don't have to worry about them.

Use the Manual unsubscribe tool to add emails individually or contact us to upload a file into your account.

Profile Data Capture

You can capture a little more information about your subscribers than just their email. Collect up to 10 additional fields of information. You control what you'd like to know . . . name? company? You get the picture. You want to make it easy to subscribe to your list, but sometimes capturing additional information is not only important, but will also enable you to use the personalization feature and learn a little more about your target audience.

Use the example to assemble your own opt-in/out form for your site. Remember you can also post your form to a landing page. Need help? Just ask for assistance.

Personalization

Personalization Tags

Insert up to 10 different fields of information in your message.

Provide relevant information for your targets or just get cozy by inserting personal data or images that will get their attention.

Each field in your rich list is numbered. Insert the following tag into your message: $field_X where X is the number of the field. It's case-sensitive so make sure it's lower-case and the numeral corresponds with the field in the rich list you're trying to merge. You can insert the tag into your own HTML or right into the design wizard. You can merge the text version too, simply insert the tag into the text-version of your message. When you preview with the Message tools, you'll just see the tag. Be sure to upload some sample rich data into your Test List so that when you send a test of your campaign, you can check the placement of the merged text and images.

Rich List Creator

Upload rich lists that contain not just the email, but up to 10 fields of information. Use these fields for names, addresses, contact information, tracking codes or any data you'd like to merge into the message, it's up to you! Personalize your emails communication with recipients' names, companies or other vital information. You can even send personalized images! Whether your emails are in a sophisticated database now or in an application like Excel or Outlook, it's a snap to create a rich list.

1—Ready your file. PC users will need to prepare a Notepad file and save the file on their computer. MAC users will need to prepare either a SimpleText or TextEdit file and save the file on their computer ensuring that there is a (.txt) extension. Emails should be in a single column down the left with a single hard return between each record. Additional fields of information (max 10) should be tab-delimited after each email record.

2—Click Browse and find the file on your computer. Click Open (you will see the path to your computer in the Upload file box).

3—Finally, check the box Create a Rich List, click Save.

To see the additional information, either export the list or click on a single record in the results box and click the Edit button.

Want to personalize with images? Simply upload the full path the image in the text file.

Referral Engine

Co-Branded Referral Page

Provides a co-branded online form for your recipients to fill out to send your messages to their friends or associates. Your recipients can quickly fill out a form to send a copy to a friend. They can include a personal note that we put on top of your HTML message (along with a disclaimer notifying the recipient that their email has not been permanently recorded nor have they been subscribed to any list). From your Account page, upload the logo or image you'd like used on your referral page. After that, there's nothing to worry about. Just insert the referral tag into your messages (or have it hard-coded into the masthead of a custom template) and let you messages do double-duty for you.

Referral Tag

Insert a link that enables your recipients to send a copy of the HTML message to a friend. They click on a link, fill out the form, include a personal note if desired, and we zip out a copy of your message. Your own customers and prospects are often your best advocates! Leverage their loyalty and enable them to spread the word. This tool works nicely in conjunction with the opt-in/out management system. So don't forget to insert a link in your message that enables your recipient's friends to get back to your website to subscribe to your list.

Load the message you'd like to work with, on the main Messages page, from the Utilities drop-down, select Referral, click Go. Copy the URL in the pop-up window and paste it either into your own HTML or into the Design Wizard. You can use it as many times as you wish in the message. Want to change the call-to-action? No problem, simply replace the text between the tags. Bear in mind that the referral tag only works for campaigns (not tests or the Quick Mail tool).

Referral Tool Counter

Count the number of times the referral tool was used in the campaign. Learn how often your message is sent-to-a-friend. Use the tool in all your messages to maximize your reach. Find it in the drill-down view of reports. Load the campaign you'd like to review, click the campaign's name, in the Statistics table, check the number next to referral. We don't capture and store the email addresses of the people who get emails forwarded to them because they haven't opted in to your list. So be sure to include a link to your opt-in/out form on your website so that they people who get the message forwarded to them have a way to subscribe to your lists.

Report Manager

BrowserMail Reporting

With the exception of the following specific BrowserMail reporting statistic, all reports and statistics are consistent across all three delivery methods (email, BrowserMail and WebPager). For example, "opens" shows the number of recipients that opened and presumably read the communication. The only BrowserMail-specific report category is "Processing", which displays how many BrowserMail subscribers have not yet received an alert indicating that their computer or the BrowserzMail utility is shut down.

Browsers Report

Identifies and reports on the browsers your readers are using to read your email. Table displays the number of users on each browser as well as the percentage of total. Get wise to how technologically savvy your recipients really are and which browsers they prefer to use. Refresh your browser to see the latest stats. Click Reports in the main Nav Bar to return to the Campaign Directory listing.

Campaign Directory

Keeps your directory of campaign reports handy. With your most recently sent on top, finding your campaigns is quick and easy. Numbered page flippers at the bottom of the list let you move through them easily. There's no restriction to the number of campaigns you can send. They stay put until you hide them. With your most recent campaigns on top, the campaign directory shows you the name of the campaign and other vital information. Don't see it? Check to see if it's on another page using the numbered page flippers or if you've elected to hide it.

Campaign Reports Display Tool

Select which campaigns you would like to display and include in the general campaign stats counter. View general campaign stats on any or all of your campaigns. A general campaign counter tool provides aggregate totals for the campaigns you have selected. Choose to either select or hide each campaign. From the drop-down menu, select whether to view selected, hidden or all your campaigns.

Campaign Summary Counters

Counts the number of campaigns, targets, unsubscribes, opens and clicks for the selected campaigns. Adds your totals and keeps you informed about your campaigns. Simply select whether you want to view or hide the campaigns. Hide campaigns you don't want counted. The counter automatically does the math for you.

Campaign Summary Statistics

Displays campaign name, date launched, number of targets, list used, message name, unsubscribed total, number of opens and number of clicks. At a glance, check out general campaign statistics. Compare various campaign's stats using the display tool. Want to see the improvement of your monthly newsletters over time? Hide all your other campaigns. You get the picture. Select whether you want to view or hide the campaigns. Hide campaigns you don't want counted. Compare the performance of certain types of campaigns vs. others. Bear in mind general campaign stats take a few minutes to catch up with the real-time drill-down view.

Campaigns Summary Report

The summary table reports the campaign name, description, day/time launched, list used, message used, archived view of message, targets, header (from name, reply-to address, subject).

Jog your memory with top-level details about a campaign. Plus, as you're studying response take a close look at the subject line and send date and time to see if there's a better window for your target audience. Load the drill-down view of the campaign you'd like to study in reports, by clicking on its name. The summary table is in the upper left corner of the drill-down page.

Clickthroughs Export Tool

Export the unique email addresses that clicked on one or more links in your message and view the percentage of emails who clicked (compared to emails sent). Strive to keep your message relevant and compelling to your target audience. Clickthrough rate is one of the key metrics in evaluating campaign performance. Check out who's your most active reader. To get the list of unique clickthroughs, click Export, depending upon your browser, you'll be asked to either open or save the file to your desktop, or alternatively, view the list in your browser window. If you see the list in your browser window, copy and paste the emails into Notepad (PC) or SimpleText/TextEdit (MAC) and save it to your desktop. In order for links to be parsed and tracked they must be properly formatted. Links should have the following convention in your HTML: (If you use the Wizard and insert your text into the Link Text and Link URL boxes, it's done for you.)

Clickthroughs Report

Lists each link used in the campaign and reports upon its activity, the number of unique emails clicking on it and the percentage of emails who clicked (compared to all the other links).

There is no limit to the number of links you can have tracked in a single message. We'll even parse and track the links in your own HTML (when formatted properly). These real-time stats help you seriously segment your recipients and target the right people with the right message. Refresh your browser to see the latest stats. Click Reports in the main Nav Bar to return to the Campaign Directory listing. Notice that the number of total clickthroughs probably exceeds the number of unique clicks. This means some respondents clicked on more than one of the links in your message. In order for links to be parsed and tracked they must be properly formatted. Links should have the following convention in your HTML: (If you use the Wizard and insert your text into the Link Text and Link URL boxes, it's done for you.)

Detailed Campaign Report

Displays detailed reports on each campaign. Live, real-time reporting displays up-to-the-second stats on every aspect of your campaign. What could be better? Click on the name of the campaign from the Campaign Directory to drill down to five detailed tables of information. Refresh your browser to see the latest stats. Click Reports in the main Nav Bar to return to the Campaign Directory listing.

Excel Report

Allows you to instantly export all of the assets for any real-time report in your account. Having easy access to a spreadsheet of any campaign report makes printing, emailing, sharing and compiling a snap! Simply click the 'Excel Report' link at the bottom of your drill-down reporting page for any campaign and then save (on a PC) or copy and paste (on a MAC) the produced document. Export reports for each campaign to make compiling and cross referencing stats a breeze.

Link-Specific View/Export Tool

You can export text files of the recipients who clicked on individual links.

These real time stats help you seriously segment your recipients and target the right people with the right message. Upload these lists to further segment your audience.

To get the list of respondents who clicked on a specific link, click Export, depending upon your browser, you'll be asked to either open or save the file to your desktop, or alternatively, view the list in your browser window. If you see the list in your browser window, copy and paste the emails into Notepad (PC) or SimpleText/TextEdit (MAC) and save it to your desktop.

Message Archive Tool

View an archive of the message you used in a campaign. Want to see what your targets received? Perhaps you've deleted or edited the message since you've sent it and you'd like to retrieve it? The message-archiving tool is a dream. Click on View next to Message to see the archived message. Want to copy it to put back in Messages? When viewing the message, right-click and select View Source. Highlight and copy the HTML code and paste it into a new Message in your account, then Save. If you'll be sending it again, you may want to remove the footer in the HTML code to prevent your targets from seeing a second footer.

Opens Export Tool

Export the emails of respondents to your campaign. Numbers are good measures of general performance, but recipient-level reporting is the bees-knees when it comes to follow-up and segmenting your list based upon interest to your message. To get the list of opens, click Export, depending upon your browser, you'll be asked to either open or save the file to your desktop, or alternatively, view the list in your browser window. If you see the list in your browser window, copy and paste the emails into Notepad (PC) or SimpleText/TextEdit (MAC) and save it to your desktop.

Platforms Report

Identifies and reports on the operating system your readers are using to read your email. Table displays the number of users on each platform as well as the percentage of total. See who is using what and better understand your audience's platform preferences. Refresh your browser to see the latest stats. Click Reports in the main Nav Bar to return to the Campaign Directory listing.

Real-Time Statistics Report

See how many emails were sent, how many were delivered (some may have bounced), how many are still left to be delivered or queued, how many bad or bounced emails were identified, how many HTML emails were opened and of those, how many recipients clicked on the links within the message, how many unsubscribed, and how many times your message was referred.

Most campaign activity happens within 48 hours, (ideally within minutes after sending your campaign) so check out real-time stats for all performance aspects of your campaign. Refresh your browser to see the latest stats. Click Reports in the main Nav Bar to return to the Campaign Directory listing.

Referral Tool Counter

Count the number of times the referral tool was used in the campaign. Learn how often your message is sent-to-a-friend. Use the tool in all your messages to maximize your reach. Check out the real-time stat for how many times your message was referred. We don't capture and store the email addresses of the people who get emails forwarded to them because they haven't opted in to your list. So be sure to include a link to your opt-in/out form on your website so that the people who get the message forwarded to them have a way to subscribe to your lists.

Target Activity Report

This export tool reports at a recipient level, listing each email respondent on your open list, the number of links they clicked on and which links in your message they clicked on. Perfect for internal data mining, gives you a quick look at what each person did with the message you sent. Helps you better understand each person on your list and what they are interested in.

To get the list of target activity, click Export, depending upon your browser, you'll be asked to either open or save the file to your desktop, or alternatively, view the list in your browser window. If you see the list in your browser window, copy and paste the emails into Notepad (PC) or SimpleText/TextEdit (MAC) and save it to your desktop.

Smart Templates

Anchor Tags

Click on a link in the table of contents of your newsletter to bring your reader to a place lower in the email message. Don't make your readers scroll through a lengthy message. Give your readers a quick way to get right to the point that interests them with anchor tags. Anchor tags are available in many of the standard templates and are an available feature for any custom template.

Clickable Footers

Hard-code links on your footer to your website home page, contact information, referral tool, etc.

Look more professional and offer an easy way for your readers to get the information they need. Plus it saves you time assembling your messages. Clickable footers are an available feature in custom templates or when you do your own HTML. Need help? Just ask for assistance.

Clickable Nav Bars

Hard-code links on your masthead to your website home page, contact information, referral tool, etc. Look more professional and offer an easy way for your readers to get the information they need. Plus it saves you time assembling your messages. Clickable nav bars are an available feature in custom templates or when you do your own HTML. Need help? Just ask for assistance.

Convertible Templates

Convertible templates offer the flexibility of multiple features that collapse entirely if there isn't content to fill them. From message to message you can change the number of features you need and the template expands and contracts accordingly. You can use just one template for most of your needs instead of needing multiple templates. Simply fill out the features in the Wizard, if you don't need it, leave it blank and it will disappear from your preview. There are convertible standard templates in the Gallery, you can identify them by their name such as 1-4, 2-3, 1-10 etc. Getting a custom template? Be sure to make it convertible!

Custom Templates

Have a custom template made and loaded into your account's gallery. Want your newsletter to match your site? Need a matching landing page? A custom template is for you. Create your own design and add anchor tags, logos and more. Custom templates work just like the templates in the gallery and are fully integrated with the Wizard for ease of use. There are two components to custom templates (how they look and their functionality). There are countless options. Need help planning it out? Just ask for assistance. Programming and design are billed hourly.

Expandable Text Blocks

Text boxes expand to accommodate the text you insert. Although you want to keep your message short and sweet, you decide how much text you need to convey your message. Simply type in your text or copy and paste it from an application like Word. Having your text composed makes assembly in the Wizard a snap.

HTML Friendly

Finesse your message by editing it right in the Wizard using HTML Tags right in the text fields or the HTML Editor if you have access. Control the look and feel of your message. Add additional links, images, format the text as you wish, insert forms and mailto tags . . . you get the picture! Simply enter the applicable HTML tags in the text fields (or edit your content in the HTML Editor's window). Click on the link HTML Tags to provide you with a selection of the most popular ones.

Rich Media Integration

Adds flash movies, video, audio and music to your email message. The "rich media" is not embedded or attached to your message, rather its linked to a rich media server. When used discreetly, rich media elements can help drive attention and help illustrate key qualities of your offer.

If you host the rich media yourself, you can simply link to it in your email messages. If you require development or hosting services contact your account executive.

WebPager

Deploying WebPager

Include a WebPager optin form on each page that you wish to offer subscriptions to and then add the new web page's name, URL and list ID using the WebPager tool set. Susbcriber information colelcted in the WebPager subscription form will be automatically added to the specified WebPager list. The WebPager technology offers subscribers three ways to receive alerts:

1) Pre-determined schedules. Subscribers can set up a specific date and time schedule, or an interval (such as "once per week") to alert them to visit the web page. 2) Subscribers can set their WebPager to "automatic", which puts WebPager in auto-pilot mode whereby WebPager will scan subscribed to pages on a regular basis, and then trigger an alert when it determines that a particular web page content has changed significantly enough to warrant an alert. 3) Webmasters can send alerts on demand by using the WebPager tool set and selecting the web page, composing a note to be included with the alert, and then sending the alert manually.

WebPager Activation Message

After the subscriber successfully loads their WebPager Security Key and Utility, a WebPager Activation Message is immediately and automatically sent to the subscriber. The message gives the subscriber their first look at one of your WebPager Alerts and confirms that their subscription and WebPager is activated and working properly. The Activation Message is a default alert which will link to the page that was just subscribed to. The Activation Message gives you an opportunity to show off the look and feel of your WebPager alerts and demonstrates how WebPager works. The WebPager Activation Message and link is automatically configured and sent with each new subscription to each of your WebPager pages.

WebPager List Management Tool

The WebPager List Management tool will provide you with the ability to search and work with your list of WebPager subscribers. View a WebPager subscriber's name, email, unique WebPager ID, and their communication preference. Go to Lists, and before loading a list, click on WebPager List to bring up the interface to query your WebPager list of subscribers.

WebPager Security Key and Utility

WebPager Security Keys are personalized and created during the subscription process to identify subscribers and establish private, secure communication streams between you and your WebPager subscribers. When a WebPager subscriber opts-in and downloads the WebPager security key and utility for the first time, WebPager inserts an entry in the Windows registry that allows it to run automatically at startup. The WebPager utility lives in a folder in Program Files, takes up less than 200 k of space and can be easily and permanently uninstalled whenever desired. WebPager does NOT use browser or session cookies and does NOT deploy adware, spyware or any other invasive elements. When WebPager is active, its icon appears in the system tray, and the utility periodically checks for new alerts by transmitting its unique Security Key ID to WebPager's polling servers. When a WebPager page has been updated, an alert window opens. If the subscribers elects to view the page immediately, the utility loads the web page's encrypted URL in a new browser window and then displays the subscribed-to web page in the browser. The WebPager Security Key and Utility is pivotal to establishing secure, private and permission-based communications with your subscribers. Third parties cannot tamper with your communications nor can they invade the communication stream you've established with your subscribers. Only you and other web pages, which the subscriber has also given their express permission to receive update alerts from, can send alerts to the subscriber's WebPager account.

The creation, authentications and operational process is all automatically managed by WebPager. You can view subscriber's WebPager security IDs and other profile information in your List Management set of tools.

WebPager Statistics Counter

Counts and displays the number of subscribers in a list who have WebPager loaded and their communication preference set to WebPager. See how many of your subscribers have their preference set to WebPager, how many are active users, inactive users, have paused, have uninstalled or have opted in, but not yet completed the install process so that you can either optimize your messages or schedule segmented campaigns.

The counter engages automatically when loading a list. Load the list you'd like to work with and the WebPager statistics are loaded automatically for you.

WebPager Subscription Form

The WebPager subscription form is used to subscribe individuals to a particular web page and receive alerts when the web page has been updated. You can capture as much or as little subscriber information as you desire however it is recommended that you at least capture the subscriber's name and email address. When the subscriber completes the form, a personalized WebPager Security Key is produced and downloaded to the subscriber's computer. The subscriber's information is automatically posted to your WebPager account and the page is added to their subscribed-to pages list. Your WebPager subscribers are directly and securely connected to your WebPager platform and thus you can reliably and immediately alert them when your page has been updated. Ask your BrowserMail support team for the WebPager form code that you would use on your web pages. You can tweak the look and language of the form to best fit the look and feel of your web page. Once the form is operational, the subscription process becomes automatic and you will be able to track subscriptions using WebPager's list tools.

WebPager Subscription Preferences

Subscribers can access their WebPager preferences by right-clicking the WebPager icon in their system tray and selecting "Preferences". Subscribers can view every organization and web page that they've subscribed to with WebPager. Subscriber's can pause alerts, restart alerts, remove themselves from a particular alert list, switch delivery of alerts to email, change their email address or unsubscribe from all alert lists from a particular organization. All modifications take effect immediately except an email address update which triggers an email confirmation message and requires a response back from the subscriber to confirm the address (subscriber simply clicks a confirmation link in the message). Giving the subscriber instant and total control over their subscription preferences is a very important quality of permission-based communications. Your subscribers will feel more confident that their privacy and security is respected by you and that they have ultimate control over every aspect of their subscriptions. Subscribers right-click the WebPager icon in their system tray and select "Preferences". Subscribers can view every organization and web page that they've subscribed to with WebPager and modify their preferences accordingly.

What is WebPager?

WebPager is a convenient way for your target audience to be alerted when one or more of your web pages have been updated. For example, if you have pricing, product showcase, sales training, corporate communication or any other type of web page that gets frequently updated, and which updates would be of interest to your target audience, you can deploy WebPager and send alerts when the new page is ready for viewing.

Your target audience simply subscribes to the web page using the WebPager subscription form. Once their subscription is active, they will receive an alert advising them instantly when a web page has been updated. The subscriber simply clicks on the alert to visit the web page immediately.

What is claimed is:

1. A method for providing electronic communications comprising at least one of marketing and advertising information from a plurality of senders to a plurality of recipients via a platform disposed therebetween, the method comprising the steps of:
receiving, from the plurality of senders, information associated with the generation of the electronic communication comprising the at least one of marketing and advertising information for distribution by the platform to the plurality of recipients;
generating by the platform the electronic communication to be transmitted to a recipient as a recipient-specific Web page based at least in part on the information received from the sender and permission criteria specified by the recipient with respect to the at least one of marketing and advertising information;
publishing by the platform the Web page on a server maintained by the platform that is accessible by the recipient using a network connection when communicating with the platform to receive the electronic communication from the platform;
determining by the platform whether a utility program is installed;
downloading by the platform the utility program to a recipient's computer when the utility program is not installed;
installing by the platform the utility program to the recipients computer when the utility program is not installed;
generating by the utility program a recipient-specific security key
determining, by the utility program installed on a computer of the recipient, that the electronic communication is available by polling the server;
using the recipient security key generated by the utility program to verify that the recipient should be provided access to the electronic communication prior to the step of providing the published Web page to the recipient;
providing the computer of the recipient with an indication that the electronic communication is available as a published Web page when the utility program verifies that the recipient should be provided access, wherein the indication includes location information relating to the location of the published Web page;
receiving from the recipient computer a request to receive the electronic communication;
providing by the platform the published Web page to the recipient, using the location information, following the request by the recipient to receive the electronic communication from the sender;
tracking the request received from the recipient with respect to successful receipt of the indication that the electronic communication is available; and
providing by the platform electronic communication statistics comprising at least one of a total number of queued deliveries, a number of deliveries that are still being processed, a number of deliveries that have already occurred, a number of deliveries that were bounced, a number of deliveries that were opened, a number of deliveries that were clicked, a number of electronic communications delivered using different delivery methods, and a number of clickthroughs to determine the effectiveness of the electronic communication responsive to said tracking.

2. The method of claim 1, wherein the step of providing the Web page to the recipient comprises the steps of:
downloading the Web page, using the location information provided with the indication; and
opening the Web page in a Web browser operated by the recipient.

3. The method of claim 1, wherein the indication is an alert window that is made visible to the recipient, and wherein the alert window provides information to the recipient based on at least one of the sender of the electronic communication, the date on which the electronic communication was sent, the subject of the electronic communication, and the recipient of the electronic communication.

4. The method of claim 1, wherein the step of providing the Web page to the recipient is based on the recipient activating the received indication.

5. The method of claim 1, wherein the generated electronic communication is personalized based at least in part on information associated with the recipient that is stored by the server.

6. The method of claim 1, further comprising the steps of:
using at least one web-centric reporting tool to collect information associated with the recipient's interaction with the electronic communication; and
providing at least some of the collected information to the sender.

7. The method of claim 1, wherein the step of generating the electronic communication comprises using a design wizard tool, by the sender, to assist in the generation of the electronic communication.

8. The method of claim 7, wherein the step of using a design wizard tool comprises the steps of:
selecting, by the sender, a Web page template; and
selecting, by the sender, at least one of formatted text, an image, graphics, a link, a form, and rich media content to be included in the generated Web page.

9. The method of claim 1, further comprising providing a list manager tool, and wherein the list manager tool is used by the sender to select the recipient that is to be provided the electronic communication and wherein the list manager tool is used to modify the recipient profile information comprising at least one of a name, an email address, an account information, demographic, and communication preferences.

10. The method of claim 1, further comprising the step of determining whether the recipient has granted permission to receive the electronic communication responsive to the permission criteria, wherein the step of providing the recipient with an indication that the electronic communication is available occurs only after it has been determined that the recipient has granted permission to receive the electronic communication.

11. The method of claim 1, further comprising the steps of:
generating a second electronic communication as a second Web page based at least in part on the information received from the sender;
publishing the second Web page on a server that is accessible by a second recipient using a network connection;
providing the second recipient with a second indication that the electronic communication is available, wherein the second indication includes location information relating to the location of the published Web page;
receiving from the second recipient a second request to receive the electronic communication; and
providing the published Web page to the second recipient, using the location information, following the second request by the second recipient to receive the electronic communication from the sender.

12. The method of claim 1, further comprising the step of providing to the sender reports with information for tracking aspects of the electronic communication with the recipient, wherein the information comprises at least one of the date and time of the indication of the electronic communication to the recipient, the date and time the recipient accessed the electronic communication, the total number or intended recipients, the total number of indication deliveries, the number of recipients that opened the electronic communication, the number of recipients that clicked on one or more links in the electronic communication, the number of recipients that clicked on a specific link in the electronic communication, and the type of operating system and Web browsers of the recipient.

13. The method of claim 12, wherein the Web page can only be viewed by the recipient.

14. The method of claim 1, providing to the plurality of senders key metrics of the electronic communication responsive to said tracking, wherein the key metrics include at least one of an electronic communication delivery date and time, a number of recipients, a number of deliveries, a number of recipients that opened the communication, a number of "clickthroughs," a number of specific "clickthroughs," and the operating systems and browsers recipients use.

15. The method of claim 1, wherein said generating the electronic communication comprises generating by the platform the electronic communication comprising an alert formatted as a Web page to be transmitted to the recipient as a recipient-specific Web page based at least in part on the information received from the sender and permission criteria specified by the recipient with respect to the at least one of marketing and advertising information.

16. The method of claim 1, further comprising:
transmitting to the utility program a new indication that the electronic communication is available; and
transmitting to the recipient simultaneously an encrypted and recipient-specific URL where the electronic communication is published.

17. The method of claim 16, further comprising:
opening by the utility program the recipient default web browser when the recipient elects to view the communication; and
loading by the utility program the encrypted and recipient-specific URL.

18. The method of claim 1, further comprising:
updating automatically by the platform a list with response data wherein the response data are generated from a communication campaign.

19. The method of claim 18, wherein the response data comprise at least one of the number of times the recipient has received a communication, the number of times the recipient has opened a communication, and the number of times the recipient has responded to a communication.

20. The method of claim 1, wherein the electronic communication comprises at least one of personalized text and personalized images by merging recipient-specific data from a sender's list.

21. The method of claim 1, wherein the electronic communication is not delivered to a recipient's email client.

22. The method of claim 1, wherein the electronic communication is not delivered to the recipient through the email network.

23. The method of claim 1, further comprising:
providing by the utility program an indication that the electronic communication is available if the recipient has granted permission to receive the electronic communication.

24. The method of claim 1, further comprising:
enabling by the platform a campaign manager develop advertising campaigns; and providing by the platform to the campaign manager access to at least one of a design wizard tool, a list manager tool, and a sender tool.

25. The method of claim 1, further comprising:
determining by the platform whether a utility program is installed;
checking by the platform for previously installed versions of the utility program in a recipient's computer;
downloading by the platform the utility program to a recipient's computer if the previously installed version of the utility program is not current;
installing by the platform the utility program to the recipient's computer if the previously installed version of the utility program is not current; and
generating by the utility program a recipient-specific security key.

26. The method of claim 1, further comprising:
associating by the platform to the utility program a unique identification number; and
identifying by the platform the recipient from the unique identification number.

27. The method of claim 1, further comprising:
associating by the platform the recipient with more than one utility programs and security keys.

28. The method of claim 1, further comprising:
presenting by the platform to the recipient a selection window with a list of archived communications.

29. The method of claim 1, further comprising:
presenting by the platform to the recipient a selection window with archived communications; and
enabling by the platform generating a plurality of lists for storing the archived communications.

30. The method of claim 1, further comprising:
reporting by the platform to a campaign manager the total number of recipients that have unsubscribed from receiving communications associated with a campaign.

31. The method of claim 1, wherein the utility program and the recipient specific security key can be used for different delivery methods.

32. The method of claim 1, wherein the indication indicates that a particular Web page has been updated.

33. The method of claim 32, further comprising:
highlighting by the platform the exact location of the updated content on the electronic communication.

34. The method of claim 1, further comprising:
flagging by the platform undeliverable electronic communication as hard or soft bounces, wherein the reasons why the electronic communication is undelivered comprises at least one of an incorrect addresses, a canceled email account, a bad domain name, SPAM blocking, Firewall filtering, a full mailbox, and malfunctioning servers on the recipient's end, wherein hard bounces are electronic communications with permanent and fatal errors and soft bounces are electronic communications with temporary errors, and suppressing automatically by the platform bounced electronic communications.

35. The method of claim 34, further comprising:
searching by the platform a list for an email address that may have bounced the electronic communication.

36. The method of claim 34, further comprising:
removing by the platform a bounce flag from bounced electronic communications.

37. The method of claim 1, further comprising:
validating by the platform a recipient address with the recipient server; and
receiving by the platform the recipient server response.

38. The method of claim 1, wherein the method inserts and entry in the Windows operating system registry that enables automatic execution at startup.

39. The method of claim 38, further comprising:
enabling by the platform the recipient subscribe in a campaign; and
using by the method a cookie to identify existing recipient subscriptions.

40. The method of claim 1, further comprising:
displaying by the platform an icon in the system tray when the method is active;
checking periodically by the platform for new messages by transmitting a unique security identification number to the polling servers;
opening by the platform an indication window when a new electronic communication is available;
receiving by the platform an encrypted URL associated with the electronic communication if the recipient elects to view the new electronic communication;
opening by the platform a new browser window; and
displaying by the platform the electronic communication in the new browser window.

41. The method of claim 1, wherein the method bypasses the email network and recipient inboxes to deliver highly targeted communications instantly, reliably and without being subject to filters, blocking, stripping or any of the other pitfalls of email delivery.

42. The method of claim 1, further comprising:
providing by the platform a tool for automatically hosting and generating a unique URL for a landing page; and
enabling by the platform linking of a sender's email address to the landing page.

43. The method of claim 1, further comprising:
identifying by the platform the browser used by the recipient for viewing the electronic communication.

44. The method of claim 1, further comprising:
identifying by the platform the operating system used by the recipient.

45. The method of claim 1, further comprising:
counting by the platform the number of times a referral tool was used in a campaign.

46. The method of claim 1, further comprising:
providing by the platform to the senders templates for designing electronic communications.

47. The method of claim 1, further comprising:
enabling by the platform the recipient to set up a first special indication to alert the recipient to visit a web page;
enabling by the platform the recipient to set up a second special indication to alert the recipient when a particular content has significantly changed; and
enabling by the platform the senders to send a third special indication manually.

* * * * *

UNITED STATES PATENT AND TRADEMARK OFFICE
CERTIFICATE OF CORRECTION

PATENT NO. : 7,640,322 B2
APPLICATION NO. : 11/068033
DATED : December 29, 2009
INVENTOR(S) : Wendkos et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1234 days.

Signed and Sealed this

Ninth Day of November, 2010

David J. Kappos
*Director of the United States Patent and Trademark Office*